(12) United States Patent
Diener et al.

(10) Patent No.: US 8,175,539 B2
(45) Date of Patent: May 8, 2012

(54) SYSTEM AND METHOD FOR MANAGEMENT OF A SHARED FREQUENCY BAND

(75) Inventors: Neil R. Diener, Hudson, OH (US); Karl A. Miller, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/975,535

(22) Filed: Dec. 22, 2010

(65) Prior Publication Data

US 2011/0090939 A1     Apr. 21, 2011

Related U.S. Application Data

(63) Continuation of application No. 12/184,485, filed on Aug. 1, 2008, now abandoned, which is a continuation of application No. 10/420,515, filed on Apr. 22, 2003, (Continued)

(51) Int. Cl.
- *H04B 1/00* (2006.01)
- *H04B 7/00* (2006.01)
- *H04B 17/00* (2006.01)
- *H04B 3/46* (2006.01)
- *H04B 7/185* (2006.01)
- *H04Q 1/20* (2006.01)

(52) U.S. Cl. ....... 455/69; 455/67.11; 455/522; 375/224; 375/225; 375/132; 370/318

(58) Field of Classification Search ................ 455/41.2, 455/522, 67.11, 69, 62; 375/224, 225, 132; 370/318

See application file for complete search history.

(56) References Cited

U.S. PATENT DOCUMENTS 3,812,291 A  5/1974  Brodes et al.

(Continued)

FOREIGN PATENT DOCUMENTS

CA   2298316 A1   8/2000

(Continued)

OTHER PUBLICATIONS

Myles A. et al., "IEE 802. 11h Potential Draft Text D2.0" IEEE P802.11 Wireless Lans, Mar. 2002.

(Continued)

*Primary Examiner* — Andrew Wendell

(74) *Attorney, Agent, or Firm* — Edell, Shapiro & Finnan, LLC

(57) ABSTRACT

A system, method, software and related functions are provided for managing activity in a radio frequency band that is shared, both in frequency and time, by signals of multiple types. An example of such a frequency band is an unlicensed frequency band. Radio frequency energy in the frequency band is captured at one or more devices and/or locations in a region where activity in the frequency band is happening. Signals occurring in the frequency band are detected by sampling part or the entire frequency band for time intervals. Signal pulse energy in the band is detected and is used to classify signals according to signal type. Using knowledge of the types of signals occurring in the frequency band and other spectrum activity related statistics (referred to as spectrum intelligence), actions can be taken in a device or network of devices to avoid interfering with other signals, and in general to optimize simultaneous use of the frequency band with the other signals. The spectrum intelligence may be used to suggest actions to a device user or network administrator, or to automatically invoke actions in a device or network of devices to maintain desirable performance.

19 Claims, 34 Drawing Sheets

Related U.S. Application Data now Pat. No. 7,424,268, which is a continuation-in-part of application No. 10/246,363, filed on Sep. 18, 2002, now Pat. No. 7,269,151.

(60) Provisional application No. 60/320,008, filed on Mar. 14, 2003, provisional application No. 60/453,385, filed on Mar. 10, 2003, provisional application No. 60/319,714, filed on Nov. 20, 2002, provisional application No. 60/319,542, filed on Sep. 11, 2002, provisional application No. 60/319,435, filed on Jul. 30, 2002, provisional application No. 60/380,891, filed on May 16, 2002, provisional application No. 60/380,890, filed on May 16, 2002, provisional application No. 60/374,363, filed on Apr. 22, 2002, provisional application No. 60/374,365, filed on Apr. 22, 2002.

(56) References Cited

U.S. PATENT DOCUMENTS

| | | |
|---|---|---|
| 4,597,107 A | 6/1986 | Ready et al. |
| 4,839,582 A | 6/1989 | Fukaya et al. |
| 5,093,927 A | 3/1992 | Shanley |
| 5,142,691 A | 8/1992 | Freeburg |
| 5,144,642 A | 9/1992 | Weinberg et al. |
| 5,276,908 A | 1/1994 | Koohgoli et al. |
| 5,303,262 A | 4/1994 | Johnson |
| 5,355,522 A | 10/1994 | Demange |
| 5,359,593 A * | 10/1994 | Derby et al. ............ 370/234 |
| 5,428,819 A | 6/1995 | Wang et al. |
| 5,446,370 A | 8/1995 | Voight |
| 5,574,979 A | 11/1996 | West |
| 5,608,727 A | 3/1997 | Perreault et al. |
| 5,610,839 A | 3/1997 | Karolak et al. |
| 5,636,140 A | 6/1997 | Lee et al. |
| 5,655,217 A | 8/1997 | Lemson |
| 5,687,163 A | 11/1997 | Fox et al. |
| 5,696,903 A | 12/1997 | Mahany |
| 5,732,077 A | 3/1998 | Whitehead |
| 5,745,777 A | 4/1998 | English et al. |
| 5,752,164 A | 5/1998 | Jones |
| 5,809,427 A | 9/1998 | Perreault et al. |
| 5,850,596 A | 12/1998 | Reynolds |
| 5,864,541 A | 1/1999 | Abu-Amara et al. |
| 5,889,772 A | 3/1999 | Fischer et al. |
| 5,892,812 A | 4/1999 | Pester, III |
| 5,907,812 A | 5/1999 | Van De Berg |
| 5,990,833 A | 11/1999 | Ahlbom et al. |
| 6,031,833 A | 2/2000 | Fickes et al. |
| 6,052,421 A | 4/2000 | Richardson et al. |
| 6,084,919 A | 7/2000 | Kleider et al. |
| 6,141,565 A | 10/2000 | Feuerstein et al. |
| 6,167,237 A | 12/2000 | Rapeli |
| 6,169,728 B1 | 1/2001 | Perreault et al. |
| 6,212,566 B1 | 4/2001 | Vanhoof et al. |
| 6,226,680 B1 | 5/2001 | Boucher et al. |
| 6,229,799 B1 | 5/2001 | Caillerie et al. |
| 6,229,998 B1 | 5/2001 | Hamdy et al. |
| 6,240,282 B1 | 5/2001 | Kleider et al. |
| 6,240,372 B1 | 5/2001 | Gross et al. |
| 6,256,478 B1 | 7/2001 | Allen |
| 6,256,511 B1 | 7/2001 | Brown et al. |
| 6,275,695 B1 | 8/2001 | Obhan |
| 6,295,461 B1 | 9/2001 | Palmer et al. |
| 6,307,839 B1 | 10/2001 | Gerszberg et al. |
| 6,317,599 B1 | 11/2001 | Rappaport et al. |
| 6,332,076 B1 | 12/2001 | Shah et al. |
| 6,349,198 B1 | 2/2002 | Carlson et al. |
| 6,351,643 B1 | 2/2002 | Haartsen |
| 6,356,565 B1 * | 3/2002 | Bouyer et al. ............ 370/468 |
| 6,366,780 B1 | 4/2002 | Obhan |
| 6,374,079 B1 | 4/2002 | Hsu |
| 6,374,082 B1 | 4/2002 | Carlson |
| 6,381,460 B1 | 4/2002 | Klein et al. |
| 6,385,434 B1 | 5/2002 | Chuprun et al. |
| 6,418,131 B1 | 7/2002 | Snelling et al. |
| 6,442,371 B1 | 8/2002 | Lyu |
| 6,442,507 B1 | 8/2002 | Skidmore et al. |
| 6,466,614 B1 | 10/2002 | Smith |
| 6,498,808 B1 * | 12/2002 | Tzannes ............ 375/225 |
| 6,499,006 B1 | 12/2002 | Rappaport et al. |
| 6,584,140 B1 * | 6/2003 | Lee ............ 375/132 |
| 6,629,151 B1 | 9/2003 | Bahl |
| 6,671,495 B1 | 12/2003 | Lappetalainen et al. |
| 6,711,134 B1 | 3/2004 | Wichelman et al. |
| 6,714,605 B2 | 3/2004 | Sugar et al. |
| 6,850,735 B2 | 2/2005 | Sugar et al. |
| 6,882,851 B2 | 4/2005 | Sugar et al. |
| 7,035,593 B2 | 4/2006 | Miller et al. |
| 7,050,452 B2 | 5/2006 | Sugar et al. |
| 7,113,753 B2 | 9/2006 | Cotanis |
| 7,116,943 B2 | 10/2006 | Sugar et al. |
| 7,200,113 B2 | 4/2007 | Beyda et al. |
| 7,224,745 B2 * | 5/2007 | Sydon et al. ............ 375/285 |
| 7,280,580 B1 * | 10/2007 | Haartsen ............ 375/138 |
| 7,302,017 B2 | 11/2007 | Wreschner et al. |
| 7,400,903 B2 | 7/2008 | Shoemake et al. |
| 2001/0008837 A1 | 7/2001 | Takahashi |
| 2001/0055952 A1 | 12/2001 | Ficarra |
| 2002/0006799 A1 | 1/2002 | Rappaport et al. |
| 2002/0008658 A1 | 1/2002 | Oura |
| 2002/0010008 A1 | 1/2002 | Bork et al. |
| 2002/0019214 A1 | 2/2002 | Brown et al. |
| 2002/0077787 A1 | 6/2002 | Rappaport et al. |
| 2002/0085503 A1 | 7/2002 | Hulyalkar et al. |
| 2002/0086641 A1 | 7/2002 | Howard |
| 2002/0111772 A1 | 8/2002 | Skidmore et al. |
| 2002/0136268 A1 | 9/2002 | Gan et al. |
| 2002/0142744 A1 | 10/2002 | Okanoue et al. |
| 2002/0154614 A1 | 10/2002 | Jagger et al. |
| 2002/0155811 A1 | 10/2002 | Prismantas et al. |
| 2002/0173272 A1 | 11/2002 | Liang et al. |
| 2002/0177446 A1 | 11/2002 | Bugeja et al. |
| 2002/0191678 A1 * | 12/2002 | Batra et al. ............ 375/132 |
| 2003/0050012 A1 | 3/2003 | Black et al. |
| 2003/0050015 A1 | 3/2003 | Kelly et al. |
| 2003/0123420 A1 | 7/2003 | Sherlock |
| 2003/0198200 A1 | 10/2003 | Diener et al. |
| 2003/0198304 A1 | 10/2003 | Sugar et al. |
| 2003/0224741 A1 | 12/2003 | Sugar et al. |
| 2004/0023674 A1 | 2/2004 | Miller |
| 2004/0028003 A1 | 2/2004 | Diener et al. |
| 2004/0028123 A1 | 2/2004 | Sugar et al. |
| 2004/0047324 A1 | 3/2004 | Diener |
| 2004/0137915 A1 | 7/2004 | Diener et al. |
| 2004/0156440 A1 | 8/2004 | Sugar et al. |
| 2005/0002473 A1 | 1/2005 | Kloper et al. |
| 2005/0180528 A1 | 8/2005 | Manku |
| 2005/0227625 A1 | 10/2005 | Diener |

FOREIGN PATENT DOCUMENTS

| | | |
|---|---|---|
| EP | 1096730 | 5/2001 |
| JP | 2000022712 | 1/2000 |
| WO | 03028313 A2 | 4/2003 |

OTHER PUBLICATIONS

Mitola, Joseph III, "Cognitive Radio, An Integrated Agent Architecture for Software Defined Radio," May 8, 2000, Royal Institute of Technology.
European Search Report dated Feb. 14, 2006.
Monks et al., "A Power Controlled Multiple Access Protocol for Wireless Packet Networks," 2001, IEEE Infocom 2001.
Vaduvur Bharghavan, "Performance Evaluation of Algorithms for Wireless Medium Access," 1998, IPDS.
Garces et al., "Collision Avoidance and Resolution Multiple Access for Multichannel Wireless Networks," 1997, IEEE Infocom.
Howitt et al., "Coexistence in the 2.4 GHz ISM Band," IEEE Communications Magazine, Vol. In Review, 2001.
Cisco, "New Product: Ciscoworks Wireless LAN Solution Engine Software Version 1.0," Jul. 13, 2002.
Joe McGarvey, "Wi-Fi Moves Into Management Stage," Jul. 19, 2002. 802.11planet.

Wildpackets Inc., "A Wildpackets Academy Tutorial; AiroPeek and Wireless Security: Identifying and Locating Rogue Access Points," 2002.

Satapathy et al., "Etiquette Modification for Unlicensed Spectrum: Approach and Impact," May 1998, Proceedings of the IEEE Vehicular Technology Conference, vol. 1, pp. 272-276.

Dewayne Hendricks, "Is there Part 15 Congestion? Part II," Sep. 27, 2000, FCC TAC.

FCC, "Report: Second Meeting of FCC Technological Advisory Council II," Nov. 28, 2001.

FCC, "Report: First Meeting of FCC Technological Advisory Council II," Aug. 26, 2001.

Stamatelos et al., "Spectral Efficiency and Optimal Base Placement fo Indoor Wireless Networks," May 1996, IEEE Journal on Selected Areas in Communications.

Aegis Systems Limited, Excerpt from "Implications of International Regulation and Technical Considerations on Market Machanisms in Spectrum Management," Report to the Independent Spectrum Review, Chapter C, "Technical Factors Affecting Spectrum Management," Nov. 6, 2001.

Jon Peha, "Spectrum Management Policy Options," 1998, IEEE Communications Surveys, vol. 1, No. 1.

Zafar Masood, "Interference Characterization in Unlicensed National Information Infrastructure (U-NII) Band," Master's Degree Thesis, Dec. 2000.

Stefan Pettersson, "Performance and Implementation Aspects of Wireless Indoor Communication Systems with Local Centralization," Apr. 2000, Dissertation submitted to the Royal Institute of Technology.

Mobilian Corporation, "Wi-Fi™ (802.11b) and Bluetooth™: An Examination of Coexistence Approaches," 2001.

Net@EDU, "Wireless Campus Working Group: Position Paper on WLAN Radio Frequency Interference Issues," Jan. 1, 2001.

BBN Technologies, "Using Signal Processing to Analyze Wireless Data Traffic," May 22, 2002, BBN Technical Memorandum No. 1321.

ISCO International, Interference Solutions: Improve Performance Realize New Traffic, Oct. 1, 2002, CDG Technology Forum.

DeWayne Hendricks, "Is There Part 15 Congestion?" Jun. 28, 2000, FCC TAC.

Ricardo Rodrigues et al., "On the Design and Capacity Planning of a Wireless Network," 2000, IEEE.

Charles Jackson, "Distributed Channel Assignment: The Tragedy of the Commons, Obler's Paradox, and Mad Cow Disease," Mar. 30, 2001, GWU ECE Colloquium.

Kevin Werbach, "Open Spectrum: The Paradise of the Commons," Nov. 20, 2001, Release 1.0, Ester Dysons Monthly Rept, vol. 19, No. 10.

Interlink Networks, "A Practical Approach to Identifying and Tracking Unauthorized 802.11 Cards and Access Points," 2002.

Rodrigo Garces, "An Access Etiquette for Very-Wide Wireless Bands," Oct. 12, 1998, IEEE IC3N '98: Seventh International Conference on Computers.

K. Konston, "In Pursuit of a Wireless Bill of Rights," Sep. 18, 2002, Spectrum Management Working Group FCC-TAC, pp. 1-15.

Michael Yang et al., "On the Use of Unlicensed Frequency Spectrum, Use Rule Evolution, and Interference Mitigation," Jan. 18, 2001, Adaptive Broadband.

Jon M. Peha, "Wireless Communications and Coexistence for Smart Environments," Oct. 2000, IEEE Personal Communications.

Durga P. Satapathy et al., "Spectrum Sharing Without Licenses: Opportunities and Dangers," 1996, Proceedings of the Telecommunications Policy Research Conference.

Xiaoxin Qui et al., "Network-Assisted Resource Management for Wireless Data Networks," Jul. 2001, IEEE Journal on Selected Areas of Communications, vol. 19, No. 7.

Durga P. Satapathy et al., "A Novel Co-existence Algorithm for Unlicensed Fixed Power Devices," Sep. 2000, IEEE Wireless Communications and Networking Conference.

PCT Search Report from counterpart PCT Application No. PCT/US03/13563 filed Apr. 22, 2003.

McFarland et al., "5-GHz Unified Protocol (5-UP) Proposal, OFDM Extensions for 802.11a," Doc. IEEE 802.11-00/175, Jul. 2000.

"Verifying Bluetooth Baseband Signals Using Mixed-Signal Oscilloscopes," Agilent Technologies, Inc., 2001.

"Oscor 5000 (Omni-Spectral Correlator)," Research Electronics International LLC brochure, 2001.

* cited by examiner

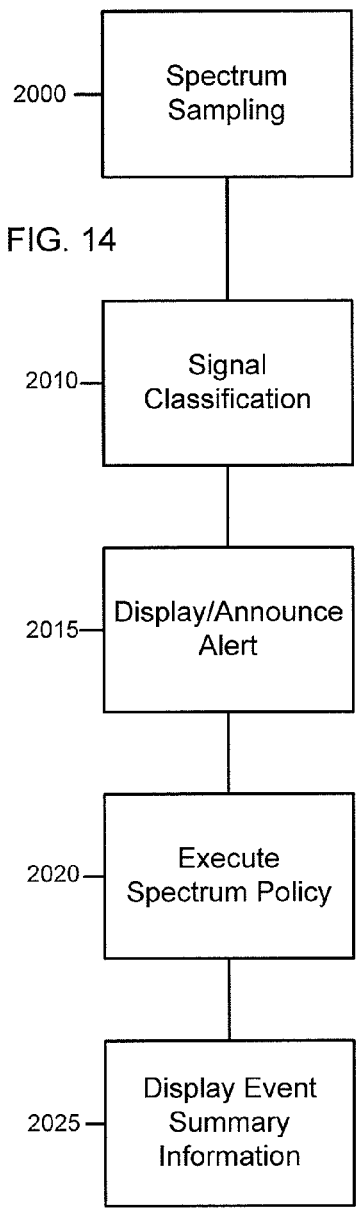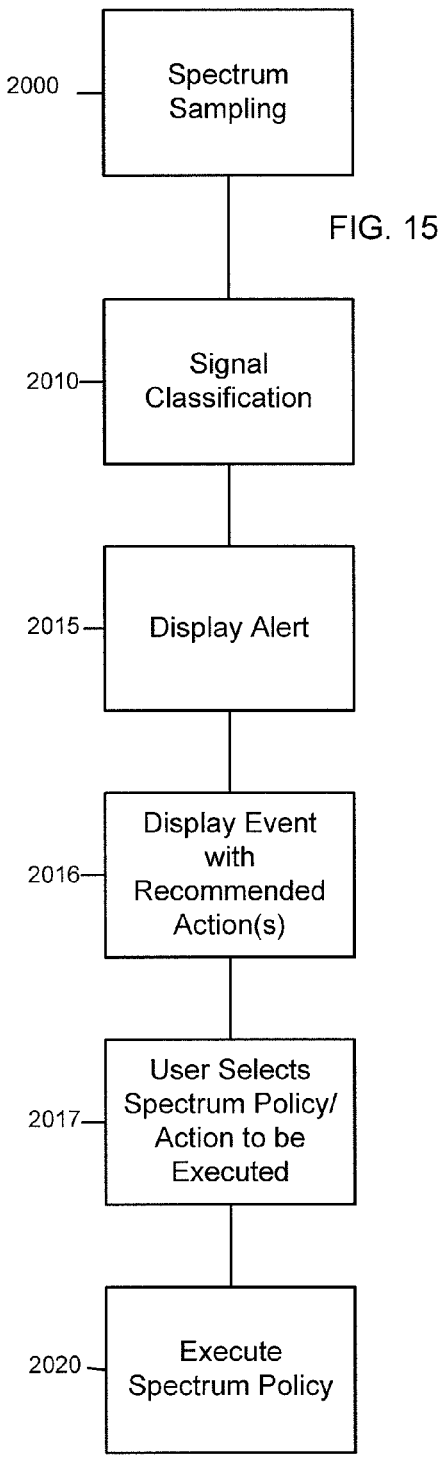

FIG. 16
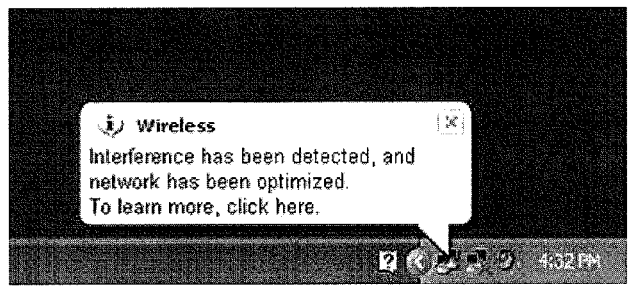
FIG. 17
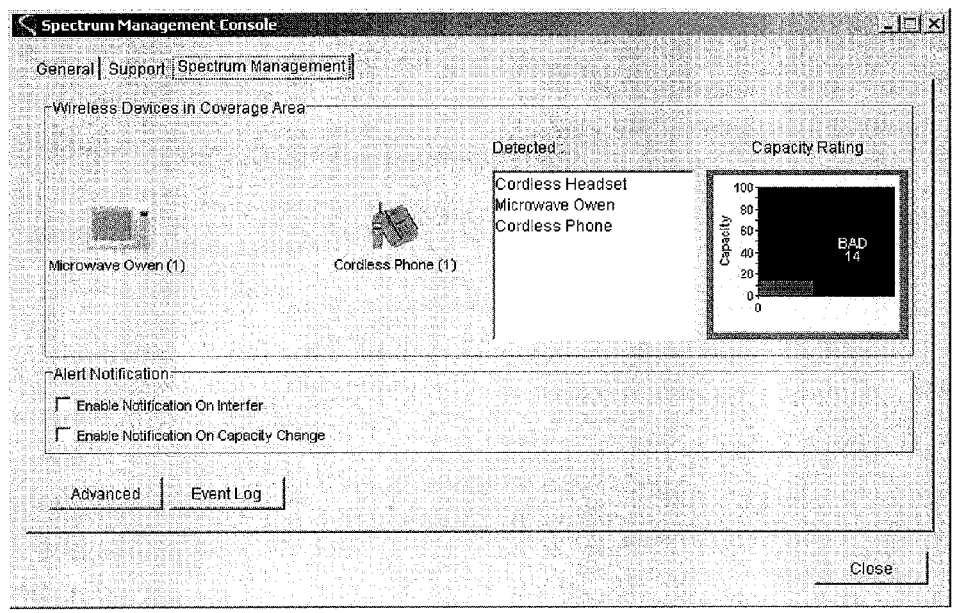
FIG. 18

FIG. 39
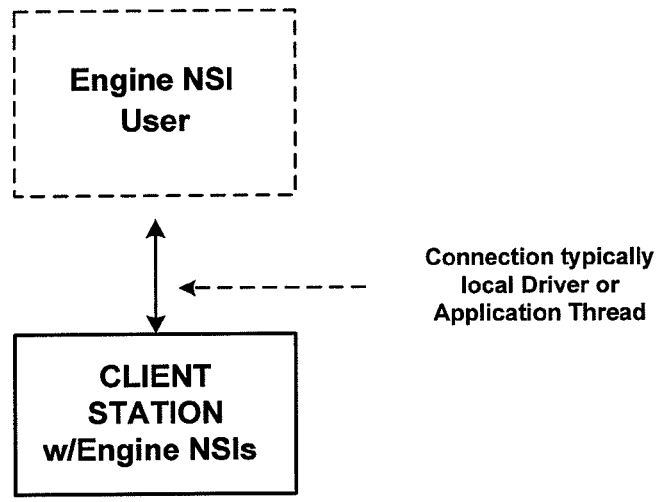
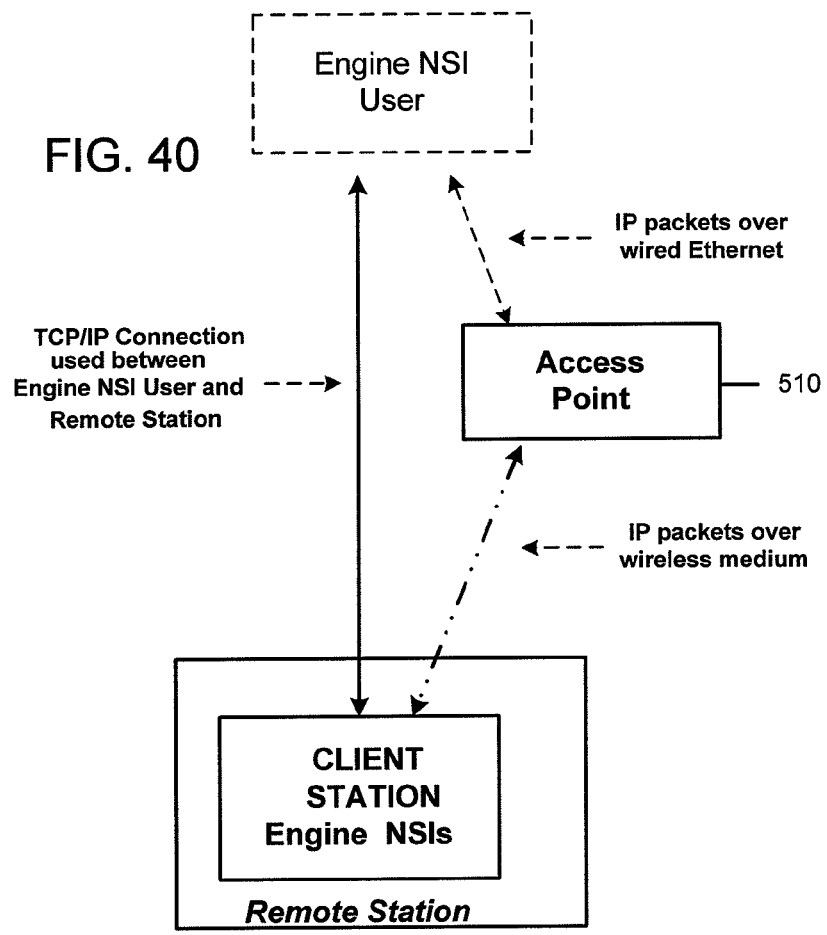
FIG. 40

FIG. 41

| Last Scan: 8:02:11:57 | | | | | Num Samples: 3257 | | | |
|---|---|---|---|---|---|---|---|---|
| Bin | 0 | 1 | 2 | 3 | 4 | 5 | 6 | 7 |
| Cycle | 20 | 35 | 35 | 35 | 35 | 35 | 35 | 35 |
| Max Pwr | -90 | -80 | -75 | -74 | -75 | -64 | -73 | -74 |
| Avg Pwr | -96 | -86 | -81 | -80 | -82 | -81 | -80 | -79 |
| Netwk (+ stats) | | 802.11 CH 1 | Tx-load = 8 | Rx-load = 7 | Back off = 3 | Rexmit = 2 | | |
| | | | | | | | | |
| Bin | 8 | 9 | 10 | 11 | 12 | 13 | 14 | 15 |
| Cycle | 35 | 35 | 35 | 35 | 35 | 35 | 35 | 25 |
| Max Pwr | -76 | -72 | -75 | -70 | -68 | -74 | -80 | -87 |
| Avg Pwr | -81 | -80 | -82 | -79 | -80 | -81 | -85 | -95 |
| Netwk (+ stats) | | | | | | | 802.11 CH 1 | |
| | ... | | | | | | | |

SYSTEM AND METHOD FOR MANAGEMENT OF A SHARED FREQUENCY BAND

CROSS REFERENCE TO RELATED APPLICATIONS

This application is a divisional of U.S. application Ser. No. 12/184,485, filed Aug. 1, 2008, which is a continuation of U.S. application Ser. No. 10/420,515, filed Apr. 22, 2003 (now U.S. Pat. No. 7,424,268, issued Sep. 9, 2008), which is a continuation-in-part of U.S. application Ser. No. 10/246,363, filed Sep. 18, 2002 (now U.S. Pat. No. 7,269,151, issued Sep. 11, 2007), and which in turn claims priority to the following applications (the entirety of all of which are incorporated herein by reference):

U.S. Provisional Application No. 60/374,363, filed Apr. 22, 2002.
U.S. Provisional Application No. 60/374,365, filed Apr. 22, 2002.
U.S. Provisional Application No. 60/380,891, filed May 16, 2002.
U.S. Provisional Application No. 60/380,890, filed May 16, 2002.
U.S. Provisional Application No. 60/319,435, filed Jul. 30, 2002.
U.S. Provisional Application No. 60/319,542, filed Sep. 11, 2002.
U.S. Provisional Application No. 60/319,714, filed Nov. 20, 2002.
U.S. Provisional Application No. 60/453,385, filed Mar. 10, 2003.
U.S. Provisional Application No. 60/320,008, filed Mar. 14, 2003.

This application is further related to U.S. application Ser. No. 10/246,364, filed Sep. 18, 2002 (now U.S. Pat. No. 6,850,735, issued Feb. 1, 2005), and to U.S. application Ser. No. 10/246,365, filed Sep. 18, 2002 (now U.S. Pat. No. 6,714,605, issued Mar. 30, 2004).

BACKGROUND OF THE INVENTION

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) will collapse. This phenomenon has already been observed in environments that have a high density of wireless devices.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. Thus, technology is needed to exploit all of the benefits of the unlicensed band without degrading the level of service that users expect.

Historically, the wireless industry's general approach to solving "tragedy of the commons" problems has been for manufacturers to simply move to another commons further up the spectrum. This solution, however, is not workable for much longer, due to spectrum scarcity and to the less attractive technical characteristics of the higher bands (decreased signal propagation and the inability to penetrate surfaces).

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on managing activity at the network level of the WLAN, but provide little of no capability to manage the frequency band where signals of multiple types (e.g., communication protocol/network types, device types, etc.) are present. What is needed is technology to obtain and use knowledge of what is happening in a shared radio frequency band, such as an unlicensed band, to enable devices to act intelligently with respect to their use of the frequency thereby maintaining the performance of devices and networks of devices operating in that frequency band.

SUMMARY OF THE INVENTION

Briefly, system, method, software and related functions are provided for managing activity in a radio frequency band that is shared, both in frequency and time, by signals of multiple disparate types and devices of various technologies. An example of such a frequency band is an unlicensed frequency band. Radio frequency energy in the frequency band is captured at one or more devices and/or locations in a region where activity in the frequency band is happening. Signals occurring in the frequency band are detected by sampling part or the entire frequency band for time intervals. Signal pulse energy in the band is detected and is used to classify signals according to signal type. Using knowledge of the types of signals occurring in the frequency band and other spectrum activity related statistics (referred to as spectrum intelligence), actions can be taken in a device or network of devices to avoid interfering with other signals, and in general to optimize simultaneous use of the frequency band with the other signals. The spectrum intelligence may be used to suggest actions to a device user or network administrator, or to automatically invoke actions in a device or network of devices to maintain desirable performance.

Devices using the unlicensed or shared frequency bands may adopt the features and functions described herein to better facilitate band sharing and coexistence between a multitude of devices that use disparate technologies. A device with the ability to gather intelligence and act on it, or act on the intelligence acquired by other devices, is referred to herein as a "cognitive radio device." Any device that operates in a shared frequency band may contain varying degrees of cognitive radio to sense their local radio environment and/or detect the presence (and application needs) of other devices that are accessing the same unlicensed band. The capability of sensing, detecting and classifying other users of the shared frequency band in a device's vicinity is important to being able to determine how a device can most effectively use the spectrum. This cognitive radio philosophy applies to both individual devices and to networks of devices.

Cognitive radio devices enable robust and efficient use of the unlicensed bands and facilitate secondary access applications. Cognitive radios can sense their radio environment, detect the presence of other wireless devices, classify those other devices, and then implement application specific-communications policies. Cognitive radios can also be equipped with location-sensing features to help them determine the manner in which they can most effectively communicate, or in the case of secondary access, whether they may access certain spectrum at all.

Cognitive radios benefit both the cognitive radio device users and the other "dumb" device users that are operating nearby. Through spectrum awareness of their radio environments, cognitive radio devices can avoid interference from other devices and thereby maintain more reliable wireless connections than dumb devices, which are unable to adapt their behavior. Because cognitive radio devices can adapt to their environment to, for example, transmit on less crowded frequencies, they cause less radio interference than dumb devices. This leads to improvements in the user experience for both cognitive radio and dumb device users.

As with licensed wireless applications, predictability of performance is important to the satisfactory delivery of unlicensed band wireless services. The successful provision of cognitive spectrum management techniques has the potential to help unlicensed band applications evolve from today's view of wireless as convenient though often secondary, to one in which unlicensed band connections are viewed as reliable, primary, and robust.

Unlike wired and licensed band wireless connections in which access to the media is controlled and effectively managed, the unlicensed bands are available for use by disparate wireless technologies. The consequences for a device operating in such an environment in terms of performance can be catastrophic. For example, and as described above, two commercially successful unlicensed standards, IEEE 802.11b and Bluetooth, behave "unintelligently" when operating in the vicinity of each other.

Through intelligent use of the unlicensed bands, overall capacity can be increased and satisfy the needs of more users. Frequency re-use in which the same band is used in multiple geographical areas has been shown to dramatically increase the capacity. Reducing a "frequency cell" size as currently demonstrated by licensed band operators allows higher overall throughput at the expense of additional equipment. Power level limitations in the unlicensed bands makes frequency re-use a virtual necessity in the provision of wireless services over areas beyond a few hundred square meters. By adopting intelligent power control mechanisms, frequency re-use in the unlicensed bands can be further extended.

For so-called Personal Area Network (PAN) applications, in which the range of wireless connectivity is limited to a few meters, the level of interference created by such PAN devices may be made to be very low by controlling the output power to the lowest possible level to sustain its wireless connection. For those cases in which devices are able to sense that no other devices in its vicinity are competing for the wireless medium, it could transmit at as high a data rate as possible, using as much spectrum as needed, without degrading performance to other nearby devices. Upon detecting the presence of other devices accessing the spectrum, the device could subsequently reduce its bandwidth usage to minimize interference to other devices. Such flexible and intelligent use of the unlicensed band is an example of a cognitive radio device.

The ability of devices to recognize and react to the occupancy of its local RF environment through measurement and classification opens up the opportunity to substantially increase wireless capacity by enabling short-range wireless devices as secondary access users on unoccupied licensed bands. Through spectrum management, this access can be provided without impacting the services provided on these licensed bands.

Objects and advantages of the present invention will become more readily apparent when reference is made to the following description taken in conjunction with the accompanying drawings.

BRIEF DESCRIPTION OF THE DRAWINGS

FIGS. 14 and 15 are flow charts showing examples of how information generated in the spectrum management system may be used.

FIGS. 16-21 are diagrams of exemplary display screens that are useful to convey spectrum management related information to a user.

FIGS. 37-40 are diagrams showing several interactions of the engine NSI with devices in a WLAN environment.

FIG. 41 is a diagram of an exemplary spectrum utilization map (SUM) built from spectrum analysis and other information obtained from a device operating in the frequency band.

DETAILED DESCRIPTION OF THE DRAWINGS

The system, methods, software and other technologies described herein are designed to cooperatively manage use of a shared frequency band where signals of multiple types occur (often simultaneously), such as an unlicensed band, and interference among the users of the band may occur. Many of the concepts described herein may apply to frequency bands that are not necessarily "unlicensed," such as when a licensed frequency band is used for secondary licensed or unlicensed purposes.

The term "network" is used hereinafter in many ways. There may be one or more wireless networks each comprising multiple devices or nodes that operate in the shared frequency band. One example of such a network is a WLAN. There are also networks, called piconets, which are formed with Bluetooth™ capable devices. Many of the examples described herein are made with respect to an IEEE 802.11 WLAN, mostly due in part to the expansive use that the WLAN has seen, and is expected to continue to see. In addition, the term network is referred to a wired network, and to an aggregation of one or more wired and wireless networks. The spectrum management systems, methods, software and device features described herein new are not limited to any particular wireless network, and are equally applicable to any wireless network technologies now known or hereinafter developed for use in a shared frequency band.

Figure 1:
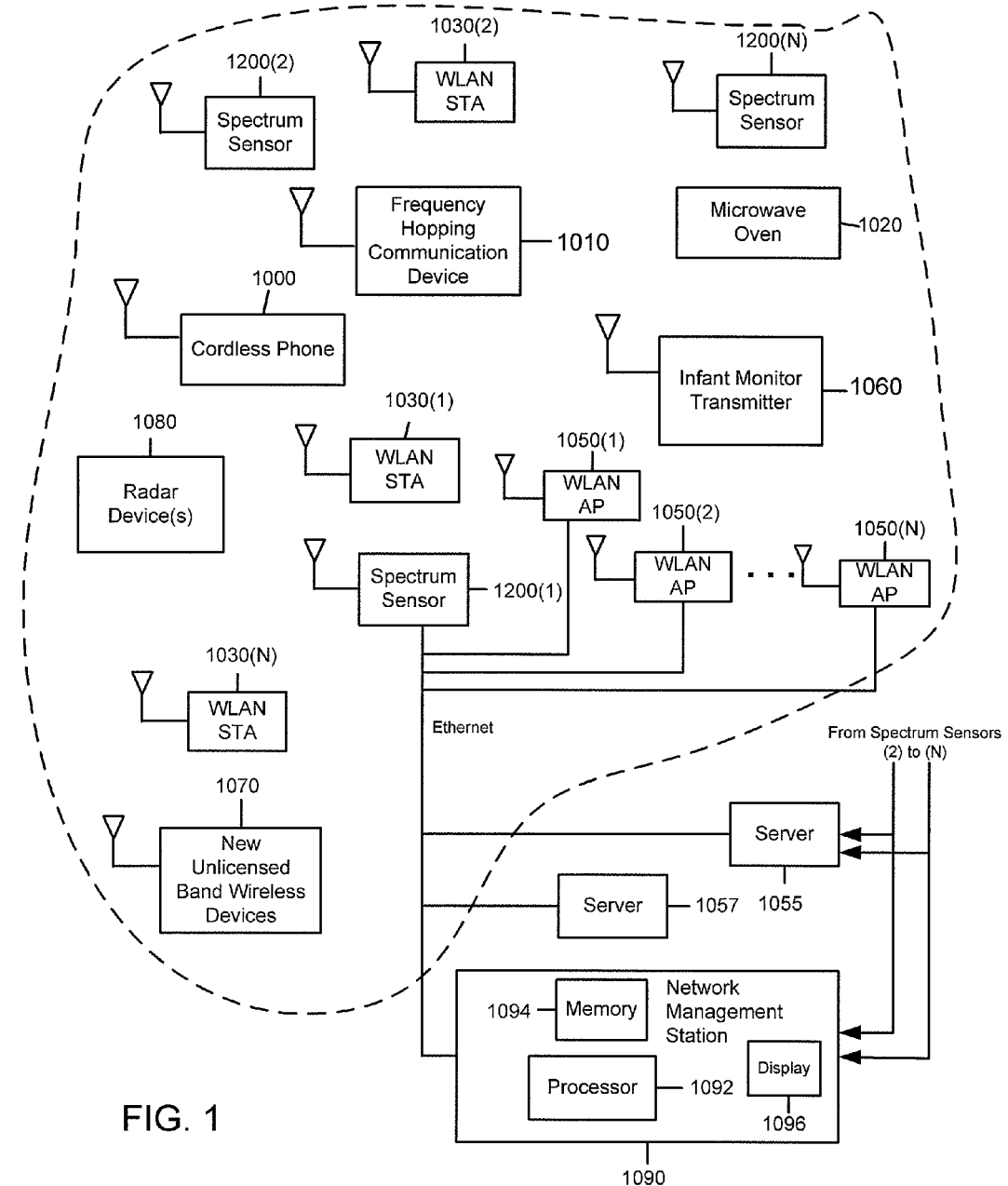
FIG. 1 is a block diagram showing multiple devices that may be operating simultaneously in an unlicensed or shared frequency band.

Referring first to FIG. 1, an environment is shown where there are multiple devices that at some point in their modes of operation transmit or emit signals within a common frequency band, and that may at least partially overlap in frequency and time. When these devices are sufficiently close in proximity to each other, or transmit signals at sufficiently high power levels, there will inevitably be interference between signals of one or more devices. The dotted-line shown in FIG. 1 is meant to indicate a region where activity from any of the devices shown may impact other devices. FIG. 1 shows a non-exhaustive exemplary selection of devices that may operate in an unlicensed frequency band, including cordless phones 1000, frequency hopping communication devices 1010, microwave ovens 1020, a wireless local area network (WLAN) comprised of a WLAN access point 1050(1) and its associated client station (STAs) 1030 (1), 1030(2) to 1030(N), infant monitor devices 1060 as well as any other existing or new wireless devices 1070. Multiple WLAN APs 1050(1) to 1050(N) may be operating in the region, each of which has one or more associated client STAs 1030(1) to 1030(N). Alternatively, the region shown in FIG. 1 may be one of a multitude of other similar regions where activity in the frequency band is occurring. Depending on the desired coverage area, one or more APs may be assigned to corresponding ones of several regions, each region possibly shared with other users such as those shown in the single region of FIG. 1. One or more of the WLAN APs 1050(1) to 1050(N) may be connected to a wired network (e.g., Ethernet network) to which also connected is a server 1055. Cordless phones 1000 may be analog, digital and frequency hopping devices, depending on the type. Frequency hopping communication devices 1010 may include devices operating in accordance with the Bluetooth™ wireless communication protocol, the HomeRF™ wireless communication protocol, as well as cordless phones. In addition, radar devices 1080 may operate in an unlicensed frequency band. Other devices that may operate in the frequency band may also include appliances such as digital (still and/or) video cameras, cable-set top boxes, etc.

As will become more apparent hereinafter, the spectrum management methods described herein may be implemented in any device or network of devices operating in the frequency band (such as those shown in FIG. 1). The necessary hardware and/or software functionalities would be deployed in the hardware/software platform of that device to enable the device to act as a cognitive radio device and thereby perform the spectrum management steps of signal detecting, accumulating/measuring, classifying and controlling/reporting. For example, a cognitive radio device supporting a WLAN application can make more intelligent spectrum access and waveform decisions, and ultimately provide a higher link reliability, by adapting at least one of: its data rate, packet size, frequency channel, transmit power, etc., after classifying an interferer as a microwave oven, a frequency hopping device or alternatively, another WLAN.

Alternatively, or in addition, spectrum management may be implemented by deploying a plurality of spectrum sensors 1200(1) to 1200(N) shown in FIG. 1 in various locations where activity associated with any of the plurality of signal types is occurring in the frequency band to form a sensor overlay network. The spectrum intelligence gathered by the spectrum sensors is fed to one or several processing platforms such as a network management station 1090 or server 1055, the host processor of an AP, etc., where policy decisions are made and controls may be generated. For example, there may be another server 1057 that executes a WLAN management application for the APs 1050(1) to 1050(N). The server 1055 or network management station 1090 may generate controls or reports to the server 1057 that affect changes in one or more APs.

The network management station 1090, server 1055 and server 1057 need not physically reside in the region where the other devices are operating. The network management station 1090 may be connected to the same wired network as the server 1055 and may receive spectrum activity information from one or more WLAN APs 1050(1) to 1050(N) and/or from one or more spectrum sensors 1200(1) to 1200(N). The network management station 1090 has, for example, a processor 1092, a memory 1094 that stores one or more software programs executed by the processor and a display monitor 1096. The network management station 1090 may also execute one or more software programs that manage wired networks as well as wireless networks, such as WLANs served by the WLAN APs 1050(1) to 1050(N). The spectrum sensors 1200(1) to 1200(N) may be connected to an AP, to the server 1055 or to the spectrum management station 1090 by a wired or wireless connection.

Currently, in the United States, the unlicensed frequency bands are in the Industry, Scientific and Medical (ISM) and UNII frequency bands, and include an unlicensed frequency band at 2.4 GHz and unlicensed frequency bands at or near 5 GHz. These are only examples of existing unlicensed bands. In other countries, other portions of the spectrum have been, or may be, set aside of unlicensed use. By definition, an "unlicensed" frequency band generally means that no one user has any preferred rights to use that frequency band over another. No one party has purchased exclusive rights to that spectrum. There are a set of basic power and bandwidth requirements associated with the unlicensed band, but any user that operates within those requirements is free to use it at any time. A consequence of the "unlicensed" character of these frequency bands is that devices operating in them will inevitably interfere with the operation of each other. When interference occurs, a signal from one device to another may not be received properly, causing the sending device to retransmit (and therefore reducing throughput), or possibly entirely destroying the communication link between two communication devices. Moreover, because these frequency bands are free to use, the zero-cost encourages more applications and users of the unlicensed band, which in turn, will make it more crowded and more susceptible to interference. There is, therefore, a need to manage the operation of devices operating in an unlicensed frequency band to ensure efficient and fair usage by all users.

Figure 2:
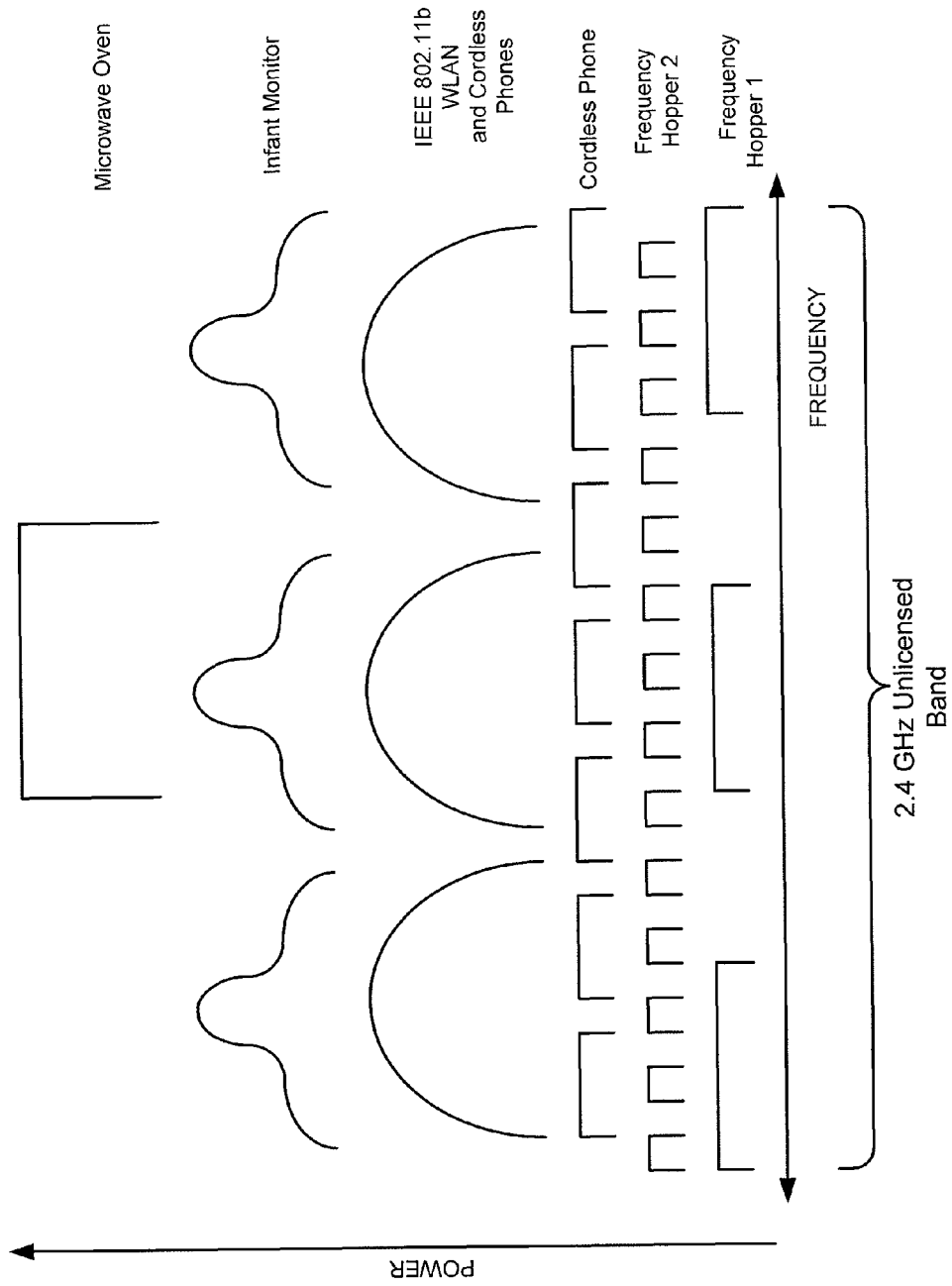
FIGS. 2 and 3 show spectral profiles for the types of signals that may be simultaneously present in two exemplary radio frequency bands.
Figure 3:
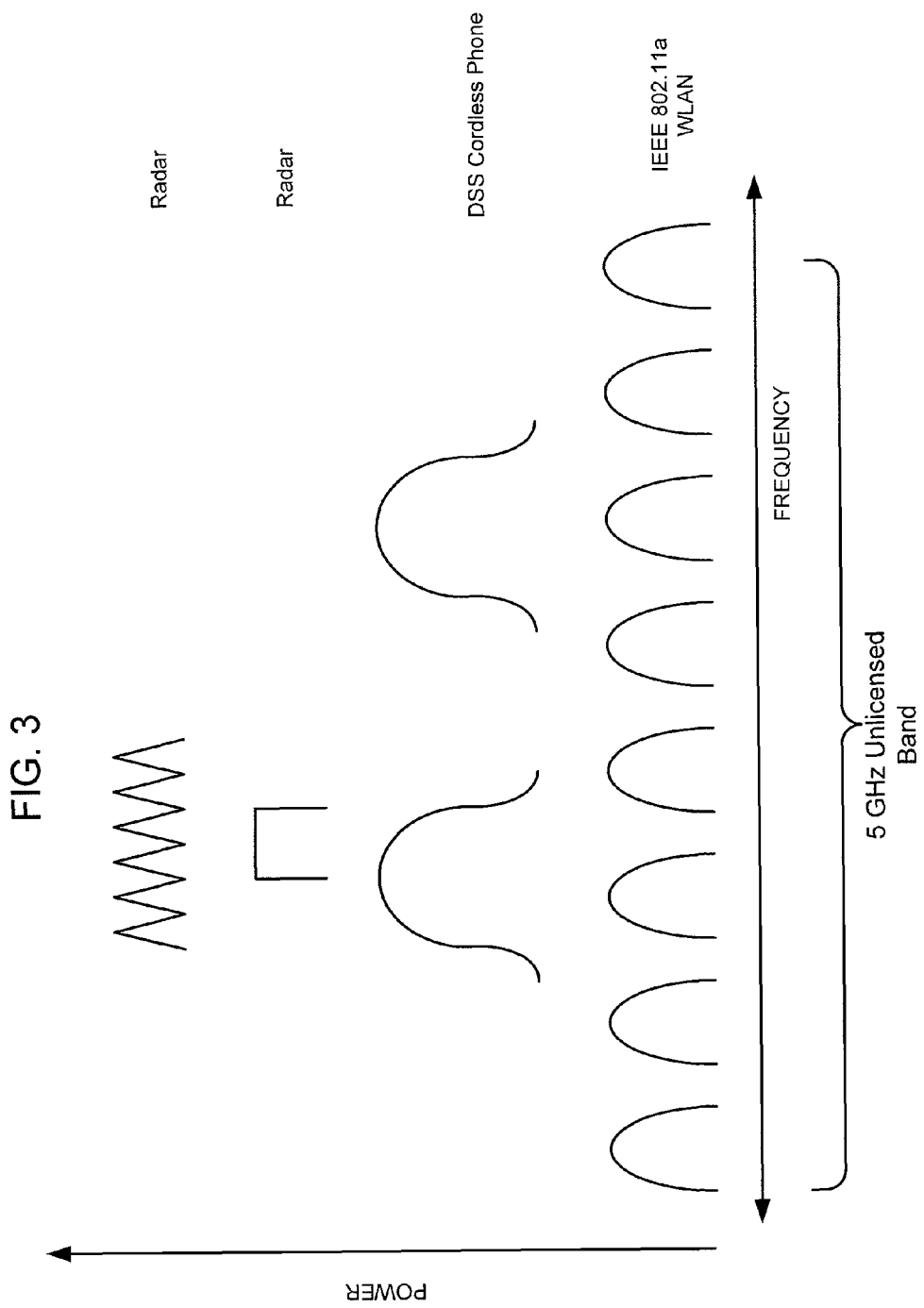

FIGS. 2 and 3 illustrate some examples of the spectral usage of two unlicensed bands in the United States. FIG. 2 shows the spectral profiles of exemplary devices that operate in the 2.4 GHz unlicensed frequency band such as, for example, frequency hopper devices, cordless phones, IEEE 802.11b WLAN communication devices, infant monitor devices and microwave ovens. A frequency hopping device will occupy a predictable or random frequency sub-band at any given time, and therefore, over time, may span the entire frequency band. A cordless phone, of the non-frequency hopping variety, may occupy one of several frequency sub-bands (channels) at any given time. An IEEE 802.11b device will typically occupy one of three RF channels in the 2.4 GHz band at any given time, and an infant monitor is similar. A microwave oven will emit a burst of energy that may span a significant portion of the unlicensed band. Other devices that may operate in the 2.4 GHz band are IEEE 802.11g WLAN devices.

FIG. 3 shows a similar set of circumstances for a 5 GHz unlicensed band. There are actually three unlicensed frequency bands at 5 GHz in the United States. Two of these are contiguous and the third is not contiguous with the other two (which for simplicity is not considered in FIG. 3). In the 5 GHz unlicensed bands, there may be IEEE 802.11a WLAN devices operating in 8 different frequency sub-bands (channels), direct sequence spread spectrum (DSSS) cordless phones, and various radar devices.

Managing an unlicensed band where signals of multiple types may be simultaneously occurring involves minimizing interference and maximizing spectrum efficiency. Minimizing interference is expressed in terms of signal-to-noise ratio (SNR), bit error rate (BER), etc., and maximizing spectrum efficiency is expressed as data rate per bandwidth used per area (bps/Hz/m$^2$) or as a number of "satisfied" users, where satisfied is based on meeting certain performance criteria such as: data rate; latency; jitter; dropped sessions; and blocked sessions. The goal of spectrum management is to take evasive action to avoid interference when possible, detect and report interference when it occurs and make intelligent decisions to mitigate interference when it cannot be avoided. Moreover, spectrum management is flexible to handle different end user demands and the emergence of new devices and types of devices.

Figure 4:
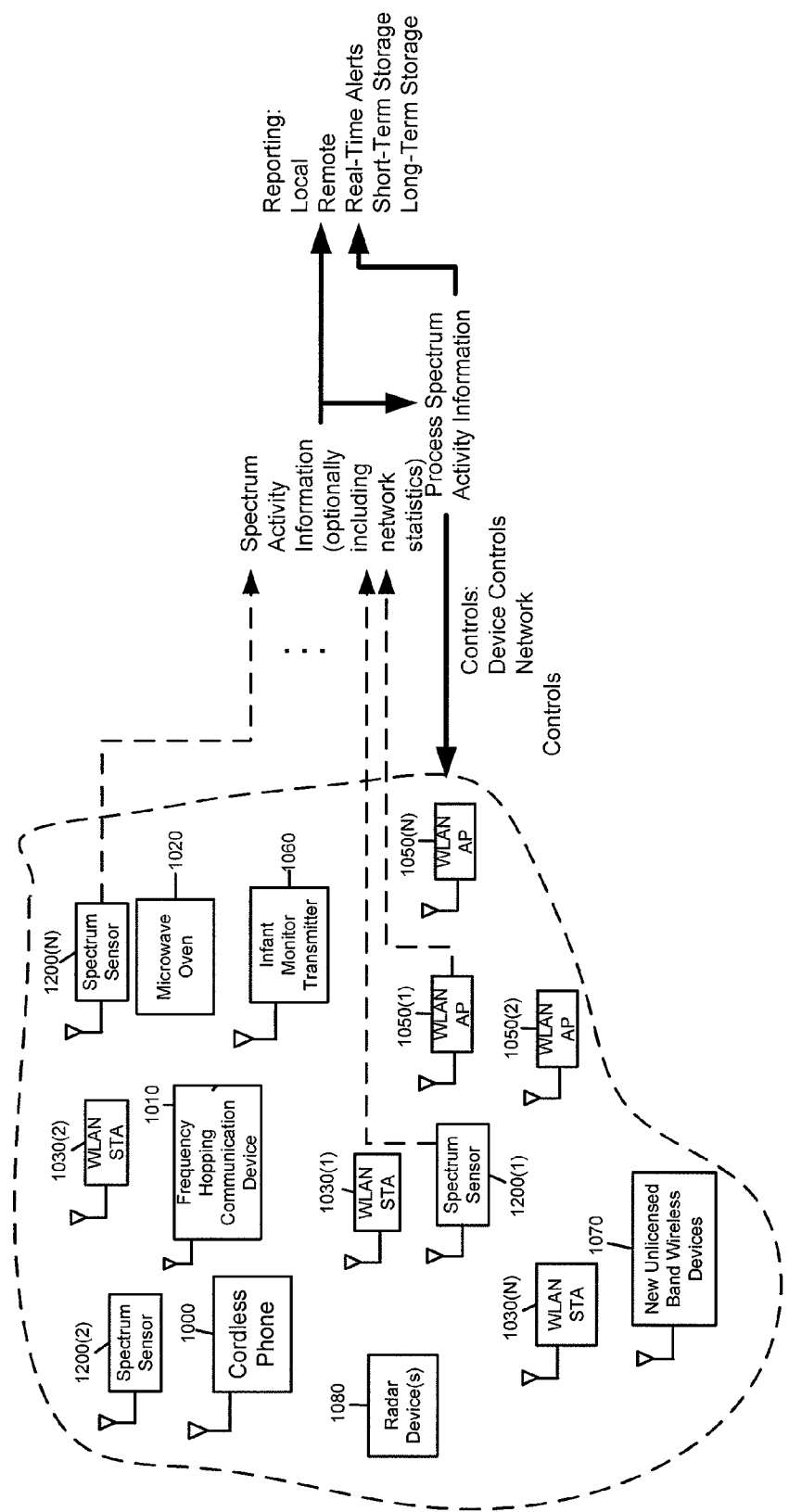
FIG. 4 is a diagram showing the general data flow of a spectrum management system.
Figure 5:
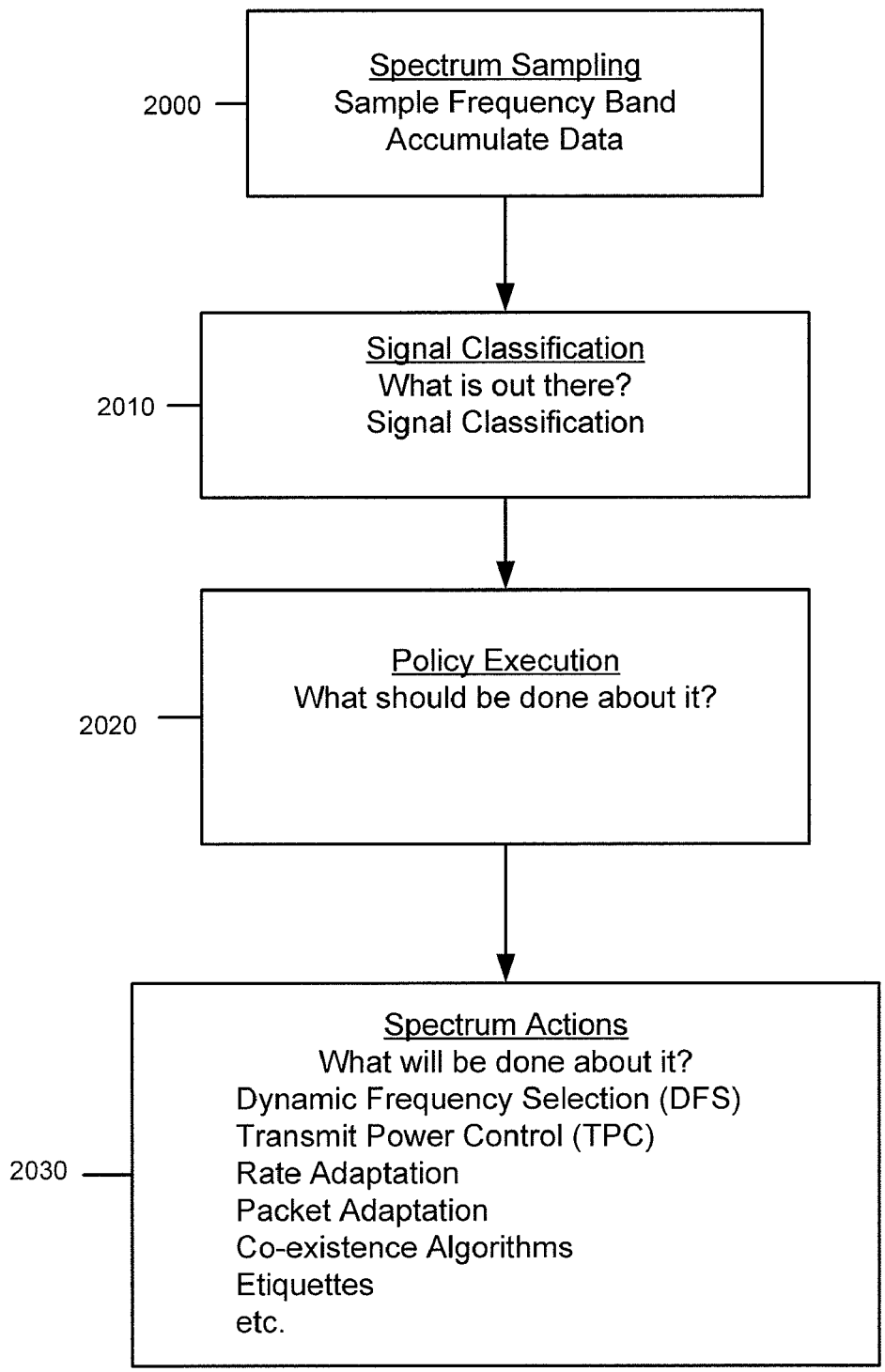
FIG. 5 is a general flow chart of a spectrum management process.

FIGS. 4 and 5 illustrate the general concepts associated with spectrum management of an unlicensed frequency band. Information about the activity in the frequency band, called spectrum activity information, is obtained from any one or several devices operating in the frequency having a certain degree of capability described hereinafter in conjunction with FIGS. 7 and 8. This is referred to as spectrum sampling in step 2000 and may involve sampling radio frequency energy in the entire frequency band for a time period or scanning sub-bands of the frequency band (on demand or periodically), to determine spectral-based and time-based activity in the frequency band. It is possible that each of the steps shown in FIG. 5 is performed within a radio device, e.g., a cognitive radio device. Alternatively, or in addition, spectrum activity information is gathered at multiple devices (such as at multiple spectrum sensors of a sensor overlay network) and the spectrum activity information processed at a computing device to generate reports and/or controls for one or more devices or network of devices (e.g., one or more APs) operating in the frequency band. The spectrum intelligence, whether gathered and used at the same device, or gathered from a sensor overlay network, may be used to interface spectrum aware reports or controls to a generalize network management application that manages wired and wireless networks in an enterprise, for example.

For example, as shown in FIG. 4, spectrum activity information is obtained at one or more APs 1050(1) to 1050(N) and/or at one or more spectrum sensors 1200(1) to 1200(N) of a sensor overlay network, or any other device equipped with certain capability described hereinafter. For example, three spectrum sensors are shown in FIG. 4 that would be positioned at various locations in a locality or premises. The spectrum activity information can be generated locally in a device capable of receiving signals in the frequency band, or raw data output by a radio receiver (or data converters coupled to the output of the receiver) in a device is coupled to another device not necessarily operating in the frequency band or residing local to those devices operating in the frequency band. The spectrum activity information may comprise information related to the activity in the frequency band as a whole, as well as statistics associated with a wireless network operating in the frequency band, such as IEEE 802.11x WLAN statistics, which may be obtained by an AP or STA operating in the WLAN.

Some cognitive radio devices may know the spectrum activity situation that affects only their surroundings/environment. Other higher intelligent devices may know the spectrum activity situation for themselves and for all of the devices connected to them. For example, a STA may have cognitive radio capability for itself, but the AP that it associates with has the intelligence of each of its STAs as well as its own. However, an AP may advise a STA about the spectrum situation at the AP or other STAs. Moving higher in the hierarchy, a server that manages multiple APs will have intelligence for the entire multiple AP network. When spectrum activity information is sent "upstream" for further processing, it may be distilled down to the necessary components or elements, or compressed.

The spectrum activity information (or the raw data used to generate it) is reported locally, or remotely, to other devices to display, analyze and/or generate real-time alerts related to activity in the frequency band. Moreover, the spectrum activity information can be accumulated and stored on a short-term basis (seconds or minutes) or a long-term basis (minutes to hours) for subsequent analysis. For example, the long-term storage of spectrum activity information may be useful for data mining and other non-real-time processing applications, described further hereinafter.

In addition, or separately from the reporting function, the spectrum activity information may be processed in a processor (local to or remote from the source devices of the actual spectrum activity information). The signal classification step 2010 involves processing the output of the spectrum sampling step to measure and classify signals based on characteristics such as power, duration, bandwidth, frequency hopping nature. The output of the signal classification step 2010 is data classifying the signals/devices detected. A classification output may be, for example, "cordless phone", "frequency hopper device", "frequency hopper cordless phone", "microwave oven", "802.11x WLAN device", etc. The signal classification information generated by processing the spectrum activity information may be reported, like the spectrum activity information, to local or remote locations, and used to generate real-time alerts. For example, when an interference condition (presence of another signal in the frequency band of operation, adjacent frequency channel of operation, etc., of a device or network of devices in the frequency band) is detected, a real-time alert may be generated to advise a network administrator about the condition. The real-time alert may take the form of a graphical display, audio, email message, paging message, etc. The alert may include recommendations to a user or to a network administrator to make adjustments to a device or network of devices operating in the frequency band.

The policy execution step 2020 involves determining what, if anything, should be done about the information output by the signal classification step 2010. For example, the policies dictate what spectrum actions in or controls of a communication device or network of devices to take on the basis of the output of the signal classification step 2010. The output of the policy execution step 2020 may include recommended actions to a network administrator, application program or system, to take in order to remedy or adjust for a situation. In addition, in processing the spectrum activity information, controls may be generated to adjust one or more operating parameters of devices or networks of devices operating in the frequency band. The spectrum actions step 2030 generates the particular controls to effect the actions. Examples of controls are: assigning a device to a different frequency sub-band or channel in the frequency band (dynamic frequency selection—DFS), network load balancing (on the basis of channel frequencies or time), adjusting the transmit power (transmit power control—TPC), adjusting the communication data rate, adjusting a parameter of the transmitted data packet, executing interference mitigation or co-existence algorithms, executing spectrum etiquette procedures, executing spectrum priority schemes, or re-assigning STAs to APs in a WLAN. Examples of interference mitigation algorithms are disclosed in commonly assigned and co-pending U.S. Patent Publication No. 20020061031, published, May 23, 2002. Other actions that can be taken include reporting spectrum activity information to users and administrators to enable human intelligence interaction to diagnose problems, optimize network settings and remove interference sources. Even when an adjustment is made automatically, an event report or alert may be generated to advise a network administrator of the condition. The controls may be at the specific device level to change an operational parameter of a device, or at a network level to change an operational parameter of a wireless network operating in the frequency band, such as by altering one or more operational parameters used by an IEEE 802.11x AP device, that affects how the STAs associated with that AP operate in that wireless network.

The control signals may be generated in a device that is actually operating in the frequency band (see FIGS. 11 and 12) or in a computing device that is remote from those devices operating in the frequency band. For this latter case, the network management station 1090 or the server 1055 (FIG. 1) may receive spectrum activity information and generate the control signals. The control signals are then in turn delivered back to one or more devices operating in the frequency band. For example, if the control signal pertains to a parameter of a WLAN AP or STA, then the control signal may be delivered by the network management station 1090 or server 1055 via the network connection to one or more APs (e.g., one or more of APs 1050(1) to 1050(N) shown in FIG. 1). The AP will receive the control signal and change one of its operational parameters. In addition, the control signal may be delivered to a particular STA by supplying the appropriate command to that STA's AP to cause the AP to transmit the parameter change information to the STA.

A Spectrum Management Architecture

Figure 6:
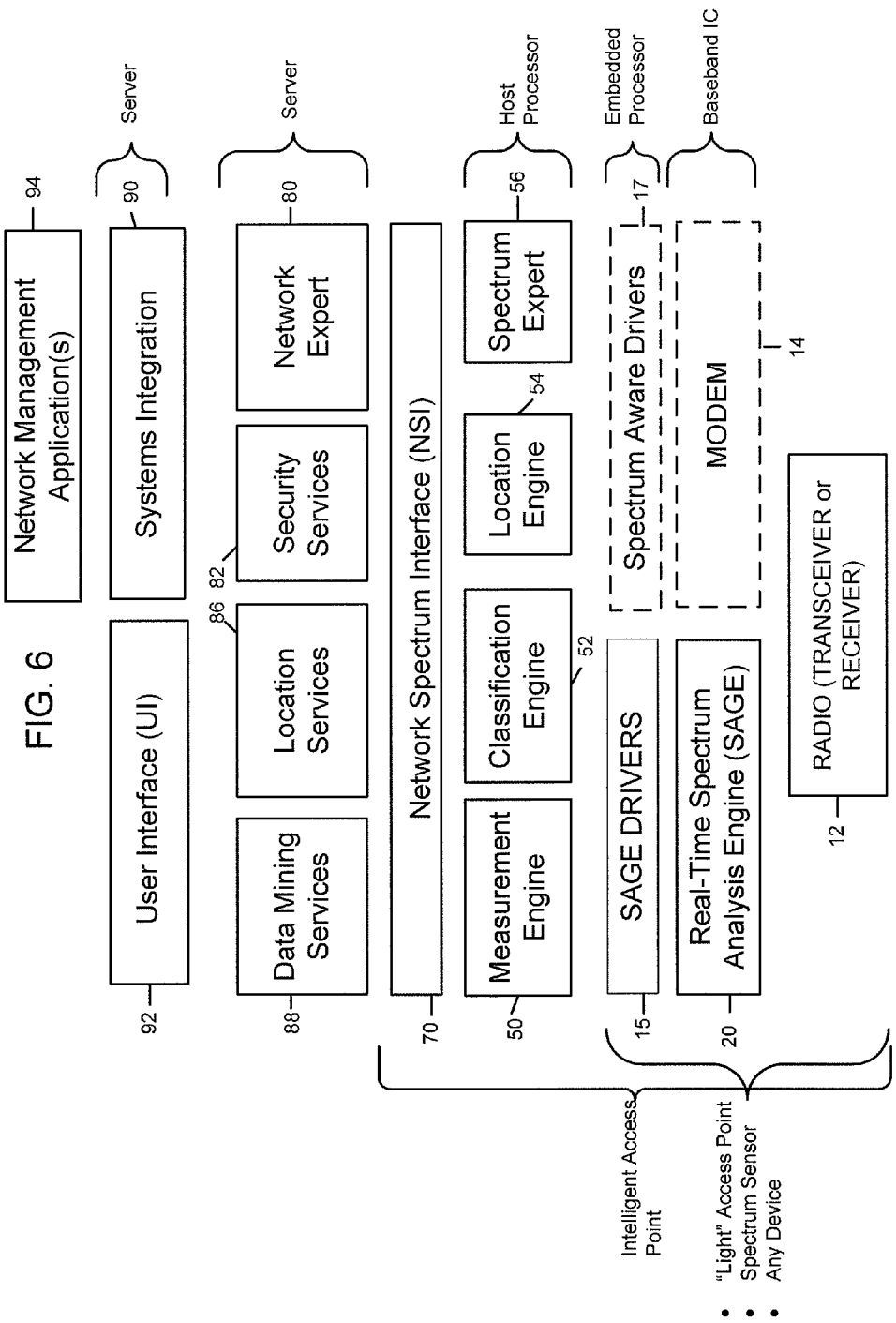
FIG. 6 is a block diagram showing various processes and a basic architecture of the spectrum management system.

Referring to FIG. 6, a spectrum management system architecture will be described. This architecture will be described beginning with the "lowest" level and working upwards to higher levels. The annotations on the sides of the blocks in FIG. 6 are meant to indicate where these processes may be performed, which will become more apparent with reference to additional figures. At the lowest level is the hardware that resides in a device which operates in the frequency band and drivers associated with the hardware. Thus, the level may be referred to hereinafter as the hardware/driver level. Examples of these devices (cognitive radio devices) are referred to above in conjunction with FIG. 1, and an exemplary device described in more detail in FIG. 11. There is at least a real-time spectrum analyzer (SAGE) 20 and a radio receiver or radio transceiver (hereinafter "radio") 12 in the device in order to receive and sample radio frequency energy in the frequency band. The SAGE 20 may be implemented in hardware or software and in conjunction with the radio 12, processes signals received by the radio 12 operating in either a narrowband mode or a wideband mode. In a wideband mode, the radio receiver/transceiver 12 may downconvert signals across the entire frequency band of interest during any given time interval. If the radio receiver/transceiver 12 is operated in a narrowband mode, then the radio receiver (or transceiver) may be tuned to different sub-bands across the frequency band to obtain information for the entire band. Depending upon the particular device, there may also be a modem 14 that is used to perform baseband signal processing according to a particular communication standard.

Also at the lowest level there is a set of drivers associated with the SAGE 20, radio transceiver/receiver 12 and the modem 14. The SAGE drivers 15 interface spectrum activity information generated by the SAGE 20 to higher level processes, and interface controls to the SAGE 20. The spectrum aware drivers 17 respond to manually generated or automatically generated controls in order to change an operational parameter of a device or network of devices. For example, if the device is an IEEE 802.11 AP, then a change in an operational parameter may affect a change in the operation of the AP as well as the STAs that are associated with that AP. The spectrum aware drivers 17 may be capable of responding to control signals to change an operational parameter that is not necessarily required by the rules of a particular communication protocol, and may take the form of a specially designed lower medium access control (LMAC) layer associated with a particular communication standard, such as IEEE 802.11, that has necessary controls points for adjusting those parameters.

The spectrum aware drivers 17 may receive commands from interference algorithms at a higher level to adjust a transmit rate, fragmentation threshold, etc. In addition, the spectrum aware drivers 17 may receive commands to perform dynamic packet scheduling to avoid transmitting a packet that may interfere in time and frequency with a signal from another device, dynamic packet fragmentation and encryption of data "on-the-fly". Furthermore, the spectrum aware drivers 17 may receive commands to change a (center frequency) of operation, bandwidth of operation, data rate, transmit power, etc. The spectrum aware drivers 17 generate the appropriate control signals to modify any of these operational parameters in the appropriate hardware or firmware in the radio device.

Figure 7:
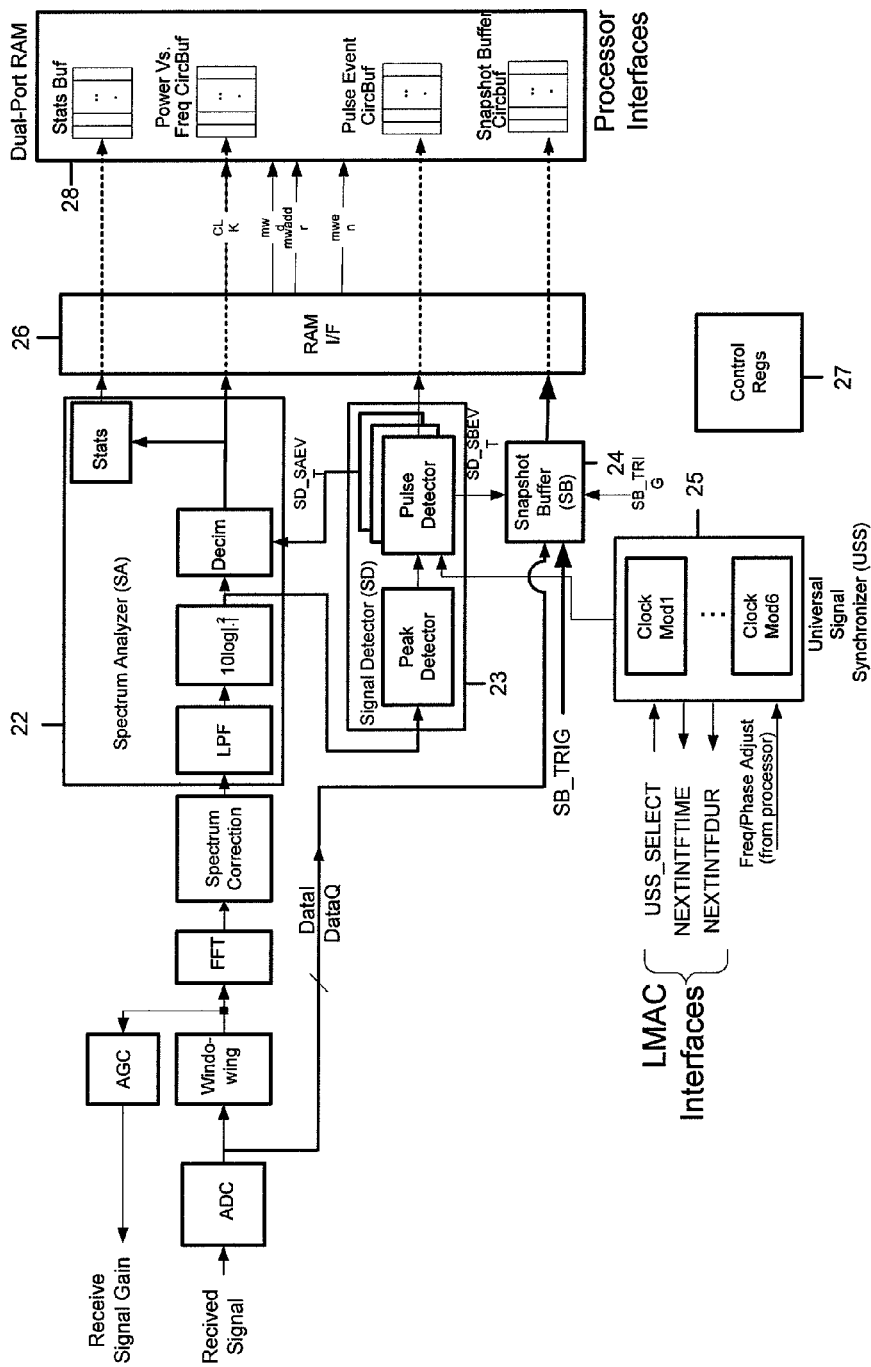
FIG. 7 is a block diagram of a real-time spectrum analysis component (hereinafter referred to as SAGE) useful in the spectrum management system.

With reference to FIG. 7, the SAGE 20 will be briefly described. The SAGE is more fully described in commonly assigned co-pending U.S. application Ser. No. 10/246,365 filed Sep. 18, 2002, entitled "System and Method for Real-Time Spectrum Analysis in a Communication Device," the entirety of which is incorporated herein by reference.

The SAGE 20 obtains real-time information about the activity in a frequency band, and may be implemented as a VLSI accelerator, or in software. The SAGE 20 comprises a spectrum analyzer (SA) 22, a signal detector (SD) 23, a snapshot buffer (SB) 24 and a universal signal synchronizer (USS) 25.

The SA 22 generates data representing a real-time spectrogram of a bandwidth of RF spectrum, such as, for example, up to 100 MHz using a Fast Fourier Transform (FFT) process. As such, the SA 22 may be used to monitor all activity in a frequency band, such as the 2.4 GHz or 5 GHz bands. As shown in FIG. 7, the data path leading into the SA 22 comprises of an automatic gain control block (AGC) block, a windowing block, a NFFT=256-point complex FFT block, and a spectrum correction block. The windowing and FFT blocks may support sampling rates as high as 120 Msps (complex). The windowing block performs pre-FFT windowing on the I and Q data using either a Hanning or rectangular window. The FFT block provides (I and Q) FFT data for each of 256 frequency bins that span the bandwidth of frequency band of interest. For each FFT sampling time interval, the FFT block outputs M (such as 10) bits of data for each FFT frequency bin, for example, 256 bins. The spectrum correction algorithm corrects side tone suppression and DC offset.

Internal to the SA 22 are a lowpass filter (LPF), a linear-to-log converter, a decimator and a statistics block. The LPF performs a unity-gain, single-pole lowpass filtering operation on the power values of the signal at each FFT frequency. Using $P_{ff}(k)$ to denote the power value of signal at FFT frequency f(k), the lowpass filter output $P_{lpf}(k)$ is updated once per FFT period as follows: $P_{lpf}(k,t) = \alpha_1 \cdot P_{lpf}(k,t) + (1-\alpha_1) \cdot P_{lpf}(k,t-1)$, $1 \leq k \leq 256$, where $\alpha_1$ is a parameter specifying the LPF bandwidth. The linear-to-log block at the output of the FFT computes the decibel value $P_{dB}(k)=10*\log(|P_{lpf\_td}(k)|)$ for each FFT value $P_{lpf\_td}(k)$ (in dBFS, i.e., dB from full-scale on the ADC); the decibel value is subsequently converted to an absolute power level (in dBm) by subtracting the receiver gain control from the dBFS value. PDB(k) is the data field that corresponds to the power at a plurality of frequency bins k. The stats block accumulates and stores the following statistics in the stats buffer of a dual port RAM (DPR) 28 via a RAM interface I/F 26: duty cycle vs. frequency during a period of time; average power vs. frequency during a period of time; maximum (max) power vs. frequency during a period of time; and number of peaks during a period of time. The stats block gives the basic information about other signals surrounding a device operating a SAGE 20. Duty cycle is a running count of the number of times the power at a FFT frequency bin exceeds a power threshold. Maximum power at a particular FFT frequency bin is tracked over time. The peaks histogram tracks the number of peaks detected over time intervals.

The stats block has modules to accumulate statistics for power, duty cycle, maximum power and a peaks histogram. Statistics are accumulated in the DPR over successive FFT time intervals. After a certain number of FFT intervals, determined by a configurable value stored in the spectrum analyzer control registers, an interrupt is generated to the processor so that the processor reads out the stats from the DPR into its memory. For example, the stats are maintained in the DPR for 10,000 FFT intervals before the processor reads out the values from the DPR.

To accumulate (average) power stats, the PDB(k) data field generated is supplied to the stats block. It may be decimated by an optional decimator. The status block adds the power at each frequency bin for a previous time interval is added to the power at that frequency bin for the current time interval. The running power sum at each frequency bin is output to the DPR 28 as a SumPwr stat, also called the average power stat.

A duty count stat is generated by comparing the PDB(k) with a power threshold. Each time the power at a frequency bin exceeds the power threshold, the previous duty count statistic for that frequency bin is incremented, that corresponds to the duty count stat (DutyCnt), which again, is a running count of the number of times the power at a FFT frequency exceeds the power threshold.

A maximum power stat (MaxPwr) is tracked at each frequency bin. The current maximum power value at each frequency k is compared to the new power value at each frequency k. Either the current power maximum or the new PDB(k) is output, depending on whether the new PDB(k) exceeds the current power maximum at the frequency.

The number of peaks that are detected by the peak detector during each FFT time interval is counted, buffered and stored in a histogram register for output to the DPR 28.

Each of these statistics is described in more detail hereinafter.

The SD 23 identifies signal pulses in the received signal data, filters these signals based on their spectral and temporal properties, and passes characteristic information about each pulse to the dual port RAM (DPR) 28. The SD 23 also provides pulse timing information to the USS 25 block to allow the USS 25 to synchronize its clocks to transmissions to/from other devices (for example, to eliminate interference with QoS-sensitive ULB devices such as cordless phones, Bluetooth headsets, video-over-802.11 devices, etc.). The SD 23 comprises a peak detector and several pulse detectors, e.g., 4 pulse detectors. The peak detector looks for spectral peaks in the FFT data at its input, and reports the bandwidth, center frequency and power for each detected peak. The output of the peak detector is one or more peaks and related information. Each pulse detector detects and characterizes signal pulses based on input from the peak detector.

The peak detector detects a peak as a set of FFT points in contiguous FFT frequency bins, each above a configured minimum power level. Once per FFT interval, the peak detector outputs data describing those frequency bins that had a FFT value above a peak threshold and which frequency bin of a contiguous set of frequency bins has a maximum value for that set. In addition, the peak detector passes a power vs.

frequency bin data field for each FFT interval. This can be represented by the pseudo code (where k is the frequency bin index):

```
PDB_diff(k)= PDB(k) - SD_PEAKTH ;
If(PDB_diff(k) ≧ 0 )
    PDB_peak(k)= PDB(k) ;
    PEAKEN(k)= 1 ;
Else
    PDB_peak(k)= 0 ;
    PEAKEN(k)= 0 ;
end
```

The peak outputs the bandwidth, center frequency and power for each detected peak.

A pulse detector calculates relative thresholds based on configuration information, and checks whether a peak exceeds the relative thresholds. If a peak exceeds the relative threshold, it defines the peak as a pulse candidate. Once a pulse candidate is found, the pulse detector compares the identified pulse candidate with a pulse definition such as ranges for power, center frequency, bandwidth and duration (defined by the pulse detector configuration information). After matching a pulse candidate with a defined pulse associated with the configuration information, the pulse detector declares that a pulse has been detected and outputs pulse event data (power, center frequency, bandwidth, duration and start time) associated with the detected pulse.

The SB 24 collects a set of raw digital signal samples of the received signal useful for signal classification and other purposes, such as time of arrival location measurements. The SB 24 can be triggered to begin sample collection from either the SD 23 or from an external trigger source using the snapshot trigger signal SB_TRIG. When a snapshot trigger condition is detected, SB 24 buffers up a set of digital samples and asserts an interrupt to a processor. The processor may then perform background-level processing on the samples for the purposes of identifying or locating another device.

The USS 25 detects and synchronizes to periodic signal sources, such as frequency hopping signals (e.g., Bluetooth™ SCO and certain cordless phones). The USS 25 interfaces with the spectrum aware drivers 17 (FIG. 6) that manage scheduling of packet transmissions in the frequency band according to a medium access control (MAC) protocol, such as that provided by, for example, the IEEE 802.11 communication standard. The USS 25 includes one or more clock modules each of which can be configured to track the clock of a signal identified by a pulse detector in the SD 23.

A processor (not shown) interfaces with the SAGE 20 to receive spectrum information output by the SAGE 20, and to control certain operational parameters of the SAGE 20. The processor may be any suitable microprocessor that resides either on the same semiconductor chip as the SAGE 20, or on another chip. The processor interfaces with the SAGE 20 through the DPR 28 and the control registers 27.

The control registers 27 include registers to enable a processor to configure, control and monitor the SAGE 20. There is a control/status register, an interrupt enable register, an interrupt flags register, spectrum analyzer control registers, signal detector control registers, snapshot buffer control registers and USS control registers.

Referring back to FIG. 6, at the next higher level, there is a measurement engine 50, a classification engine 52, a location engine 54 and a spectrum expert 56. These processes may be executed by software. The spectrum activity information used by any of the processes 50, 52 and 54 may be sourced from a communication device operating in the frequency band and/or from one or more spectrum sensors (FIG. 1) positioned in various locations of a region of interest, such as around the periphery and at other locations of an business or other facility. Moreover, the measurement engine 50, classification engine 52 and spectrum expert 56 may be performed locally in a device that operates in the radio frequency band, such as an AP, or remotely in a server computer, such as the server 1055 or network management station 1090 shown in FIG. 1.

The measurement engine 50 collects and aggregates output from the SAGE 20 and normalizes the data into meaningful data units for further processing. Specifically, the measurement engine 50 accumulates statistics for time intervals of output data from the SAGE 20 to track, with respect to each of a plurality of frequency bins that span the frequency band, average power, maximum power and duty cycle as well as other statistics described hereinafter. In addition, the measurement engine 50 accumulates pulse event data for signal pulses output by the SAGE that fit the configured criteria. Each pulse event may include data for power level, center frequency, bandwidth, start time, duration and termination time. The measurement engine 50 may build histograms of signal pulse data that are useful for signal classification, examples of which are described hereinafter. Finally, the measurement engine 50 accumulates raw received signal data (from the snapshot buffer of the SAGE 20) useful for location measurement in response to commands from higher levels in the architecture. The measurement engine 50 may maintain short-term storage of spectrum activity information. Furthermore, the measurement engine 50 may aggregate statistics related to performance of a wireless network operating in the radio frequency band, such as an IEEE 802.11 WLAN. Exemplary output of the measurement engine 50 is described hereinafter in conjunction with the network spectrum interface. Examples of graphical displays of the output of the measurement engine 50 are shown in FIGS. 21-25. Moreover, a higher level application may respond to a user command (through a suitable user interface) to monitor data and statistics of the measurement engine to determine whether there is a performance degradation of a device or network of devices. Certain actions can be recommended or automatically taken based on a determine cause of the performance degradation.

In response to requests from other software programs or systems (such as the network spectrum interface described hereinafter, the classification engine 52 or the location engine 54), the measurement engine 50 responds to configure the SAGE 20 (through the SAGE drivers 15) and or radio 12, according to the type of data requested, runs SAGE 20 with those configurations, and responds with one or more of several types of data generated by processing the data output by the SAGE 20.

The classification engine 52 compares outputs of the SAGE 20 (accumulated by the measurement engine 50) against data templates and related information of known signals in order to classify signals in the frequency based on energy pulse information detected by the SAGE. The classification engine 52 can detect, for example, signals that interfere with the operation of one or more devices (e.g., occupy or occur in the same channel of the unlicensed band as a device operating in the band). The output of the classification engine 52 includes types of signals detected in the frequency band. A classification output may be, for example, "cordless phone", "frequency hopper device", "frequency hopper cordless phone", "microwave oven", "802.11x WLAN device", etc. The classification engine 52 may compare signal data supplied to it by the measurement engine against a database of information of known signals or signal types. The signal classification database may be updated with the reference data for new devices that use the frequency band. In addition, the classification engine 52 may output information describing one or more of the center frequency, bandwidth, power, pulse duration, etc. of the classified signal, which is easily obtained directly from the signal detector output of the SAGE. This may particularly useful for a classified signal that is determined to interfere with operation of other devices in the frequency band.

Examples of signal classification techniques are described in commonly assigned co-pending U.S. application Ser. No. 10/246,364, filed Sep. 18, 2002, entitled "System and Method for Signal Classification of Signals in a Frequency Band," the entirety of which is incorporated herein by reference. These signal classification techniques that may be used are based on pulse histograms, pulse time signatures and other custom algorithms, examples of which are described in the aforementioned pending patent application, and are briefly described in conjunction with FIGS. 8 and 9. It should be understood that other signal classification techniques may be known in the art.

Figure 8:
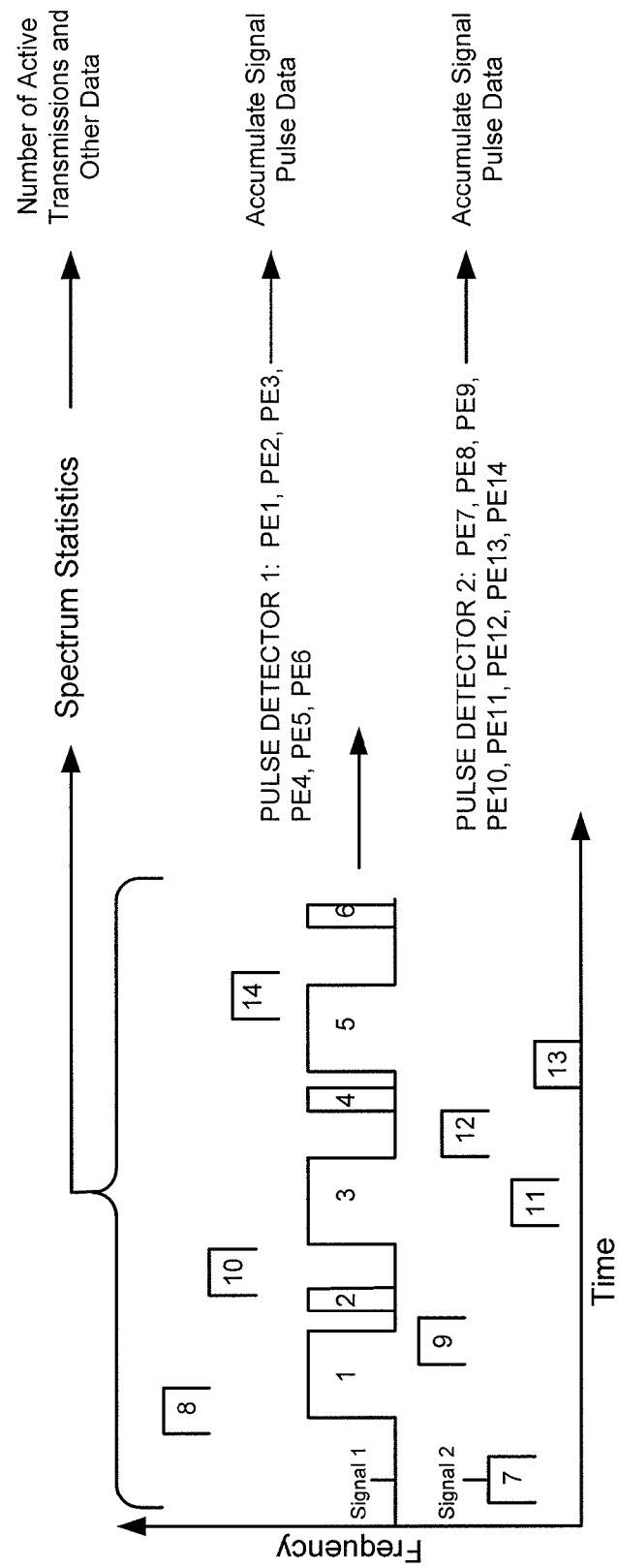
FIG. 8 is a diagram showing how the output of the SAGE can be used to classify signals detected in the frequency band.

FIG. 8 illustrates exemplary signal pulses of signals that may be present in the frequency band. There is IEEE 802.11b signal activity that consists of pulses 1-6. Pulses 1, 3 and 5 are the forward channel 802.11b transmissions and pulses 2, 4 and 6 are acknowledgement signals. There is also a frequency hopping signal, such as a Bluetooth™ SCO signal comprising pulses 7-14. The timing, strength and duration of the signals are not shown at precise scale. Pulse event data is generated for signal pulses 1-6, for example, by a pulse detector configured appropriately. Pulse event information is generated for signal pulses 7-14 by another pulse detector configured appropriately. The signal pulse data is accumulated over time for the two types of signals. The signal pulse data may be accumulated into various histograms. In addition, spectrum analysis information may be derived from the signal activity in the frequency band, and this information can be used to generate, for example, the number of different transmissions that appear to be present in the frequency band at a given time period by counting the number of power values (above a threshold) at different frequencies in the band during the same time interval.

Examples of the pulse event data that is generated for exemplary pulses shown in FIG. 8 are provided below.

| Pulse 1 | |
|---|---|
| SDID: | 1 (identifying pulse detector 1) |
| Pulse Bandwidth: | 11 MHz |
| Center Frequency: | 37 MHz |
| Pulse Duration: | 1.1 msec |
| Power: | −75 dBm |
| Pulse 2 | |
| SDID: | 1 |
| Pulse Bandwidth: | 11 MHz |
| Center Frequency: | 37 MHz |
| Pulse Duration: | 200 microsec |
| Power: | −60 dBm |
| Pulse 3 | |
| SDID: | 1 |
| Pulse Bandwidth: | 12 MHz |
| Center Frequency: | 37 MHz |
| Pulse Duration: | 1.1 msec |
| Power: | −75 dBm |
| Pulse 4 | |
| SDID: | 1 |
| Pulse Bandwidth: | 11 MHz |
| Center Frequency: | 37 MHz |

| -continued | |
|---|---|
| Pulse Duration: | 200 microsec |
| Power: | −60 dBm |
| Pulse 5 | |
| SDID: | 1 |
| Pulse Bandwidth: | 13 MHz |
| Center Frequency: | 37 MHz |
| Pulse Duration: | 18 msec |
| Power: | −75 dBm |
| Pulse 6 | |
| SDID: | 1 |
| Pulse Bandwidth: | 11 MHz |
| Center Frequency: | 37 MHz |
| Pulse Duration: | 200 microsec |
| Power: | −60 dBm |

Though not listed above, also included in the information for each pulse is the start time of a pulse, thereby enabling computation of the time between consecutive pulses detected by a pulse detector.

The pulse event data for pulses 7-14 are very similar, with the exception of the center frequency. For example, pulses 7-14 may have a pulse bandwidth of 1 MHz, a pulse duration of 350 microsec, whereas the center frequency will vary across nearly all of the 2400 MHz to 2483 MHz frequency band. The SDID for pulses 7-14 is 2, since pulse detector 2 is configured to detect these types of pulses, for example.

Figure 9:
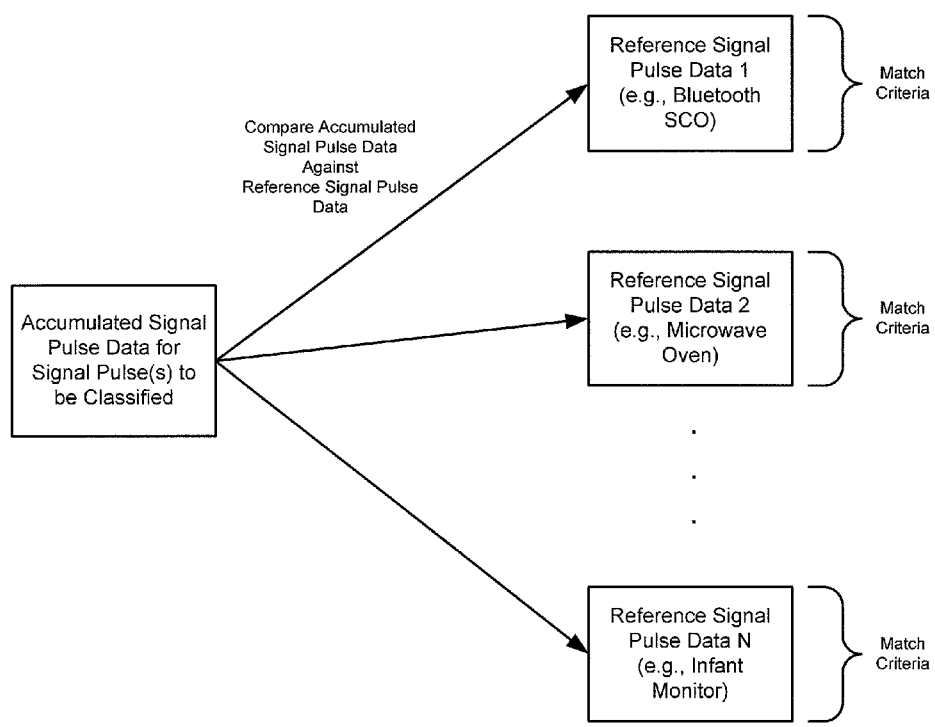
FIG. 9 is a general flow chart of a signal classification process useful in the spectrum management system.

FIG. 9 generally illustrates how accumulated signal pulse data is compared against reference data. The accumulated signal pulse data for the signals to be classified are compared against reference or profile signal pulse data for known signals. Each histogram of the accumulated signal pulse data is compared against a like-kind histogram of the reference signal pulse data. The degree of match between the accumulated signal pulse data and the reference signal pulse data may be adjustable and for certain reference signal pulses, a very close match on certain pulse data must be found, as compared to other signal pulse data. To this end, each reference data set may have its own match criteria that must be satisfied in order to ultimately declare a match. For example, when comparing accumulated signal pulse data with reference data for a Bluetooth™ SCO signal, there must be very precise matches between the pulse duration, bandwidth and time between pulses histograms in order to declare a match. A scoring system may be used, where a numeric value is assigned to the comparison results between each signal characteristic. For certain signal types, if the total numeric value (e.g., total score) is at least as great as a certain value, then a match may be declared. An additional constraint may also require that certain signal characteristics must have a minimum degree of match.

The reference data for the variety of signals that may use the frequency band may be obtained from actual measurement and analysis of those devices, and/or from a database of information provided by a regulatory authority, such as a Federal Communication Commission in the U.S. The FCC may maintain and make publicly available a database of transmission parameters for each device permitted to operate in the frequency band. Examples of such parameters are:

Frequency range of operation

Spectrum channelization (bandwidth) and characterization:

Frequency-hopping: hop rate and hop center frequencies

Stationary channel: channel center frequencies

Symbol rates

Modulation modes (e.g., QPSK, OFDM, QAM, . . . )

Transmit spectrum masks
Transmit power levels
Transmit on/off time characterizations
Minimum and maximum "on" times
Minimum and maximum "off" times
Slot times, if appropriate, between channel accesses The comparison step may involve comparing pulse timing signatures of known signals against the accumulated signal pulse data (typically over relatively short periods of time) to determine if there is a match within certain predetermined and adjustable tolerances. The visual paradigm is as if sliding a pulse timing template of a known signal along the accumulated pulse data of an unknown signal to determine if there is a sufficient match. Pulse timing signatures can provide a distinctive representation of a device or class of devices. They are useful to classify signals that have very rigorous timing attributes.

The accumulated pulse data for a particular pulse may suggest that it is of a particular type, but it is not necessarily determinative. For example, suggestive characteristics of an 802.11 signal is the presence of a signal pulse with a very short duration, no more than 200 microsec and a time between pulses of no more than 20 microsec. However, the additional data (center frequency and bandwidth) is not sufficient to confirm that it is an 802.11 signal. Therefore, pulse timing signature analysis (i.e., pattern) is performed on the pulse data. For example, the pulse timing analysis for an 802.11 signal is focused on identifying two signal pulses on the same center frequency separated from each other by no more than 20 microsec, and where the second signal pulse (an 802.11 ACK pulse) is no more than 200 microsec. The duration of the first pulse for an 802.11 signal is not particularly relevant to this analysis.

A similar analysis may be performed on the pulse data against pulse signature information for a Bluetooth™ SCO signal in which activity consists of two bursts of energy (pulses) very close in time. Energy associated with a first pulse may occur at one frequency in the band, and energy associated with a second pulse may occur at another frequency in the band, separated from the first pulse by a time interval that recurs on a consistent basis. In fact, the Bluetooth™ SCO signal is representative of many unlicensed band devices that employ a frequency hopping sequence and involve a transmission by a first device (e.g., a "master") followed a precise period of time later by a transmission by a second device (e.g., a "slave"). The time period between the leading edge or trailing edge of the first pulse and the leading edge of the second pulse is commonly very consistent. Both pulses may be relatively short in duration. In addition, the time period between the leading edge of the second pulse and the leading edge of the next first pulse may be very consistent. A Bluetooth™ ACL transmission is quasi-periodic in the sense that sometimes it looks periodic and has timing signatures similar to Bluetooth™ SCO transmissions, and sometimes it does not.

The pulse timing signature analysis for a frequency hopping signal is slightly different if the spectrum information is derived from sampling of only a portion of the frequency band, rather than the entire band that the signal may hop in. For example, while a frequency hopping signal is just as likely to occur anywhere in a frequency band, such as the 2.4 GHz band, if data for only a 20 MHz portion of the band were provided as input to the classification process, then the signal pulse data would show a relatively smaller percentage of pulses from the frequency hopping signal. The pulse timing signature analysis would be adjusted accordingly.

Classifying a signal using pulse timing signature analysis is particularly useful when more than one device is transmitting in the frequency band. Pulse timing signature information for a signal can be represented by data describing the characteristics of a pulse, such as pulse duration, time between pulses, etc. This information can then compared against similar pulse timing signature information to determine whether there is a match.

Both the measurement engine 50 and the classification engine 52 may generate spectrum events that are reported to higher level software programs or systems. For example, based on an analysis of the spectrum activity information generated by the SAGE 20, reports can be made on specific types of events, such as a Bluetooth™ device being turned on or off in the frequency band, or a cordless telephone going active. These spectrum events are described further hereinafter.

Referring back to FIG. 6, the location engine 54 computes the physical location of devices operating in the frequency band. One example of a location measurement technique involves using snapshot buffer data collected by the measurement engine 50 to perform time difference of arrival (TDOA) measurements at two or more known locations (such as at two or more STAs) of a signal transmitted by the device to be located and another reference signal (such as an AP) to determine a location of a variety of devices (such as interferers) operating in the region of the frequency band. Sometimes simply moving an interferer to a different location can resolve transmission problems that another device or network of devices may be experiencing. The location engine 54 may coordinate measurements obtained from multiple locations in the network. An example of a location engine is disclosed in commonly assigned co-pending U.S. Application No. 60/319,737, filed Nov. 27, 2002, entitled "System and Method for Locating Wireless Devices in an Unsynchronized Wireless Network," the entirety of which is incorporated herein by reference. Numerous other techniques to determine the location of wireless radio communication devices using TDOA and time of arrival (TOA) measurements are known in the art and may be used as well for the location engine.

The location engine 54 may alternatively reside in software "above" the network spectrum interface (NSI) 70. When an interference condition in the frequency band is detected, the spectrum expert 56 or network expert 80 may command the location engine 54 to physically locate the source of the interferer. The output of the location engine 54 may include position information, power level, device type and/or device (MAC) address. The security services 82 may command the location engine 54 to locate a rogue device that may present a possible security problem.

The spectrum expert 56 is a process that optimizes operation of devices operating in the frequency band, given knowledge about the activity in the frequency band obtained by the measurement and classification engines. For example, the spectrum expert 56 processes data from the SAGE 20 and optionally statistics from a particular wireless network operating in the frequency band, such as an IEEE 802.11x network, in order to make recommendations to adjust parameters of a device, or to automatically perform those adjustments in a device. The spectrum expert 56 may be a software program that is executed, for example, by a host device coupled to an AP, a server or a network management station (FIG. 1). Parameters that can be adjusted (manually or automatically) based on output of the spectrum expert 56 include frequency channel, transmit power, fragmentation threshold, RTS/CTS, transmit data rate, CCA threshold, interference avoidance, etc. Other examples of interference mitigation techniques are described in commonly assigned and co-pending U.S. application Ser. No. 10/248,434, filed Jan. 20, 2003, and entitled "Systems and Methods for Interference Mitigation with Respect to Periodic Interferers in Short-Range Wireless Applications," the entirety of which is incorporated herein by reference. The spectrum expert 56 may operate on triggers for alert conditions in the frequency band, such as detection of a signal that interferes with the operation of a device or network of devices operating in the frequency band, to automatically report an alert, and/or adjust a parameter in a device in response thereto. For example, the spectrum expert 56 may operate to control or suggest controls for a single WLAN AP.

The spectrum expert 56 is the spectrum intelligence decision maker. The spectrum expert 56 (and/or network expert described hereinafter) may determine what alerts and/or controls are generated based on spectrum policy information. Spectrum policy information is a body of information that, based on conditions determined to be occurring in the frequency band, defines corresponding alerts and/or controls. This body of information may be updateable to account for new devices that operate in the frequency band and/or changing regulations concerning requirements for the frequency band. Moreover, the spectrum expert 56 can decide to act, and how to act, or decide not act. For example, the spectrum expert may make a decision either to interfere with another signal or not to interfere. Examples of how the spectrum policies may be applied are described hereinafter.

The spectrum expert 56 may use the spectrum activity information to intelligently control IEEE 802.11 WLAN parameters in an AP:

1. Measuring received signal quality together with information about an interfering signal may call for adjusting a transmit data rate of the AP and/or STAs.

2. Tracking packet errors and SAGE pulse data may call for adjusting a fragmentation threshold.

3. Detecting in packet sequence statistics indicating a hidden node may call for executing an RTS/CTS sequence. The RTS/CTS sequence is used as a "delivery confirmation system" and is turned off when possible, in low noise environments, since it slows transmissions, but it can be activated when necessary, such as to find a STA.

4. Using SAGE spectrum analysis data, an AP may be controlled to select a new cleaner channel.

5. Using SAGE related data and signal classification data indicating an interferer may call for adjusting the transmit power of an AP.

6. Executing an action dependent on the particular device type or even brand and device model identified (through snapshot buffer and other spectrum data).

Generally, the spectrum expert 56 may be executed in a radio device that controls itself of controls the behavior of several other radio devices associated with it (as is the case with an AP). These types of decisions and controls are referred to as local policy decisions or controls in that they affect a device or a particular limited group of devices. The network expert 80, described hereinafter, makes broader type policy decisions and controls such as those that affect an entire network of devices (e.g., multiple APs and their associated STAs in WLAN).

A sensor overlay network comprised of one or more spectrum sensors 1200(1) to 1200(N) may generated spectrum activity information that is supplied to a server that controls a device in the frequency band. For example, signal detection is performed at the sensor level, and measurement and accumulation may be performed either at the sensor level or at the AP's host processor. The spectrum expert 56 is executed on the host processor of the host device that is connected to an AP and used to control that AP. Signal detection is performed at the sensor level, and measurement and accumulation may be performed either at the sensor level or at the AP's host processor.

The abstract level where the measurement engine 50, classification engine 52 and spectrum expert 56 reside may be referred to hereinafter as a "spectrum" or "spectrum aware" level.

The NSI 70 shown in FIG. 6 interfaces the measurement engine 50, classification engine 52, location engine 54 and spectrum expert 56 processes (and the lower level drivers) to higher level services. The NSI 70 serves as an application programming interface (API) that can be implemented by application programs (on one or more computer readable media) to access the spectrum analysis functions of these processes. End user on-demand commands to check the spectrum knowledge or activity information at a particular device may be received from an application program and the NSI translates the commands into a request for a particular spectrum analysis function from one of the processes. It is also possible that there may be interaction between and among the measurement engine 50, classification engine 52, location engine 54 and spectrum expert 56 using an interface similar to the NSI 70. Moreover, the physical location of the blocks in FIG. 6 is not meant to limit the possible logical arrangement of these functions, applications or processes. For example, NSI may be used to interface any one or more of the blocks shown in FIG. 6 with the spectrum analysis functions of the measurement engine, classification engine and/or spectrum expert. Moreover, a less formal interface or connection may exist between any two processes shown in FIG. 6.

The abstract level just above the NSI 70 may be referred to as a "network" level. At the network level, there may be a variety of services. For example, there are a network expert 80, a security service 82, location services 86 and data mining services 88. The software sitting above the NSI, though identified and described separately hereinafter, can also be referred to collectively and generically as network management software (NMS) which may be executed by the network management station 1090 (FIG. 1), for example.

The network expert 80 is similar to the spectrum expert 56, but it operates at a higher level, such as across multiple WLAN APs, such as APs 1050(1) to 1050(N) and each of their associated STAs as shown in FIG. 1. The network expert 80 optimizes networks based on deployment cost, capacity and QoS. The network expert 80 may make suggestions to a network administrator, or automatically adjust parameters in one or more wireless networks. For example, the network expert 80 may control or suggest parameters for: placement of an AP and of an AP's antennas, AP channel assignments, load balancing of STAs across APs (reassign a STA to a different AP based on network loading conditions), transmit power and RTS/CTS parameters. In addition, the network expert may notify a network administrator or network management application about interference detected anywhere in the network. The network expert 80 may optimize coverage for devices in wireless networks by assigning a STA to the AP that would offer the best throughput and reliable communication link. The spectrum activity information processed by the network expert may be sourced from an AP operating in the frequency band or from one and/or more spectrum sensors positioned in various locations of a region of interest, such as around the periphery and at other locations of a business enterprise or other facility. The network expert 80 may also have triggers to generate alerts if a particular condition is detected. A WLAN AP that has spectrum monitoring capabilities (as well as control capabilities) can add to its spectrum knowledge any spectrum information supplied to it by any WLAN STA associated with it. The network expert 80, however, may have an even more global view of the spectrum activity of the entire region of unlicensed band operation, which may include multiple wireless networks of the same or different varieties (e.g., IEEE 802.11 WLAN, WPAN, Bluetooth™, etc.) Conversely, a WLAN AP may advise its associated STAs about the spectrum situation that the AP monitors.

The network expert 80 may use spectrum measurement data to optimize 802.11 protocol functions, such as channel scanning in which SAGE 20 analyzes data for an entire band to output information to enable the classification engine 52 to identify what is present in other channels; channel selection/load balancing in which SAGE 20 gathers full-band statistics on channel utilization. The benefits of these techniques are faster channel acquisition, faster channel hand-off, and STA-based load balancing.

The network expert 80 operates on spectrum activity information obtained across a broader expanse, such as network-wide. One way to obtain this information is through multiple cognitively-enabled APs each connected to the server where the network expert 80 is executed. Alternatively, or in addition, a sensor overlay network comprised of one or more spectrum sensors 1200(1) to 1200(N) is deployed across the entire network or regions of interest. The network expert 80 is executed on a server that is connected to the sensors and controls or is coupled to control the APs, such as through a WLAN management application. Signal detection is performed at the sensor level, and measurement and classification may be performed either at the sensor level or at the server.

The network expert 80 may interface with a general network management system, such as one supported by the network management station 1090 shown in FIG. 1. A general network management system may control enabling, disabling, and configuring of network components such as APs. The systems integration block 90 (described hereinafter) may interface the network expert 80 with a general network management system to permit notification to the network expert 80 of changes by the general network management system and to notify the general network management system of changes within the wireless network(s) such as channel assignments and STA associations.

Figure 28:
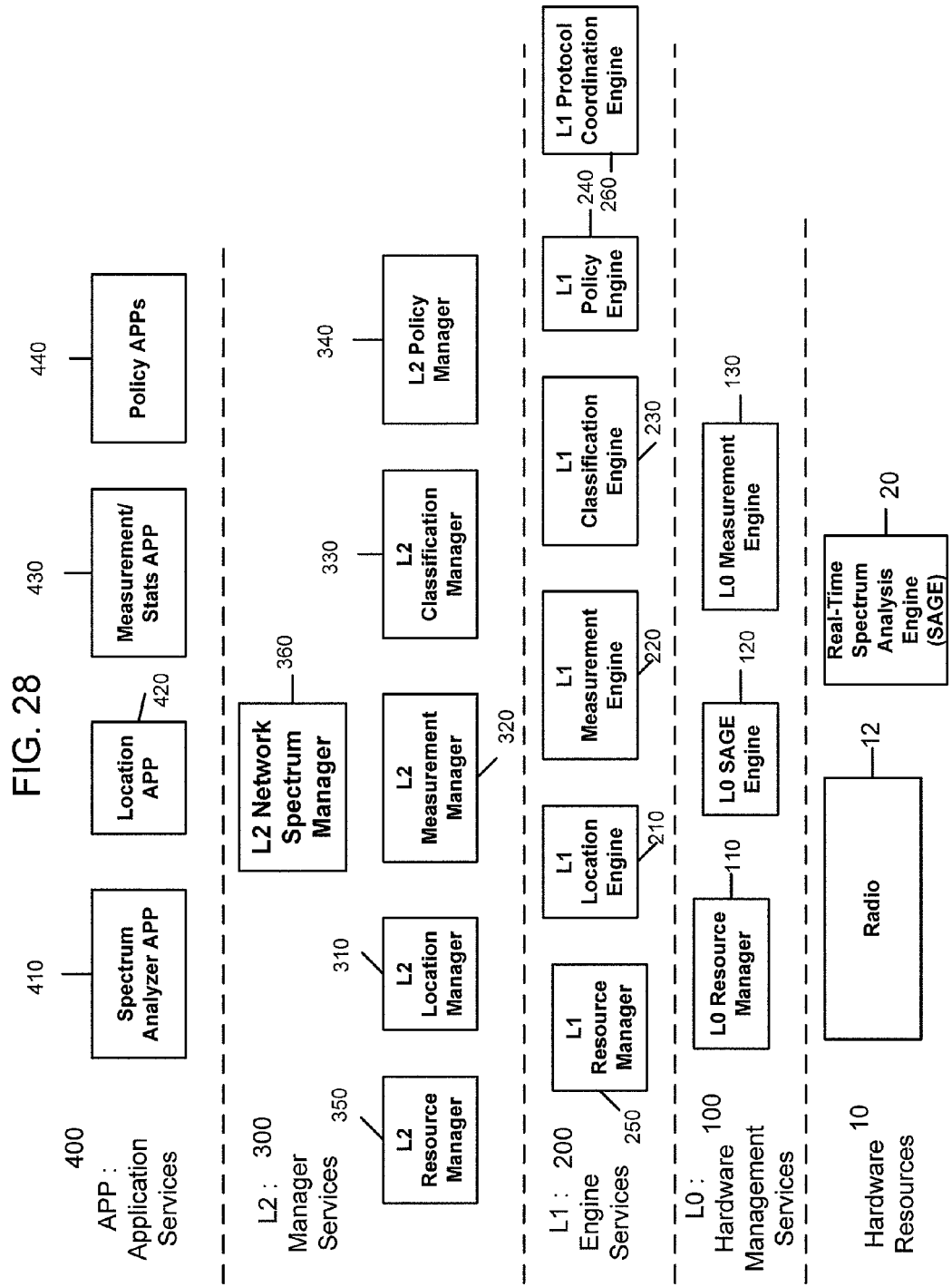
FIG. 28 is a block diagram illustrating a more detailed architecture for a spectrum management system.

Thus, the network expert 80 makes the broader type policy decisions and controls. In addition, the network expert 80 may act as a higher level control of multiple instances of spectrum experts 56 each associated with a device that is part of a larger network or regional deployment of devices. This paradigm is shown in FIG. 28 which is described hereinafter. In so doing, the network expert 80 must take into account the local policy decisions and controls made by the spectrum experts 56 under its purview. The network expert 80 will store and maintain knowledge about the local policy decisions and controls made by its spectrum experts 56. The network expert 80 may make regional-wide policy decisions or controls or network-wide policy decisions or controls. Regional-wide decisions are with respect to activity occurring in a particular "region" or locale controlled, for example, by some but not all spectrum experts 56 under the network expert's purview. Network-wide decisions are with respect to activity occurring in an entire network across all regions or locales where the network exists. When making regional or network-wide decisions, the network expert 80 may make them so that they do not interfere with local policy decisions or controls made by the spectrum experts 56, or may make certain decisions that preempt certain local decisions. For example, a particular AP under control of the network expert may be experiencing occasional interference on a particular frequency channel at a certain time of day, and as such, is adjusted (such as by a spectrum expert 56) to move to another channel during that time of day. The network expert 80 may, based on other information, decide to move that particular AP to that particular channel on a more permanent basis. This would conflict with the APs occasional need to stay away from that channel at certain times of the day. The network expert 80 will therefore modification its decision to move that AP to that channel in order to respect the local policy at the AP. When taking into account the local policy decisions, the network expert 80 may modify its decisions to avoid network or regional behavioral "oscillations."

The security services 82 provides security information based on the spectrum activity and related information generated at the lower level. For example, the security services 82 may detect when there is a denial of service attack on one more devices or networks operating in the frequency band, detect a "parking lot" attack, locate a rogue device, such as an unauthorized AP, and perform RF fingerprinting to determine if there is a device masquerading as an authorized device (e.g., station or AP).

A denial of service attack may be detected by examining the spectrum activity information to look for a large bandwidth noise signal that may interfere with one or more signals in the frequency band. If the noise signal continues for a significant period of time, the security services may declare a denial of service attack is being made on one or more wireless networks operating in the frequency band. An alert or report can be generated to inform a network administrator of the situation and describe the circumstances of the attack (approximate location of the source, power level, frequency bandwidth, time of occurrence, etc.).

A parking lot attack is when a user of a wireless network device receives and/or transmits signals on a wireless network without authority, such as by placing a wireless device in proximity to an operating network sufficient to receive and/or transmit signals on the network, assuming that it can get past encryption obstacles or encryption is not enabled on the network. If the user of the device is merely listening to signals transmitted, there may be no way to detect it. However, if a physical boundary (in two or three dimensions) can be made around the AP(s) that serve the network, then using the location engine 54, it can be determined from transmissions of the device whether the device is outside the physical boundary, indicative of an unauthorized device that could attempt to access information stored on a server of the wired network connected to the AP(s).

An unauthorized device (e.g., AP) may be detected by examining transmissions of the device and from information contained in the transmission that it uses (such as an IEEE 802.11 service set identifier (SSID)), it can be determined whether that SSID is valid against a stored set of valid SSIDs. If an AP is operating in the frequency band with an invalid SSID, then the security services 82 may command the location engine 54 to determine the location of the AP.

The security services 82 may generate real-time alerts to a network administrator if a security related breach is detected on one or more wireless networks or devices operating in the frequency band. In the case of detecting a potential parking lot attack, a procedure may set up to require the user of the out-of-boundary device (or the device itself) to supply a security code that the AP uses to validate it as an authorized device. A device that cannot supply this code is deemed to be an unauthorized device and service to that device is terminated. An alert may also be generated to advise a network administrator to investigate that user further.

Another way to manage security in a wireless network is to store the RF signatures of each authorized device, such as each authorized STA or AP. The RF signature may be created by capturing detailed signal pulse characteristics of each authorized device obtained using a device having a SAGE functionality, and storing information describing those characteristics in a database. Each time a STA associates with an AP, its signal pulse characteristics may be compared against the database of information to determine whether it is an authorized device. This procedure protects against a user of a STA from obtaining a valid MAC address (by listening to transmissions in a WLAN), and masquerading as that STA using that MAC address. Even though the MAC address will be valid, the RF fingerprint of the fraudulent device will likely not match the stored RF fingerprints of the authorized device in the database.

Figure 10:
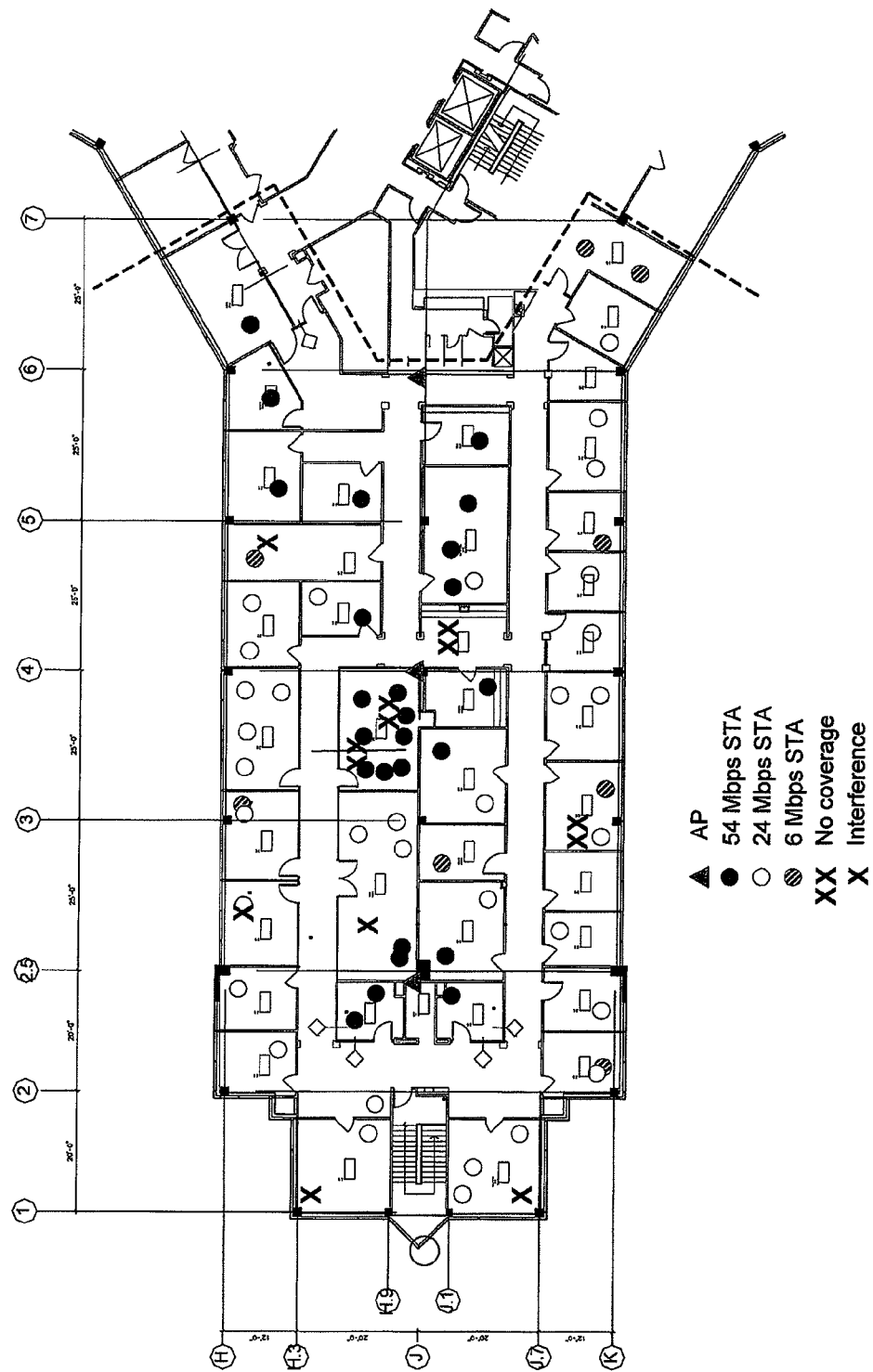
FIG. 10 is an exemplary coverage map that can be generated by the spectrum management system.

The location services 86 provide value added services to the location measurements made by the location engine 54. Examples of these services are coverage maps, an example of which is shown in FIG. 10, fast hand-offs for voice over IP devices, finding the closest printer to a device, finding a lost device, and performing emergency location (E911). As another example, the location services 86 may process spectrum information from multiple points or nodes (multiple spectrum maps) in a region of unlicensed band operation (e.g., an enterprise) and assemble the information into an easy to understand format.

The data mining services 88 involves capturing spectrum activity information (and optionally output from the spectrum expert) for long-term storage in a database. By analyzing the spectrum activity information in non-real-time using queries, network administrators can determine various situations such as at what time of day interference is a problem, in what areas of a region of operation is there the heaviest loading of the spectrum, etc.

Sitting above the network level are a system integration block 90 and a user interface (UI) block 92. The system integration block 90 interfaces data from any of the services below to other applications, protocols, software tools or systems, generally referred to as the network management application(s) 94. For example, the system integration block 90 may convert information to an SNMP format. The functions performed by the system integration block 90 are dictated by the particular application, protocol, system or software tool that it is desired to operate with the services below. The network management application 94 may be executed by the network management station 1090 (FIG. 1) to manage wired and wireless networks. The UI 92 may provide graphical, audio or video type interface of information generated by any of the services below for human consumption. Examples of graphical user interfaces for spectrum activity information and alerts are shown in FIGS. 16-25, described hereinafter. These higher level processes can be executed on computer equipment remote from the site where the radio frequency band activity is occurring. For example, the network management application 94 may be executed by the network management station 1090 that is located in a central monitoring or control center (telephone service provider, cable Internet service provider, etc.) coupled to the sensor devices, APs, etc., as well as the devices which it controls (e.g., APs) via a wide area network (WAN) connection, e.g., the Internet, a dedicated high speed wired connection, or other longer distance wired or wireless connection.

Figure 11:
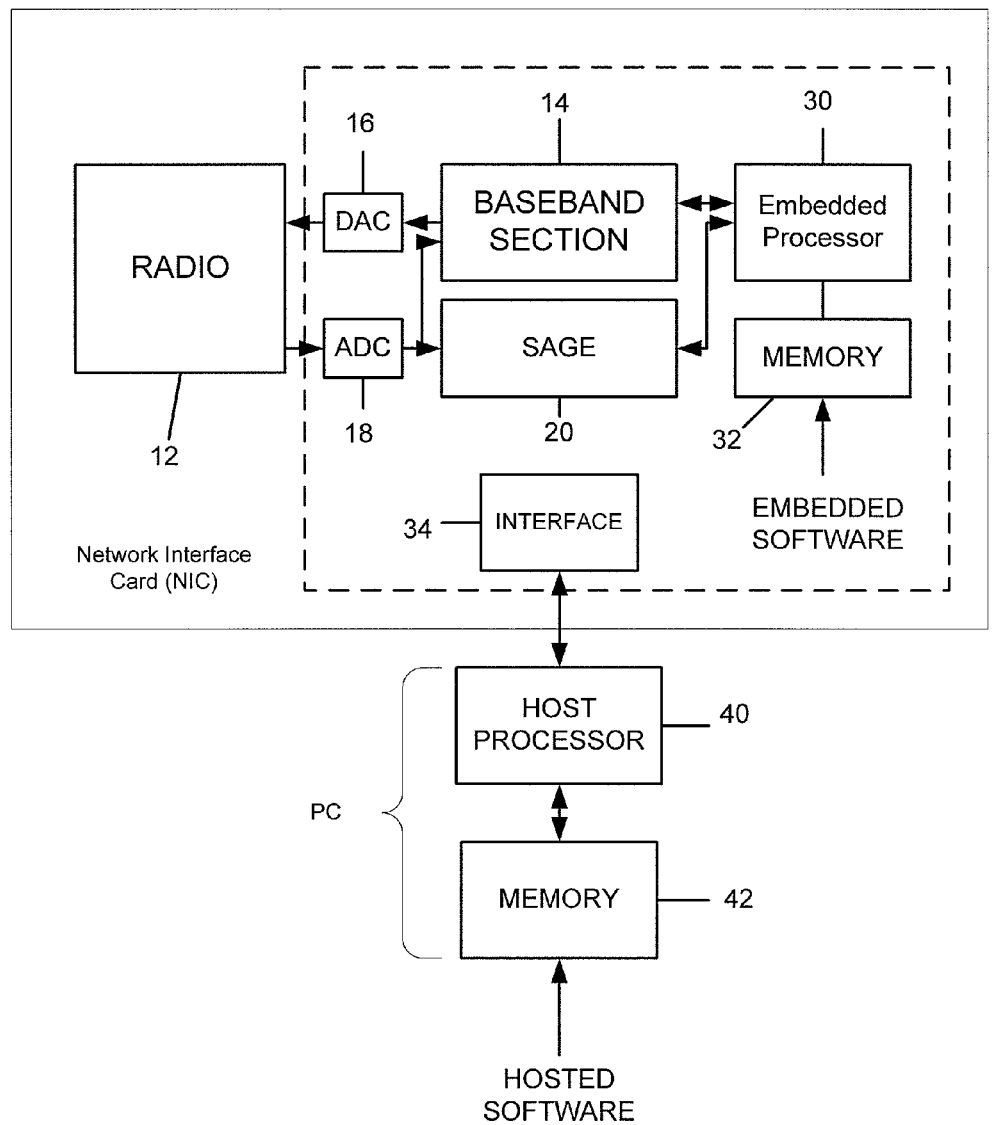
FIG. 11 is a block diagram of an exemplary communication device which may play a part in the spectrum management system.

Any device that receives radio frequency energy in the frequency band of interest may be equipped with a SAGE 20 to generate spectrum activity information. FIG. 11 shows an example of such a cognitive radio device. The communication device includes the radio 12 that downconverts received radio frequency energy and upconverts signals for transmission. The radio 12 may be a narrowband radio or radio capable of wideband operation and narrowband operation. An example of a wideband radio transceiver is disclosed in commonly assigned and co-pending U.S. Provisional Application No. 60/374,531, entitled "System and Architecture for Wireless Transceiver Employing Composite Beamforming and Spectrum Management Techniques," filed Apr. 22, 2002 and in commonly assigned and co-pending U.S. application Ser. No. 10/065,388, filed Oct. 11, 2002, entitled "Multiple-Input Multiple-Output Radio Transceiver." A baseband section (that may include or correspond to the modem shown in FIG. 6) 14 is coupled to the radio 12 and performs digital baseband processing of signals. One or more analog-to-digital converters (ADCs) 18 convert the analog baseband signals output by the radio 12 to digital signals. Similarly, one or more digital-to-analog converters (DACs) 16 convert digital signals generated by the baseband section 14 for upconversion by the radio 12. The SAGE 20, referred to in FIG. 6, is shown as receiving input from the ADCs 18.

A processor 30 may be provided that is coupled to the baseband section 14 and to the SAGE 20. The processor 30 executes instructions stored in memory 32 to perform several of the software spectrum management functions that are described herein as being "on-chip" or "embedded" software functions. Thus, some of the software stored in memory 32 is referred to herein as on-chip or embedded software. Examples of the on-chip or embedded software functions are the SAGE drivers 15, the spectrum aware drivers 17 and the measurement engine 50, although additional processes shown in FIG. 6 such as the classification engine 52, location engine 54 and spectrum expert 56, could be performed by the processor 30. The phantom line shown in FIG. 11 is meant to indicate that several or all of those elements surrounded thereby may be fabricated into a single digital application specific integrated circuit (ASIC). The processor 30 may also perform MAC processing associated with a communication protocol. The larger block around the radio and the other components is meant to indicate that these elements may be implemented in a network interface card (NIC) form factor. The processor 30 may have the ability to generate traffic statistics related to a particular communication protocol that the device uses. Examples of IEEE 802.11 traffic statistics are described hereinafter.

A host processor 40 may be provided that is coupled to the processor 30 by a suitable interface 34. The host processor 40 may be part of a host device, such as a personal computer (PC), server 1055 or network management station 1090 (FIG. 1). Memory 42 stores hosted or "off-chip" software to perform higher level spectrum management functions. Examples of the processes that the host processor 40 may perform include the measurement engine 50, classification engine 52, location engine 54 and spectrum expert 56. In addition, the host processor 40 may perform still higher level processes, such as the network expert 80, as well as lower level processes.

The communication device shown in FIG. 11 may be part of, or correspond to, any of a variety of devices that operate in the frequency band, such as an IEEE 802.11 WLAN AP or STA. The communication device may share information with a computer that may be remote from it, such as the server 1055 or network management station 1090 shown in FIG. 1. The remote computer may have wireless communication capability (or is linked by wire through another device that has wireless communication capability with the communication devices). Software to execute the system integration block 90 and UI 92 (FIG. 6) may be executed by the host processor 40 or by the remote computer, e.g., the server 1055 or remote network management station 1090.

A cognitive radio device such as the one shown in FIG. 11 can detect, measure, classify activity occurring in the frequency band, and through a functionality such as the spectrum expert 56, can make intelligent decisions about whether or not to change any one of its operating parameters, such as frequency of operation, transmit power, data rate, packet size, timing of transmission (to avoid other signals), etc. Moreover, a radio device may respond to controls generated on the basis of information generated by another radio device that detects, measures and classifies activity in the frequency band.

Figure 12:
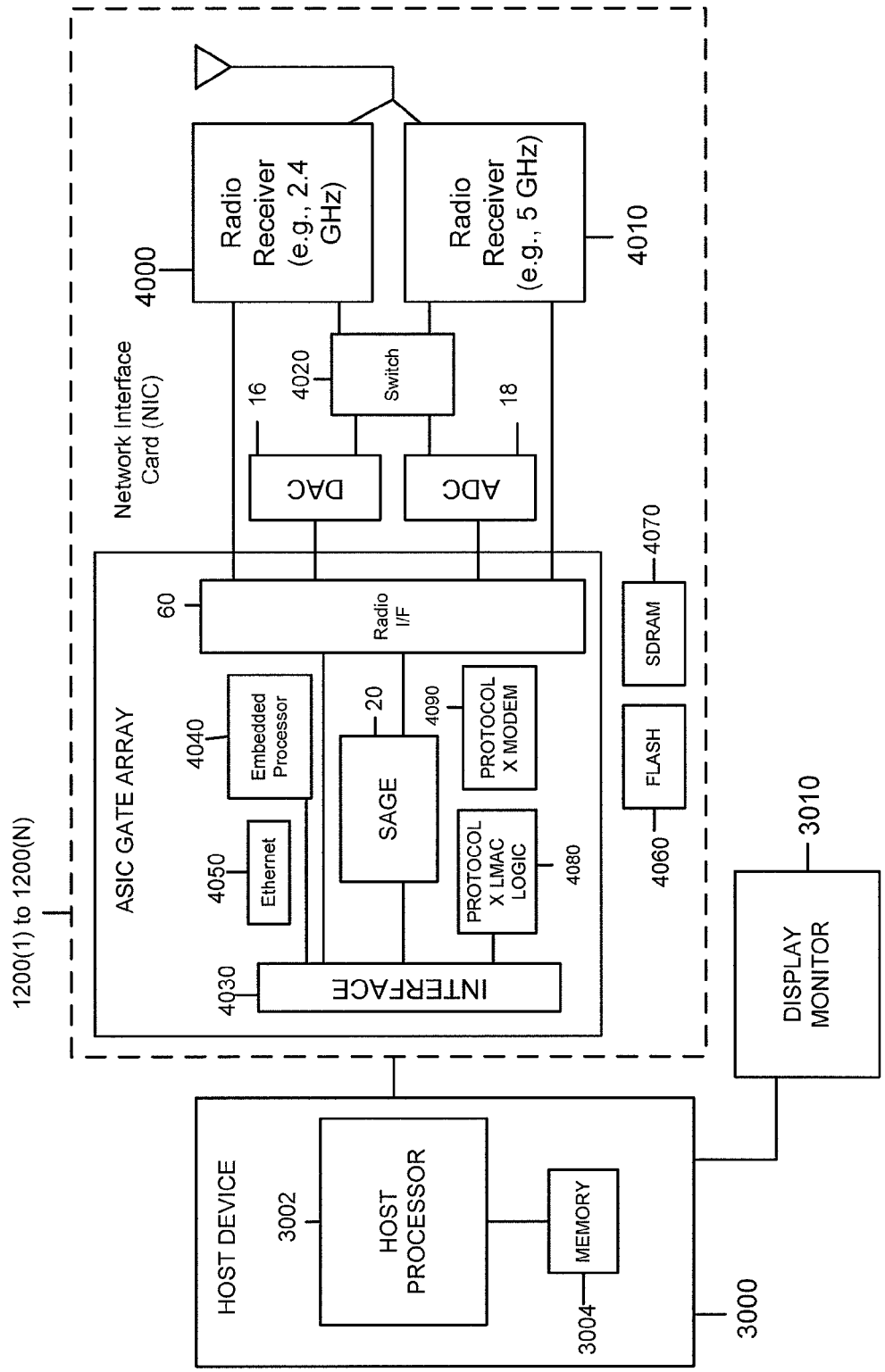
FIG. 12 is a block diagram of an exemplary spectrum sensor device that may play a part in the spectrum management system.

FIG. 12 illustrates an exemplary block diagram of a spectrum sensor (e.g., spectrum sensor 1200(1) to 1200(N) referred to above in conjunction with FIG. 4). The spectrum sensor is a radio device that receives signals in the frequency band of interest. In this sense, the spectrum sensor is a spectrum monitor of a sort, and may also detect, measure and classify to provide spectrum intelligence that is supplied to other radio devices, network control applications, etc., that can control the operation of an entire network of devices. The spectrum sensor comprises at least one radio receiver capable of downconverting signals in the frequency band of interest, either in a wideband mode or scanning narrowband mode. It is possible, as shown in FIG. 12, that the spectrum sensor comprises two radio receivers 4000 and 4010 (dedicated to different unlicensed bands) or a single dual band radio receiver. There is an ADC 18 that converts the output of the radio receiver to digital signals, which is then coupled to the SAGE 20 or other device capable of generating signal pulse data and spectrum. A DAC 16 may be useful to supply control signals to the radio receiver via a switch 4020.

An interface 4030, such as a Cardbus, universal serial bus (USB), mini-PCI, etc., interfaces the output of the SAGE 20 and other components to a host device 3000. There are an optional embedded processor 4040 to perform local processing (such as the measurement engine 50, classification engine 52, location engine 54 and spectrum expert 56 shown in FIG. 6), an Ethernet block 4050 to interface to a wired network, FLASH memory 4060 and SDRAM 4070. There are also an optional lower MAC (LMAC) logic block 4080 associated with a particular communication protocol or standard ("protocol X") and a modem 4090 associated with protocol X. Protocol X may be any communication protocol that operates in the frequency band, such as an IEEE 802.11x protocol. Multiple protocols may be supported by the device. Many of the blocks may be integrated into a digital logic gate array ASIC. The LMAC logic 4080 and modem 4090 may be used to track communication traffic on protocol X and generate traffic statistics. The larger block around the radio(s) and other components is meant to indicate that the spectrum sensor device may be implemented in a NIC form factor for PCI PC-card or mini-PCI deployment. Alternatively, many of these components, save the embedded processor, may be implemented directly on a processor/CPU motherboard.

The host device 3000 may be a computer having a processor 3002 and memory 3004 to process the spectrum activity information supplied by the spectrum sensor via a wired network connection, USB connection, or even a wireless connection (such as an 802.11x wireless network connection). A display monitor 3010 may be coupled to the host device 3000. The memory 3004 in the host device may store the software programs that correspond to the aforementioned embedded software and/or the hosted software (for the processes shown in FIG. 6). In addition, the memory 3004 may store driver software for the host device, such as drivers for operating systems such as Windows operating systems (Windows® XP, Windows® CE, etc.). The host device 3000 may be a desktop or notebook personal computer or personal digital assistant, or a computer device local to or remote from the spectrum sensor, or the server 1055 or network management station 1090 shown in FIG. 1.

In some forms of a spectrum sensor, there is a SAGE 20, but no other processing component, such as the embedded processor. The sensor would be connected to a processor in a host device or a remotely located server, etc., where the output of the SAGE 20 is processed to perform the signal measurement/accumulation, classification, etc. This may be desirable for a low cost spectrum sensor used as part of a sensor overlay network, where the majority of the signal processing is performed at one or more centrally located computing devices.

Still another variation is to implement the functions of the SAGE 20 in software on the host processor 3002. The output of the ADC of any one or more device(s) operating in the frequency band (particularly those devices having a wideband capable radio receiver) can be supplied to a host processor where the spectrum management functions described above are performed entirely in software, such as the measurement engine, classification engine, etc. For example, the output of the ADC 18 may be coupled across any one of the interfaces shown in FIG. 12 to the host processor 3002 which executes in software the SAGE processes, as well as one or more of the other processes.

The spectrum sensor may be deployed in any device that resides in a region where operation in an unlicensed or shared frequency band is occurring. For example, it can reside in a consumer device such as a camera, home stereo, peripheral to a PC, etc. Any other device connected to a spectrum sensor may obtain the spectrum knowledge that the spectrum sensor acquires, and add it to any knowledge it may acquire about the spectrum itself, from its own spectrum monitoring capabilities, if supported. Moreover, the spectrum knowledge a local device (e.g., a PC) acquires from a remote device may be useful to configure and/or diagnose the operation at the local device (e.g., a PDA) as well as at the remote device.

The LMAC logic 4080 may be implemented in software that is executed by the embedded processor 4040. One advantage of a software-implemented LMAC is that additional statistics associated with protocol X can be generated more easily than would otherwise be necessary in a firmware implementation. These statistics may be accumulated by software counters and allocated memory locations in the LMAC software. Examples of additional IEEE 802.11 statistics that the radio devices shown in FIGS. 11 and 12 may generate are described hereinafter. Some of these statistics are good indicators of a performance degradation in a device, such as a WLAN AP or WLAN STA, and can be used to automatically initiate corrective action or controls, or to generate information to alert a user/network administrator, software application, etc. Many of these statistics may be provided by 32 bit counters, and can wrap. The wrap interval depends on the specific statistic, but can be as short as 5 minutes. Software from a host driver may periodically poll these counters and convert them to 64 bit counters (wrap time of 43 Kyears), which will reduce on-chip memory requirements.

Examples of additional IEEE 802.11 MIB Extensions that may be provided for STAs from statistics generated by the LMAC logic are explained below. These statistics can be used to determine general channel problems, and problems that affect a subset of the STAs, such as those based on position and localized interference. For example, these statistics can indicate packet error rate (PER) information and provide insight into possible types of interference and be used to help adjust fragmentation and RTS thresholds.

lmst_RxTime Timestamp of when the last frame (of any type) was received from this STA. This implies that the STA is present on the channel, but does not imply it is responding, in an association/authentication state, or other higher level activity. For a multicast STA entry, it is updated when the last multicast frame was sent.

lmst_AckMSDU Number of MSDU's that were successfully sent, i.e., the last/only fragment was ACK-ed, or it was multicast. The total number of data/mgmt frames sent is derived by the number acknowledged, and the number that were not.

lmst_AckFrag Number of fragments successfully sent (excluding final fragment counted in lmst_AckMSDU).

lmst_RxCTS Number of times an RTS was sent, and the CTS was received. The number of RTS frames sent is derived from the number of CTS frames received, and the number that were not.

lmst_NoCTS Number of times an RTS was sent, and no CTS was received.

lmst_RxACK Number of unicast data/mgmt frames sent, and an explicit ACK frame was received. This indicates actual ACK control frames, rather than PCF/HCF piggy backed ACKs. For PER calculation, lmst_AckMSDU+lmst_AckFrag may be more useful. The difference between those statistics, and this field is the number of piggy backed ACK's processed.

lmst_NoACK Number of unicast data/mgmt frames sent, and no ACK was received.

lmst_BadCRC Number of times a CTS or ACK control frame was expected, and a frame with a CRC error was received instead. This probably means that the frame was received by the recipient, and the response was lost. Other frames with CRC errors can not be correlated, as the frame type and source address fields would be suspect.

lmst_BadPLCP Number of times a CTS or ACK control frame was expected, and a frame that the PHY could not demodulate was received instead. This probably means that the frame was received by the recipient, and the response was lost. Other frame with PLCP errors can not be correlated, as the frame type and source address fields are not provided from the PHY. This condition is also counted under the lmif_BadPLCP statistic.

lmst_MaxRetry Indicates frames that were dropped due to excessive retransmission.

lmst_HistRetry[8] Provides a histogram of the number of retransmission attempts, before a response is received. This includes RTS to CTS, and each Fragment to ACK in a Frame Exchange Sequence. Index 0 is for frames sent successfully the first time. This should typically produce an inverse exponential curve, and if it significantly deviates it may indicate large outages, such as far side interference from a microwave oven.

lmst_HistSize[2][4] Provides a histogram of PER vs. Frame size. The first index is OK and No response, and the second index is for frame size (in quarters) relative to the fragmentation threshold. Used to speed adjustment of fragmentation threshold.

These following statistics provide information on data/management frames received. A statistic may be kept on every frame received. Some statistics are only expected on an AP or a STA unless there are overlapping BSSs on a channel, and may provide insight into lost channel bandwidth due to this overlap.

lmst_FiltUcast The data/management frame was filtered because it was addressed to another STA.

lmst_FiltMcast The data/mgmt frame was filtered because it was directed to a multicast address that is not enabled in the multicast address hash.

lmst_FiltSelf The data/mgmt frame was filtered because it was a multicast frame that was being forwarded into the BSS by the AP.

lmst_FiltBSS The data/mgmt frame was filtered because it was a multicast frame and its BSSID did not match the filter.

lmst_FiltType The data/mgmt frame was filtered because its frame type/sub-type were disabled from the frame type filter. This would include null data frame types, unsupported mgmt frame types, and could include other types during a BSS scan.

lmst_FiltDup The data/mgmt frame was filtered because it was a duplicate of a previously received frame. This indicates that ACK frames are being lost. Although not all errors are detected here, this can provide a coarse approximation of the PER in the reverse direction.

lmst_FwdUcast A unicast data/mgmt frame was delivered to the embedded processor.

lmst_FwdMcast A multicast data/mgmt frame was delivered to the embedded processor.

lmst_BadKey The data/mgmt frame was filtered because it required a decryption key that had not been provided. This indicates a configuration error on one side of the connection.

lmst_BadICV The data/mgmt frame was filtered because it failed to decrypt successfully. This may indicate a security attack.

lmst_TooSmall The data/mgmt frame was filtered because it was encrypted, but did not include the required encryption header. This indicates a protocol error.

These following statistics provide information on other frame exchanges.

lmst_RxRTSother Number of times an RTS was received that was not addressed to this STA.

lmst_TxCTS Number of times an RTS was received, and a CTS was sent in response.

lmst_TxACK Number of times an unicast data/mgmt frame was received, and a ACK was sent in response.

The following statistics may provide information useful for adjusting a transmit data rate.

lmst_TxAveRate Running average of rate for data/mgmt frames transmitted successfully. Divide by (lmst_AckMSDU+lmst_AckFrag) for average rate code. This counts only acknowledged frames.

lmst_RxAveRate Running average of rate for unicast data/mgmt frames received successfully. Divide by lmst_TxACK for average rate code. This includes all acknowledged frames, including filtered frames. Since this can include duplicates (lmst_FiltDup), its value is not completely symmetrical with transmit.

The following statistics provide information on frames received with various errors, and can not be traced back to the originating station.

lmif_SaveCRC[3] This provides the timestamp and PHY statistics for the last frame received with a CRC error.

lmif_BadCRC Number of frames received with CRC errors are either counted here, or under lmst_BadCRC.

lmif_SavePLCP[4] This provides the timestamp, PLCP Headers, and PHY statistics for the last frame received counted under lmif_BadPLCP.

lmif_BadPLCP[4] Number of frames received which the PHY could not demodulate the PHY headers, broken down by cause. These include CRC/Parity error, bad SFD field, invalid/unsupported rate, and invalid/unsupported modulation.

lmif_SaveMisc[3] This provides the timestamp, PHY statistics, and first 4 bytes of the MAC header for the last frame received for the remaining receive errors listed in this group.

lmif_TooSmall Number of frames received that were too small for their frame type/sub-type. This indicates a protocol error.

lmif_BadVer Number of frames received with an invalid/unsupported version. This indicates a protocol error, or a newer (incompatible) version of the 802.11 specification has been released.

lmif_BadType Number of Control (or Reserved) frames received with an invalid/unsupported frame type/sub-type. This indicates a protocol error, or a newer version of the 802.11 specification has been released.

lmif_BadSrc Number of frames that were dropped because the source address was a multicast address. This indicates a protocol error.

lmif_FromUs Number of frames that were received from "our" MAC address. This indicates a security attack, and should be reported to a network management application.

The following statistics provide information on other frame exchanges, where the source address is unknown.

lmif_RxCTSother Number of CTS frames directed to other stations.

lmif_RxCTSbad Number of CTS frames received, when no RTS was outstanding. This indicates a protocol error.

lmif_RxACKother Number of ACK frames directed to other stations.

lmif_RxACKbad Number of ACK frames received, when no data/mgmt frame was outstanding. This indicates a protocol error.

The following statistics provide information on channel usage, and carrier sensor multiple access (CSMA).

seq_CntRx Time spent receiving 802.11 frames, in 0.5 μs units. Some of the time spent demodulating frames is counted under seq_CntCCA until the PHY header has been processed.

seq_CntTx Time spent transmitting 802.11 frames, in 0.5 μs units.

seq_CntCCA Time spent with energy detected, but not receiving 802.11 frames, in 0.5 μs units. Some of the time spent demodulating frames is counted under seq_CntCCA until the PHY header has been processed. This can also be used to detect the presence of strong interference that has locked out the network (denying service to the network), such as a baby monitor.

seq_CntEna Time spent with the channel Enabled and Idle, in 0.5 μs units. This includes time when the channel can not be used due to CSMA, such as SIFS time and channel backoff time. High usage may provide indications of denial of service attacks, or the presence of hidden nodes.

seq_Timer Time since last LMAC reset (uptime), in 0.5 μs units. Any time not accounted for from the previous 4 counters indicates time the channel was disabled.

lmif_CCAcnt Number of times receive energy was detected. This does not include any transmit time.

lmif_CCAother Number of times receive energy was detected, but no 802.11 frame was received (even frames that could not be demodulated).

lmif_RxFIP Total number of receive events, as indicated in other per frame type statistics.

lmif_TxFIP Total number of transmit events, as indicated in other per frame type statistics.

lmif_TxSkip Number of times that the channel was available for transmission by the CSMA protocol, but no frame was available for transmission. This can help distinguish performance problems that are due to upper MAC (UMAC) or host processor bottlenecks versus 802.11 channel or protocol limitations.

lmif_CWnBack Number of times a channel Backoff or Deferral was performed.

lmif_CWused Number of slot times consumed by Backoff and Deferral.

lmif_HistDefer[4] For each attempt to start a Frame Exchange Sequence, this indicates if a Deferral or Backoff was required, and the cause. The 4 cases are: No Deferral required; Deferred after receive energy and/or receive frame; Deferred after transmission; and Backoff after not receiving a CTS/ACK response. Only a single entry for the last cause may be counted before each attempted Frame Exchange Sequence.

Spectrum Activity Information and Accessing it Using the NSI

The measurement engine 50, classification engine 52, location engine 54 spectrum expert 56 perform spectrum analysis functions and generate information that may be used by application programs or systems that access these functions through the NSI 70. The NSI 70 may be embodied by instructions stored on a computer/processor readable medium and executed by the processor (server 1055 or network management station 1090) that executes the one or more application program or systems. For example, this processor would execute instructions for an NSI "client" function that generates the request and configurations for spectrum analysis functions and receives the resulting data for the application program. The processor(s) that execute(s) the measurement engine, classification engine, location engine and/or spectrum expert will execute instructions stored on an associated computer/processor readable medium (shown in FIG. 1, 11 or 12) to execute an NSI "server" function that responds to requests from the NSI client to generate configuration parameters and initiate spectrum analysis functions by the measurement engine, classification engine, location engine and/or spectrum expert to perform the requested spectrum analysis function and return the resulting data. The measurement engine may in turn generate controls for the SAGE drivers 15 to configure the SAGE 20 and/or radio 12.

It should be further understood that the classification engine, location engine and spectrum expert can be viewed as a client to the measurement engine and would generate requests to, and receive data from, the measurement engine similar to the manner in which an application program would interact with the measurement engine. Further still, the spectrum expert can be viewed as a client to the classification engine and location engine and request analysis services of those engines.

The NSI 70 may be transport independent (e.g., supports Sockets, SNMP, RMON, etc.) and may be designed for implementation in a wired or wireless format, such as by TCP/IP traffic from an 802.11 AP to a PC which is running software designed to accept the traffic for further analysis and processing. The TCP/IP traffic (or traffic using some other network protocol) could also be carried by a PCI bus inside a laptop PC, provided the PC has built-in 802.11 technology, or an 802.11 NIC. If the source of the spectrum information data stream is a TCP/IP connection, the application program would implement a socket, and access the correct port, to read the data stream. A sample of typical code for this purpose is shown below. (The sample is in Java, and shows client-side code.) Once the port connection to the data stream is established, the use of the data stream is determined by the network management software itself.

```
! Open Socket and Port (Remember to first assign the correct value
! for the 802.11 device PortNumber)
Socket MyClient;
try {
        MyClient = new Socket("Machine name", PortNumber);
}
catch (IOException e) {
    System.out.println(e);
}
! Create input stream to get data from NSI
DataInputStream input;
try {
    input = new DataInputStream(MyClient.getInputStream( ));
}
catch (IOException e) {
    System.out.println(e);
}
! Create DataOutputStream to send control commands and
! configuration data to NSI
DataOutputStream output;
try {
    output = new DataOutputStream(MyClient.getOutputStream( ));
}
catch (IOException e) {
    System.out.println(e);
}
```

The class DataInputStream has methods such as read. The class DataOutputStream allows one to write Java primitive data types; one of its methods is writeBytes. These methods can be used to read data from, and write data to, the NSI 70.

If the transport of the data stream occurs over other low-level media, other methods are used to access the data stream. For example, if the data is carried over a PC's PCI bus, a PCI device driver will typically provide access to the data.

The information provided by the NSI to an application program corresponds to data generated by the measurement engine 50 (through the SAGE), classification engine 52, location engine 54, and/or the spectrum expert 56.

In acting as the API, the NSI has a first group of messages that identify (and initiate) the spectrum analysis function (also called a service or test) to be performed and provide configuration information for the function. These are called session control messages and are sent by the application program to the NSI. There is a second group of messages, called informational messages, that are sent by the NSI (after the requested spectrum analysis functions are performed) to the application program containing the test data of interest.

Most of the spectrum analysis functions (i.e., tests) have various configuration parameters, which are sent via session control messages, and which determine specific details of the test. For example, in monitoring the spectrum, session control messages tell the NSI how wide the bandwidth should be (narrowband or wideband), and the center frequency of the bandwidth being monitored. In many cases, detailed test configuration parameters for a spectrum analysis function can be omitted from the session control messages. In those cases, the NSI uses default settings.

Examples of spectrum analysis functions that the measurement engine 50 (in conjunction with the services of the SAGE 20) may perform, and the resulting data that is returned, include:

Spectrum Analyzer Power vs. Frequency Data. This data describes the total power in the spectrum as a function of frequency, over a given bandwidth.

Spectrum Analyzer Statistics Data. This data provides a statistical analysis of the data in RF power vs. frequency measurements.

Pulse Event Data—This data describes characteristics on individual RF pulses detected by the SAGE 20. The characteristics for (and thus the types of pulses) detected by the SAGE 20 can be configured.

Pulse Histogram Data. This data describes the distribution of pulses per unit of time, in terms of the percentage of pulses distributed among different frequencies, energy levels, and bandwidths.

Snapshot Data. This data contain portions of raw digital data of the RF spectrum captured by the snapshot buffer of the SAGE 20. The data can help identify the location of devices, and can also be used to extract identifier information which can determine the brand of certain devices operating in the frequency band, for example. Snapshot data may also be useful for signal classification.

The classification engine 52 may perform spectrum analysis functions to determine and classify the types of signals occurring in the frequency band, and together with optional recommendation or descriptive information that may be provided by the classification engine 52 or the spectrum expert 56, the resulting data that is returned are called spectrum event data, which describe specific events, such as detecting a particular signal type as going active or inactive in the frequency band. The spectrum expert 54, as well as the network expert 80 and other applications or processes may use the output of the classification engine 52.

There are numerous ways to format the NSI messages to provide the desired API functionality in connection with the spectrum analysis functions. The following are examples of message formats that are provided for the sake of completeness, but it should be understood that other API message formats may be used to provide the same type of interface between an application program and spectrum analysis functions pertaining to activity in a frequency band where signals of multiple types may be simultaneously occurring.

A common message header may be used by both session control messages and information messages. The common header, called the sm1StdHdr_t header, comes at the very beginning of all messages and provides certain general identifying information for the message. An example of the general format of the common header is explained in the table below.

| Sub-Field | Description and Notes |
|---|---|
| msgLen | 'msgLen' is the length of the message in bytes. |
| msgType | 'msgType' is an integer which indicates whether this is a Start Test message, a data message, etc. 'sessType' is an integer which indicates the type of test, such as a pulse test, or an spectrum analyzer test. |
| sessType | |
| configToken | This value is set by the user (the requesting application program also called the Network Management Software) when a test is set up. The purpose is to help the requesting application program distinguish incoming data based on different test configurations. |
| timestampSecs | Use of the time stamp is message dependent. |
| Src | 'src' and 'dest' fields are intended to facilitate multiplexing of session routing across common transport connections, where needed. |
| Dest | |

Informational messages are started with two headers: the common header (sm1StdHdr_t), followed by the Info Header (sm1InfoHdr_t). The sm1InfoHdr_t header provides specific identifying parameters for information messages:

| Sub-Field Name | Description and Notes |
|---|---|
| transactionSeq | Sequence for this message. This starts at 1, and is incremented for each succeeding message. The increment reflects the number of data samples (transactionCnt) in the previous messages. For some types of messages the number of data points, and hence the transactionCnt, is fixed at '1'; for these message types successive messages always have their transactionSeq incremented by '1'. |
| transactionCnt | 'transactionCnt' generally indicates the number of entries in a message, where entries are discrete units of data. Its use is message dependent. For example, for Power vs. Frequency spectrum messages, this value indicates the number of sequential "snapshots" of the RF spectrum in the message. (Each snapshot is encapsulated in a specific sequence of bytes. If the transactionCnt has a value of 10, then the message contains 10 successive snapshots of the RF spectrum; there are ten matching byte patterns which follow, each of which reports on one snapshot of the RF spectrum.) |

A summary of all the messages that may be sent via the NSI is contained in the table below. The numeric values in the table below correspond to the values that are used in the msgType sub-field of the sm1StdHrd_t field.

| msgType Name | msgType Value | Direction | Meaning |
|---|---|---|---|
| SESS_START_REQ | 40 | User → NSI | Start a service, or copying a service. |
| SESS_STARTED_RSP | 41 | NSI → User | Test started. |
| SESS_PENDING_RSP | 42 | NSI → User | Session will start when the service is freed up from another user. |
| SESS_REJECT_RSP | 43 | NSI → User | Session could not be started. |
| SESS_STOP_REQ | 44 | User → NSI | Request to stop the service. |
| SESS_STOPPED_RSP | 45 | NSI → User | Service stopped, either in response to user request or due to problems. |
| SM_MSG_L1_INFO | 46 | NSI → User | Informational message containing test data. |
| SESS_QUERY_REQ | 47 | User → NSI | Requests the current test configuration. |
| SESS_QUERY_RSP | 48 | NSI → User | Current test configuration. |
| SESS_POLL_REQ | 49 | User → NSI | Requests a poll, or flushing, of pulse histogram test data. |
| SESS_POLL_RSP | 50 | NSI → User | Pulse histogram test data. |
| SESS_RECONFIG_REQ | 51 | User → NSI | Reconfigure a test session. |
| SESS_RECONFIG_RSP | 52 | NSI → User | Response to reconfiguration request. |
| SESS_VENDOR_REQ | 52 | User → NSI | Vendor-defined request. |
| SESS_VENDOR_RSP | 53 | NSI → User | Vendor-defined response. |

Examples of informational messages, which as suggested above, are NSI formatted versions of the output of the measurement engine 50 and classification engine 52, and optionally the spectrum expert 54, are described.

Spectrum Analyzer Power Vs. Frequency Data

The SAGE 20 will analyze a frequency band centered at a frequency which may be controlled. Moreover, the bandwidth of the frequency band analyzed may be controlled. For example, a portion, such as 20 MHz (narrowband mode), of an entire frequency band may be analyzed, or substantially an entire frequency band may be analyzed, such as 100 MHz (wideband mode). The selected frequency band, is divided into a plurality of frequency "bins" (e.g., 256 bins), or adjacent frequency sub-bands. For each bin, and for each sample time interval, a report is made from the output of the SAGE 20 on the power detected within that bin as measured in dBm. The measurement engine 50 supplies the configuration parameters to the SAGE drivers 15 and accumulates the output of the SAGE 20 (FIG. 1).

Figure 22:
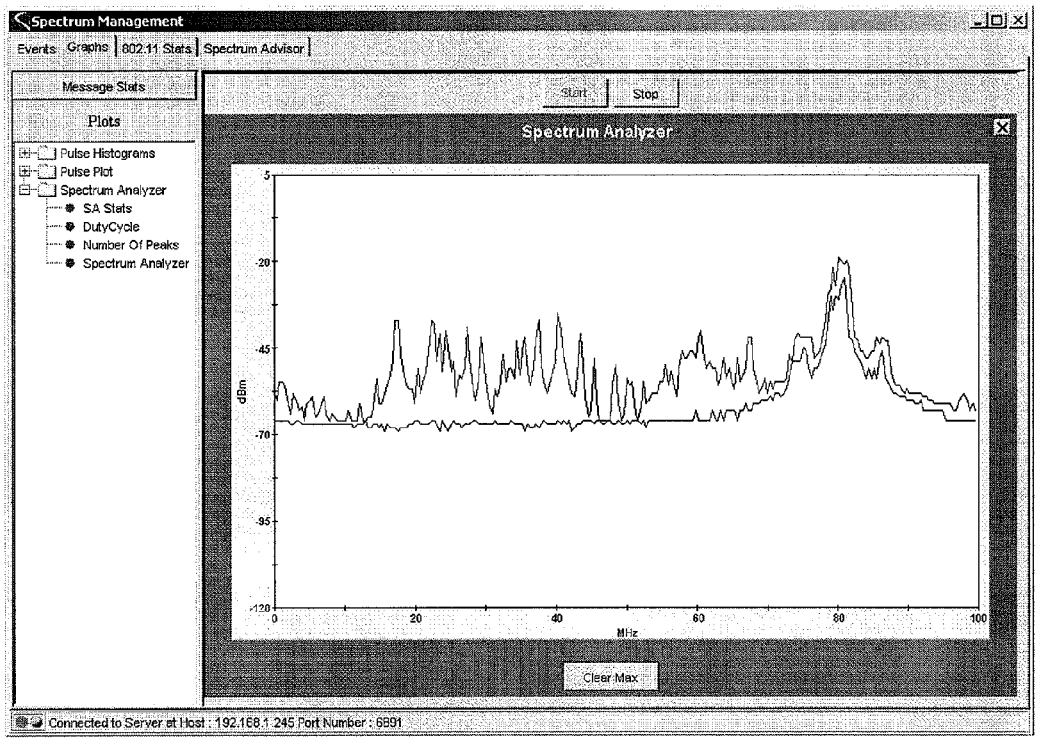
FIGS. 22-25 are diagrams of exemplary ways in which spectrum activity information may be displayed.

FIG. 22 (also described further hereinafter) illustrates a graph that may be created from power measurements taken at a given time interval. In the illustration, the vertical bars do not represent the distinct frequency bins. Of the two jagged lines shown in FIG. 22, the lower line represents a direct graph of the data in a single snapshot of the spectrum at a given instant in time. It corresponds to the data in one, single sapfListEntries field, described below. However, a spectrum analysis message may contain multiple sapfListEntries fields; each such field corresponding to a single snapshot of the spectrum. The upper jagged line was constructed by a software application. It represents the peak values seen in the RF spectrum over the entire testing period to the present instant.

An example of the structure of the spectrum analyzer power vs. frequency data is as follows.

| Primary Field Names | Description and Notes |
|---|---|
| sm1StdHdr_t | Standard header. |
| sm1InfoHdr_t | The second standard header. |
| sm1SapfMsgHdr_t | Describes the frequency band being analyzed, providing both the center frequency and the width of the each of the 256 bins. |
| sapfListEntries | This fields contains the primary data of interest, that is, the RF signal power in dBm for each of the 256 frequency bins. There may be only a single instance of this field in the message, or there may be multiple instances. If there is more than one such field, each field corresponds to a single snapshot in a time-series of snapshots of the RF spectrum. The number of instances is given by the sm1InfoHdr_t.transactionCnt sub-field. |

In the second standard header, the msgType is 46 to identify the message as an informational message, and the sessType is 10 (SM_L1_SESS_SAPF) to identify that data results from a session that is a spectrum analyzer power vs. frequency test.

The field below is the standard information header for spectrum analyzer power vs. frequency data.

| Sub-Field Name | Description and Notes |
|---|---|
| transactionSeq | Sequence for this message. This starts at 1 for the first message. For each subsequent message, it is incremented by the value of transactionCnt in the previous message. |
| transactionCnt | Number of sapfList entries in message (sapfList). In other words, this is the number of sequential "snapshots" of the RF spectrum in the message. |

This field sm1SapfMsgHdr_t below describes the frequency spectrum that is being monitored. While this message provides the center frequency and the width of the bins, it may not provide the total bandwidth being measured. This can be calculated (low end=frqCenterkHz−128*binSize, high end=frqCenterkHz+128*binSize. The radio receiver being used to monitor the bandwidth need not actually span the full bandwidth. As a result, some of the frequency bins at either end of the spectrum will typically show zero (0) RF power.

| Sub-Field Name | Description and Notes |
| --- | --- |
| frqCenterkHz | Center Frequency of the power vs. frequency lists in kHz. |
| binSizekHz | Size of bins in kHz |

For a single snapshot of the RF spectrum at a moment in time, the sapfListEntries field explained below contains the information of primary interest, namely, the power level in dBm for each of the frequency bins.

| Sub-Field Name | Description and Notes |
| --- | --- |
| timestampSecs | Timestamp seconds, and fractional portion of timestamp in μseconds. The time is counted from the beginning of the test, not from some absolute time (i.e., not like in the UNIX operating system). |
| timestampmicrosecs | |
| powerValuesdBm | Bins (−128 to 127) dBm power values. The value reflects the energy that the radio receiver "sees" in the portion of the frequency spectrum corresponding to this bin. |

The frequency range corresponding to bin "N", where N goes from 0 to 255, is given by:

$$\text{LowFrequency}[N] = \text{sm1SapfMsgHdr\_t.frqCenterKHz} + (N-128) * \text{sm1SapfMsgHdr\_t.binSizeKHz}$$

$$\text{HighFrequency}[N] = \text{sm1SapfMsgHdr\_t.frqCenterKHz} + (N-127) * \text{sm1SapfMsgHdr\_t.binSizeKHz}$$

Spectrum Analyzer Statistics Data

The spectrum analyzer statistics data/messages provide a statistical analysis of the data in the frequency spectrum.

A single message is built from a specified number of FFT cycles, where a single FFT cycle represents an, e.g., 256 frequency bin output of the FFT. For example, 40,000 successive FFTs of the RF spectrum, taken over a total time of 1/10 of a second, are used to construct the statistics for a single message.

Figure 23:
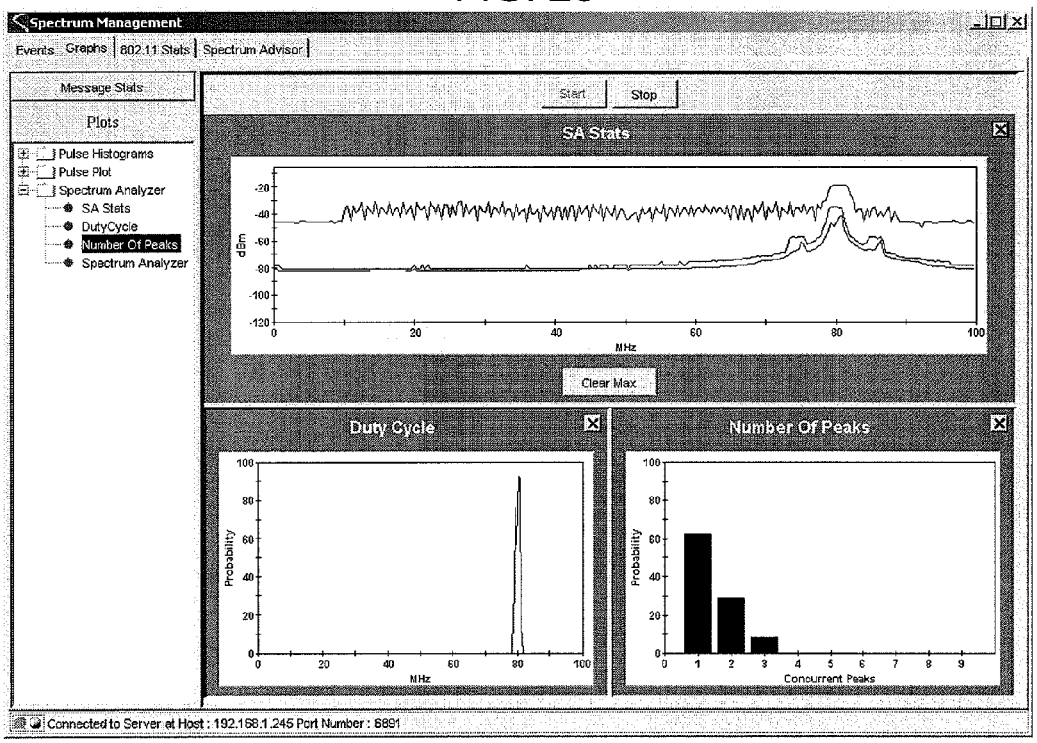

FIG. 23 shows the kind of information that can be conveyed in the spectrum analyzer statistics data. The bottom line shows the average power over the sampling period (i.e., over the 40,000 FFTs, or 1/10 second). The top line represents the "absolute maximum power" over all spectrum analyzer statistics messages received so far.

An example of the overall structure of the spectrum analyzer statistics data is:

| Field Name | Description and Notes |
| --- | --- |
| sm1StdHdr_t | msgType = 46 (SM_MSG_L1_INFO) sessType = 11 (SM_L1_SESS_SASTATS) |
| sm1InfoHdr_t | No special fields |
| sm1SaStatsMsgHdr_t | This field contains general parameters about the statistical sampling process. See format below. |

| Field Name | Description and Notes |
| --- | --- |
| statsBins | 256 Spectrum Analysis Stats Bins. See discussion. |
| activeBins | 10 bins for active peaks. See discussion. |
| quality | A number from 0 to 100 indicating the quality of the entire band. 0 is the worst, 100 is the best. Values 0-33 indicate "POOR", 34-66 indicates "GOOD" and 67-100 indicates EXCELLENT. |

This message header sm1SaStatsMsgHdr_t field contains parameters which describe the sampling process, examples of which are below.

| Sub-Field Name | Description and Notes |
| --- | --- |
| bwkHz | The bandwidth (narrow/wide) for the statistical analysis of the RF spectrum in kHz. Narrowband is approximately 20 MHz, and wideband is approximately 100 MHz. |
| cycleCnt | The number of FFT cycles accumulated into the statistics. This is user configurable, but is typically in the range of 20,000 to 40,000. |
| startTimeSecs | Start timestamp in seconds, and start timestamp, fractional portion, in μseconds, for the current message, indicating when measurements for the current set of statistics began. Measured from when the test started running. |
| startTimeUsecs | |
| endTimeSecs | End timestamp in seconds, and end timestamp, fractional portion, in μseconds, for the current message, indicating when measurements for the current set of statistics finished. Measured from when the test started running. |
| endTimeUsecs | |
| centerFreqkHz | Center Frequency in kHz. User configurable. |
| pwrThreshDbm | dBm of the current power threshold used for duty cycle and active bins information. This represents the minimum power the RF spectrum must have to be counted in the duty cycle and active bin statistics (these statistics are discussed further below). |
| noiseFloorDbm | dBm value of the current noise floor. |

There are, for example, 256 consecutive statsBins, each with four sub-fields as shown in the table below. Each statsBin, with its four subfields, contains the statistical data for a particular bandwidth. To calculate the width of each frequency bin, the following formula may be used:

$$\text{binWidth} = \text{sm1SaStatsMsgHdr\_t.bwKHz}/256$$

The lower and upper bandwidth for each bin is giving by the following formulas:

$$\text{LowBandwidth}[N] = \text{sm1SaStatsMsgHdr\_t.centerFreqKHz} + ((N-128) * \text{binWidth})$$

$$\text{HighBandwidth}[N] = \text{sm1SaStatsMsgHdr\_t.centerFreqKHz} + ((N-127) * \text{binWidth})$$

| Sub-Field Name | Description and Notes |
| --- | --- |
| avgDbm[0] | Average dBm power level (−128 to 127 dBm) for this frequency bin. |
| maxDbm[0] | Maximum dBm power level (−128 to 127 dBm) for this frequency bin. |
| dutyPercent[0] | The percentage of time, multiplied by 2, that the power level for this bin remained above a (user-defined) threshold. |
| avgDbm[1] | Average dBm power level (−128 to 127 dBm) for this frequency bin. |
| maxDbm[1] | Max dBm power level (−128 to 127 dBm) for this frequency bin. |

| Sub-Field Name | Description and Notes |
| --- | --- |
| dutyPercent[1] | The percentage of time, multiplied by 2, that the power level for this bin remained above a (user-defined) threshold. |
| avgDbm[N] | Average dBm power level (−128 to 127 dBm) |
| maxDbm[N] | Max dBm power level (−128 to 127 dBm) |
| dutyPercent[N] | Percentage × 2 that power remained above threshold. |
| avgDbm[255] | Average dBm power level (−128 to 127 dBm) |
| maxDbm[255] | Max dBm power level (−128 to 127 dBm) |
| dutyPercent[255] | Percentage × 2 that power remained above threshold. |

There are ten consecutive activeBins which record "peak" activity. The bins may be viewed as being indexed consecutively, from 0 to 9. For each bin, the value in the bin should be interpreted as follows. In the Nth bin, if the value in the bin is X, then for (X/2) % of the time, there were N peaks in the RF spectrum during the sampling period, except for the special case below for the 10th bin, called bin 9.

| Sub-Field Name | Description and Notes |
| --- | --- |
| activeBins[0] | If the value in this bin is X, then (X/2)% of the time, there were no peaks (0 peaks) in the RF spectrum. |
| activeBins[1] | If the value in this bin is X, then (X/2)% of the time, there was 1 peak in the RF spectrum. |
| activeBins[2] | If the value in this bin is X, then (X/2)% of the time, there were 2 peaks in the RF spectrum. |
| activeBins[8] | If the value in this bin is X, then (X/2)% of the time, there were 8 peaks in the RF spectrum. |
| activeBins[9] | If the value in this bin is X, then (X/2)% of the time, there were 9 or more peaks in the RF spectrum. |

As described above in conjunction with the SAGE 20, peaks are spikes, or very brief energy bursts in the RF spectrum. If a burst persists for a certain period of time (e.g., approximately 2.5 μsec), the SAGE 20 will detect the peak, and the peak will be included in the statistics described in this subsection. Such brief peaks are generally not included in pulse data or pulse statistics. Also as described above, if a series of consecutive peaks are seen over a continuous time period, all at the same frequency, this series—once it reaches some minimum time threshold—it will be counted as a pulse. FIG. 23 also shows how the number of peaks may be displayed associated with activity in the frequency band.

The exact minimum duration of a pulse, for testing purposes, is configurable by the application program, but a typical time may be 100 μsec. Since the SAGE 20 can detect RF events as brief as 2.5 μsec, a typical pulse would need to persist through at least 40 FFTs before being acknowledged as being a pulse.

Pulse Event Data

A signal pulse is a sustained emission of RF energy in a specific bandwidth starting at a specific time. The SAGE 20 detects pulses in the radio frequency band that satisfy certain configurable characteristics (e.g., ranges) for bandwidth, center frequency, duration and time between pulses (also referred to as "pulse gap"). When the SAGE 20 detects a pulse that has these characteristics, it outputs pulse event data for the pulse including:

Start Time—Measured from when the SAGE first begins detecting pulses.

Duration—The lifetime of the pulse.

Center Frequency—The center frequency of the pulse.

Bandwidth—How wide the pulse is.

Power—Average power in dBm.

The overall structure of a pulse event (PEVT) data/message is shown in the table below.

| Field Name | Description and Notes |
| --- | --- |
| sm1StdHdr_t | msgType = 46 (SM_MSG_L1_INFO)<br>sessType = 12 (SM_L1_SESS_PEVT) |
| sm1InfoHdr_t | transactionCnt = number of PEVTs in message; each PEVT contains data on one pulse. |
| classPevts | sm1Pevts: an array of 'transactionCnt' PEVTs of the form 'sm1Pevt_t' shown below. Each field contains data on one pulse |

This information header field is the standard information header for pulse event messages.

| Sub-Field Name | Description and Notes |
| --- | --- |
| transactionSeq | Sequence for this message. This begins with 1 for the first message. For each successive message, it is incremented by the transactionCnt in the previous message. (In other words, it is incremented by the number of pulses reported on in the previous message.) |
| transactionCnt | Number of PEVTs in this message (Pevts). Each PEVT field corresponds to one pulse. |

There may be one or many pulse events in the message. Each instance of the classPevts field below, describes the properties of one pulse.

| Sub-Field Name | Description and Notes |
| --- | --- |
| sdId | This indicates which of 4 internal pulse detectors are being used by SAGE to detect this pulse. |
| termCodeFlags | This byte contains a series of flags which indicate how the pulse was terminated. |
| dBm | Pulse power in dBm. |
| frqCenterkHz | Center Frequency of the pulse in kHz. The value shown will typically range from 0 to 100,000 kHz. To obtain the actual center frequency, add this value to the low end of the frequency spectrum being tested. Example: If the frequency spectrum being tested ranges from 2,350,000 kHz to 2,450,000 kHz, and the frqCenterkHz value is 40,000 kHz, then the actual center frequency of the pulse is approximately 2,390,000 kHz. Note: Actual resolution is ±200 to 500 kHz. |
| bandwidthkHz | Bandwidth of the pulse in kHz. Note: Actual resolution is ±200 to 500 kHz. |
| durationUs | Pulse Duration in μseconds |
| timeOnSecs<br>timeOnUsecs | Pulse Time On, seconds portion; and Pulse Time On, fractional portion in μseconds. The time the pulse began is measured from when the test started running, not from someone absolute, fixed date. |

Pulse Histogram Data

While it is possible to access information about individual pulses, it may also be useful to work with the statistical information about pulses detected and occurring in the frequency band over time. That information is provided by pulse histogram data. The pulse histograms track distributions of: duration of the pulses (the percentage of pulses with short, medium, and long durations); gaps in time between the pulses (the percentage of pulses with short time gaps between them, medium time gaps, and long time gaps); bandwidth of pulses; frequency of pulses; and power of pulses.

Figure 24:
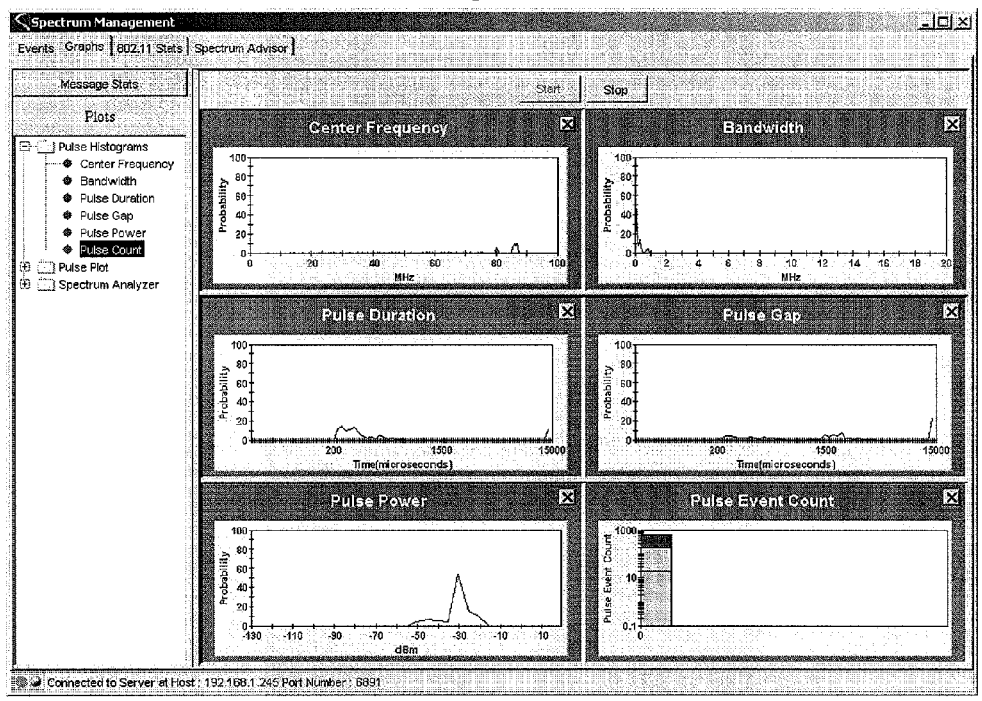

FIG. 24 illustrates graphical displays for exemplary pulse histograms.

The overall structure of the pulse histogram data is shown in the following table.

| Field Name | Description and Notes |
| --- | --- |
| sm1StdHdr_t | msgType = 46 (SM_MSG_L1_INFO) sessType = 13 (SM_L1_SESS_CLASS) |
| sm1InfoHdr_t | no special fields |
| sm1PhistMsgHdr_t | Provides detailed information about the sampling process. |
| pulseDurationHistogram | Pulse Duration Histogram |
| pulseGapHistogram | Pulse Gap Histogram |
| pulseBandwidthHistogram | Pulse Bandwidth Histogram |
| centerFreqHistogram | Center Frequency Histogram |
| powerHistogram | Power Histogram |

This PhistMsgHdr field describes the frequency spectrum which is being monitored, and some other parameters of the overall sampling process.

| Sub-Field Name | Description and Notes |
| --- | --- |
| classMsgType | SM1_CLASS_PHIST_MSG == 1, (Pulse Histogram Msg) |
| numSampleIntervals | Number of sample intervals. If a dedicated radio receiver is continually listening for pulses, this value will be 1 (indicating a single sampling interval). If the radio device is doubling as a transmitter, then it cannot listen all the time; this parameter will indicate the number of times the radio device was actually able to listen for pulses. |
| avgSampleDurationMs | Average sample time size in msec. If a dedicated radio device is continually listening for pulses, this value will be the same as the amount of time the SAGE 20 has been instructed to listen for pulses before sending statistical data. If the listening device cannot listen all the time, then multiply: TALT = avgSampleDurationMs * numSampleIntervals to obtain the total actual listening time (TALT). To obtain the fraction of listening time, divide the TALT by the amount of time the CLP has been instructed to listen for pulses before sending statistical data. [The total listening time can also be calculated from the fields below: endTimeSecs + endTimeUsecs − (startTimeSecs + startTimeUsecs)] |
| histBwkHz | Histogram bandwidth in kHz |
| histCenterFreqkHz | Histogram Radio Center frequency in kHz |
| startTimeSecs startTimeUsecs | Start timestamp seconds, and start timestamp, fractional portion in microseconds. This is measured from when the pulse histogram operation was initiated, not from some absolute starting time (i.e., not like in the UNIX operating system). |
| endTimeSecs endTimeUsecs | End timestamp seconds, and end timestamp, fractional portion in microseconds. Again, this is measured from when the pulse histogram operation was initiated. |
| numPulseEvents | Number of pulse events recorded for this histogram. |

The pulse duration histogram fields contain a series of bytes. Each of the data bytes, or bins—in sequence—indicates the percentage (multiplied by two) of pulses that fall into a given range of durations. The table below categorizes data into smallBins, mediumBins, and largeBins and are only examples of how to track pulse duration.

The first bin (bin 0) contains the percentage (×2) of pulses that were between 0 μsec and 9 μsec. The second bin (bin 1) contains the percentage, multiplied by 2, of pulses that were between 10 μsec and 19 μsec in duration. Each of these "bins" is 10 μsec wide. This continues up to the 20th bin (bin 19), whose value is the percentage, multiplied times 2, of pulses that were between 190 and 199 μsec in length.

The next twenty-six bins are similar, except they are wider; specifically, they are 50 μsec wide. Bin 20 has a value which indicates the percentage (×2) of pulses that were between 200 μsec and 249 μsec in length. Again, there are twenty-six bins which are 50 μsec wide. Bin number 45 has a value which indicates the percentage (times 2) of pulses that were between 1450 μsec and 1499 μsec in length.

The final set of 27 bins each indicate the percentage (×2) of pulses that are wider still, specifically 500 μsec wide. Bin number 46 includes pulses whose duration was between 1500 μsec and 1999 μsec in length. Bin 72 includes pulses whose duration was between 14499 and 14999 μsec.

Pulse Duration Histogram Bins

| Sub-Field Name | Description and Notes |
| --- | --- |
| smallBins | Each bin contains the percentage (×2) of pulses that fell within a 10 μsec range. The range starts with 0 μsec to 9 μsec, and increases by 10 μsec for each consecutive byte. The final bin (bin number 19) covers pulses with widths between 190 to 199 μsec. |
| mediumBins | Each bin contains the percentage (×2) of pulses that fell within a 50 μsec range. The range starts with 200 μsec to 249 μsec, and increases by 50 μsec for each consecutive bin. The final bin-which is the 26th bin of the mediumBins, the 46th bin overall, and is numbered as bin 45-covers pulses with widths between 1450 to 1499 μsec. |
| largeBins | Each bin contains the percentage (×2) of pulses that fell within a 500 μsec range. The range starts with 1500 μsec to 1999 μsec, and increases by 5000 μsec for each consecutive bin. The 73rd bin (which is numbered as bin 72) covers pulses with widths between 14499 to 14999 μsec. |

The pulse gap histogram indicates the percentage (multiplied by two) of gaps between pulses, where the duration of the gap falls within a given time range. The bins do not reflect when the gaps occurred, they reflect how long the gaps were. Gaps are measured between the start of one pulse and the start of the next. This is because the start of a pulse tends to be sharply delineated, while a pulse may trail off more gradually. For example, assume there were a total of twenty gaps between pulses. Of these twenty, only two gaps had a duration between 10 μsec and 19 μsec. The first gap, which lasted 12 μsec, occurred at time 15.324 seconds. The second gap, which lasted 15 μsec, occurred at time 200.758 seconds. Both gaps are recorded in the second bin (numbered as bin 1). Since the two gaps reflect 10% of all recorded gaps, the value in the second bin (bin 1) will be 2×10%=20 (since all percentages are multiplied by two).

Pulse Gap Histogram Bins

| Sub-Field Name | Description and Notes |
| --- | --- |
| smallBins | Each consecutive bin contains the percentage (×2) of gaps between pulses, where the length of the gap fell within a 10 μsec range. The range starts with gaps that are 0 μsec to 9 μsec long, and increases by 10 μsec for each consecutive byte. The 20th and final bin (bin number 19) covers gaps whose duration was between 190 to 199 μsec. |

-continued

| Sub-Field Name | Description and Notes |
| --- | --- |
| mediumBins | Each bin contains the percentage (×2) of gaps whose duration fell within a 50 µsec range. The range starts with 200 µsec to 249 µsec (so all gaps whose duration is within this range are included in this first bin, number 20), and increases by 50 µsec for each consecutive bin. The final bin-which is the 26th bin of the mediumBins, the 46th bin overall, and is numbered as bin 45-covers gaps whose duration was between 1450 to 1499 µsec. |
| largeBins | Each bin contains the percentage (×2) of gaps whose duration fell within a 500 µsec range. Gaps whose duration was between 2500 µsec to 2999 µsec are reflected in the first bin; each consecutive bin increases the duration by 5000 µsec. The final bin-which is the 27th bin of the largeBins, the 73rd bin overall, numbered as bin 72-covers gaps with widths between 14499 to 14999 µsec. |

For the pulse bandwidth histogram, each data bin reflects a progressively wider bandwidth. For example, if the first bin represents pulses from 0 to 9.999 kHz in width, then the second bin represents pulses from 10 kHz to 19.999 kHz, the third bin pulses from 20 kHz to 29.999 kHz in width, etc. The value stored in the bin is the percentage (×2) of the pulses that had a bandwidth somewhere within the indicated range. For example, assume the size of each bin is 80 kHz. Suppose also that the SAGE 20 detected 1000 pulses and there are 256 frequency bins. The pulses with a bandwidth between 0 and 20,480 kHz. As another example, assume the SAGE 20 detects 65 pulses, each of which had a bandwidth somewhere between 400 and 480 kHz. Then, 6.5% of the pulses fall within the sixth bandwidth range, so the 6th bin (bin number 5) will have a value of 2×6.5%=13.

The bandwidth bins may have exactly the same width. For example, if the first bin is 80 kHz wide (and includes data for pulses with bandwidths from 0 to 79.999 kHz), then all successive bins will be 80 kHz wide. The second bin includes pulses from 80 kHz to 159.999 kHz; and the 256th bin—still 80 kHz wide—includes pulses with bandwidths from 20,400 kHz to 20,479.999 kHz.

Pulse Bandwidth Histogram Bins

| Sub-Field Name | Description and Notes |
| --- | --- |
| binSizekHz | Size of bin in kHz. |
| numBinsUsed | N, for example 256. |
| freqBins | The percentage (×2) of pulses which have a bandwidth corresponding to the bandwidth of this byte. The first byte (byte 0) represents pulse bandwidths from 0 to binSizekHz. The second byte (byte 1) represents pulse bandwidths from binSizekHz to 2 × binSizekHz. (So byte 1 contains the % * 2 of pulses whose bandwidth fell within this range.) In general, the $N^{th}$ bin represents pulses with bandwidths between (N − 1) * binSizekHz, and N * binSizekHz. Again, the value of the byte represents the % * 2 of pulses whose bandwidths fell within this range. |

For the pulse center frequency histogram, each data bin reflects a range of frequencies. The value stored in the bin is the percentage, multiplied times two, of the pulses whose center frequency fell within the indicated range of frequencies.

All frequency bins may be exactly the same width. However, in general, the lowest bin (byte number 0) does not start with the frequency 0 Hz. Recall that the pulse histogram message header (PhistMsgHdr_t) has a sub-field histCenterFreqkHz, which is measure in kHz. This field defines the center frequency for the pulse center frequency histogram.

The following formulae give the actual frequency range covered by each bin of this histogram, indicating both the low frequency and the high frequency of the range. The number N is the bin number, where bin numbers are counted from freqBins 0 to freqBins 255:

Low Frequ.(bin $N$)=histCenterFreqkHz−(128*binSizekHz)+($N$*binSizekHz)

High Frequ.(bin $N$)=histCenterFreqkHz−(128*binSizekHz)+(($N$+1)*binSizekHz))

Suppose the size of each bin, in kHz, is 100 kHz, and that the bandwidth is 2.4 GHz. Frequencies are actually being monitored in the range from 2,387,200 kHz to 2,412,800 kHz. Suppose also that SAGE 20 detected 1000 pulses, and 80 pulses with center frequencies in the range from 2,387,600 kHz to 2,387,699 kHz. Then 8% of the pulses fall within the fifth bandwidth range, so bin 4 will have a value of 2×8%=16.

The field structure for the pulse center frequency histogram is indicated in the table below.

Pulse Center Frequency Histogram Bins

| Sub-Field Name | Description and Notes |
| --- | --- |
| binSizekHz | Size of bin in kHz, |
| numBinsUsed | N, for example 256. |
| freqBins | The percentage (×2) of pulses that have a central frequency corresponding to this byte. |

For the pulse power histogram, each bin reflects a certain power range, measured in dBm. The value of each bin reflects the percentage (×2) of those pulses whose power level fell within the indicated range.

Pulse Power Histogram Bins

| Sub-Field Name | Description and Notes |
| --- | --- |
| powerBins | Each bin indicates the % (×2) of those pulses which fell within the bin's designated power range. The range of each bin is 5 dBm, and the lower power of the lowest bin is −130 dBm. Therefore:<br>bin[0] = −130 to −126 dBm<br>bin[1] = −125 to −121 dBm<br>bin[2] = −120 to −116 dBm<br>. . .<br>bin[N] = −130 + (N * 5) to −126 + (N * 5)<br>. . .<br>bin[29] = +15 to +19 dBm |

Snapshot Data

Snapshot data, unlike other data provided by the NSI, is not based on data analysis by the SAGE or software. Rather, this data provide raw data from the ADC which precedes the SAGE and that converts the received signal analog signal to digital data.

The raw ADC data may be expressed in n-bit I/Q format, where 'n' is indicated by 'bitsPerSample'. The snapshot samples can be used for location measurements, or for detailed pulse classification (such as identifying the exact model of a device). The size of the sample data contained in 'snapshotSamples' is typically 8 K bytes. The overall structure of the message is shown in the following table.

| Field Name | Description and Notes |
|---|---|
| sm1StdHdr_t | msgType = 46 (SM_MSG_L1_INFO)<br>sessType = 17 (SM_L1_SESS_SNAP) |
| sm1InfoHdr_t | transactionCnt = 1 |
| smSnapshotMsg_t | Snapshot message body. K is 24 + 'snapshotSamplesLen' |

An example of a snapshot message smSnapshotMsg_t field is defined below.

| Sub-Field Name | Description and Notes |
|---|---|
| snapshotStartSecs | TARGET snapshot time in seconds |
| snapshotStartNanosecs | TARGET snapshot time in nanoseconds. |
| numberOfSamples | Number of IQ Snapshot Samples |
| bitsPerSample | Number of bits in a sample |
| radioGainDb | Radio gain in dB: −127 to 128 dB<br>This is the radio gain used at the start of the sample interval. It may be used to convert the raw IQ samples into corresponding dBm power levels. |
| pulseDetectorId | Pulse Detector ID. Value of 0xFF indicates that a Pulse Detector was NOT used to trigger sampling. |
| reserved | Reserved for future expansion |
| snapshotSamplesLen | Number of bytes (N) in the 'snapshotSamples' field below. |
| snapshotSamples | Sample data. The size of this snapshotSamples is typically 8k Bytes. Size N is the value in 'snapshotSamplesLen'. |

Spectrum Event Data (e.g., Monitoring Activity of Signals)

The msgType for spectrum event data is 46 and the sessType is 14 (SM_L1_SESS_EVENT). A format for the smEventMsg_t spectrum event message field is described in the table below.

| Sub-Field Name | Description and Notes |
|---|---|
| EventType | Character string. Up to 16 characters, null terminated. Some typical examples of event types are: "Information", "Identification", "Interferer", "Error". |
| EventDateTime | Number of seconds past an arbitrary date, e.g., Jan. 1, 1970 when smEventMsg was received. This field is essentially a placeholder; the value must be filled in by the receiving application. 0 is sent by the target. Displayed as hh:mm:ss mm/dd/yyyy. |
| EventTimestampSecs | TARGET event timestamp in seconds. Times are measured from when the monitoring began of the environment, not from some absolute calendar time. |
| EventTimestampUsecs | TARGET fractional portion of timestamp in microseconds. Times are measured from when the monitoring began of the environment, not from some absolute calendar time |
| EventId | Specific ID numbers are assigned to specific types of events. For example, a microwave oven startup may be '1', a Bluetooth device may be '2', a cordless phone may be '3', etc.<br>For "Interferer" event messages, the following format applies:<br><br>\| Low Address Byte \| High Address Byte \|<br>\|---\|---\|<br>\| 16 High Bits - Reserved \| 15 Bits - Device ID \| 1-Bit: On/Off \|<br><br>The Device ID must be combined with the On/Off bit to obtain the actual numeric value of the field. For example, if the Device ID for a Bluetooth™ device is '2', the fifteen-bit pattern is '0000 0000 0000 010'. But with the On/Off bit appended to the right, the bit pattern becomes:<br>'0000 0000 0000 0101' = Decimal 5 (device on), or<br>'0000 0000 0000 0100' = Decimal 4 (device off). |
| EventSourceId | Identifies the target source. This parameter is only significant when more than one source (for example, more than one AP) is feeding data to the requesting software or system. |
| AlertLevel | Warning Levels for Messages<br><br>\| Value \| Severity \| Suggested Display Colors \|<br>\|---\|---\|---\|<br>\| 1 \| Severe \| Red \|<br>\| 2 \| High \| Orange \|<br>\| 3 \| Elevated \| Yellow \|<br>\| 4 \| Guarded \| Blue \|<br>\| 5 \| Low \| Green \| |
| EventMsg | This is a brief character string message, null terminated, which identifies the event that caused the message. For example, it may say "Microwave oven has started", or "Cordless phone". The content of the message is essentially redundant with the EventId (above), except that it provides text instead of a numeric identifier. |
| EventDescription | The event description will typically contain more detailed information, and will often include advisory and/or recommendation information as to how to resolve interference or other situation caused by the event source. |
| EventDetail | The event detail will generally include pertinent technical parameters, such as power levels or frequency bandwidth associated with the event. Newline characters delimit individual lines. |

Examples of the manner in which spectrum event messages may be displayed are shown in FIGS. 16-20, and described hereinafter.

Software and systems communicate requests to the NSI for data from the services on the other side of the NSI using the session control messages referred to above. An example of the format of the session control messages is as follows. There is a standard header followed by information elements. An information element is a data structure with several parts, as described in the following table:

| Field Name | Description |
|---|---|
| infoElementLen | Number of bytes in this information element, including this length field. |
| infoElementType | Information element type number. This type is used to distinguish the information element. The types are UNIQUE across ALL messages. Ex: An 'infoElementType' of '1' indicates "Reject Reason", and has a particular meaning independent of the 'sm1StdHdr_t.msgType' field. |
| infoElementBody | This contains the significant data of the information element, and may have one or more sub-fields. The information element body. The format of the data is determined by the infoElementType field. |

Typical information elements provide data such as the SAGE configuration data, radio configuration data, and service specific data (e.g., pulse data, spectrum data, etc.). Examples of NSI information elements are provided in the table below:

| Information Element Name | infoElementType (decimal) | Description |
| --- | --- | --- |
| IE_RETURN_CODE | 1 | Activity completion status return code information |
| IE_SESSION_CFG | 2 | Session priority and startup configuration |
| IE_SAGE_CFG | 3 | Common SAGE Config effecting multiple services |
| IE_RADIO_CFG | 4 | Common radio configuration |
| IE_COPY_CFG | 5 | Request copy of any data for that service, with optional notification of configuration updates. |
| IE_SAPF_CFG | 6 | Spectrum Analyzer Power vs. Frequency configuration |
| IE_PD_CFG | 7 | Pulse Detector Configuration |
| IE_SA_STATS_CFG | 8 | Spectrum Analyzer Stats configuration |
| IE_PHIST_CFG | 9 | Configuration of PHIST service |
| IE_PEVT_CFG | 10 | Configuration of PEVT service |
| IE_SNAP_CFG | 12 | Snapshot Buffer configuration |
| IE_VENDOR_CFG | 13 | Vendor specific configuration information. |
| IE_FLOW_CTRL | 15 | INFO Message Flow Control |
| IE_VERSION | 16 | Version of NSI being used. |

There is an advantage to using information elements in NSI session control messages. The format of session control messages can be modified or expanded over time, as technology is further developed, while requiring no revisions to existing software or systems that use the NSI. In other words, enhancements to the messages do not break legacy code.

In traditional software design, the network management software would be coded with the expectation of specific data structures for each of the session control messages. Any time the session control messages were changed or enhanced, changes would be required in the code for the network management software, and the code would need to be recompiled.

With session control messages, however, this is no longer necessary. Session control messages are processed as follows.

1. The requesting software or system reads the message header, and determines what kind of message it is receiving.

2. Software developers know what kinds of information elements will follow the header field based on a specification document. Design decisions are made to determine what kinds of actions the software or system will take in response to those information elements.

3. In the code itself, after reading the header field, the software loops through information elements which follow. Only for information elements of interest—which can by flagged by the infoElementType field in each information element—the software takes appropriate action.

Additional information elements may be added to some of the session control messages. However, during the "looping" process the requesting software ignores any information elements which are not of interest to it, so the additional information elements in the control messages do not require any changes in the software code. Of course, it may be desirable to upgrade a software program to take advantage of additional types of information; but again, until that new software is in place, existing software continues to function.

This benefit works in both directions. For example, in sending messages to the NSI, the software program can send an information element which fine-tunes the behavior of the SAGE. Typically, however, SAGE's default operating modes are satisfactory, and there is no need to make changes. Rather than having to send an information element containing redundant, default configuration data for SAGE, this information element can simply be omitted.

A handshaking type protocol may be used to setup, initiate and terminate a session between the application and the NSI. There are numerous techniques known in the art to provide this function. For example, all tests are started by sending a sm1StdHdr_t field. Additional, optional information elements may follow. The NSI responds with messages indicating that the test has started successfully; that it was rejected; or that the test is pending (the test is queued behind other requests for the same service). The four possible session control reply messages are Started, Pending, Rejected, and Stop.

All Start Messages may have the following structure:

1. A required sm1StdHdr_t field with a msgType value of SESS_START_REQ (40), and a value for sessType to indicate the test to be performed. This field may come first. For example, to start a pulse event test, the sessType value of 12 is used, to start a pulse histogram test, a sessType value of 13 is used, to start a spectrum analyzer power vs. frequency test, a sessType value of 10 is used, etc.

2. An optional common session configuration information element. This configures parameters which are of interest for all the possible tests, described below.

3. For the Pulse Event test only, an optional information element to configure the pulse detectors.

4. Optional information elements to configure the SAGE and the radio.

5. An optional, vendor-specific information element, typically (but not necessarily) related to further configurations to the radio.

6. An optional session-type specific information element, with configuration information for the particular test (PEVT, PHIST, SAPF, etc.).

The general/common session configuration element IE_Session_CFG is optional when starting tests, i.e., with SESS_START_REQ. If it is not sent, the default values are used.

| Sub-Field Name | Description |
| --- | --- |
| infoElementLen | Len = 20 |
| infoElementType | IE_SESSION_CFG = 2 |
| infoElementBody | |
| pendingTimeoutMs | Number of milliseconds before "START" times out. A value of '0' (default) indicates that the START request |

-continued

| Sub-Field Name | Description |
|---|---|
| | should NOT be queued (that is, no SESS_PENDING_RSP, or session pending response, is allowed). |
| configStopFlags | This field has an Offset of 8/36; it has a size of 4 bytes. Sometimes it is desired that the service which is now being started should later stop if certain other services are reconfigured; the reconfiguration(s) which stops the current service is indicated by these flags:<br>0x00000000: Do not stop for any reconfig    0x00000001: SAgE Config<br>0x00000002: Radio Config    0x00000004: SAPF Config<br>0x00000008: SA_STATS Config    0x00000010: SNAP Config<br>(Note that there are four pulse detectors (PDs), numbered 0 through 3.)<br>0x00000020: PD 0 Config    0x00000040: PD 1 Config<br>0x00000080: PD 2 Config    0x00000100: PD 3 Config<br>0x00000200: PHIST Config    0x00000400: PEVT Config<br>0x00000800: 80211_STATS Config    0x00001000: Vendor Config<br>0xFFFFFFFF: Use Default Value (depends on service type, see sub-table below)<br>1. These 'configStopFlags' allow cross-service interdependence. It may seem odd to abort an Spectrum Analyzer vs. Power Frequency (SAPF) session when, say, a PD 0 (pulse detector 0) is reconfigured. However there may be cases where the use of the outputs of these sessions are interrelated, particularly for event classification software.<br>2. If a session attempts to reconfigure a service to the same values that it already has, the service is NOT stopped and the reconfiguration is considered "successful".<br>3. Flags can be combined. For example, 0x00000003 flags both SAGE and Radio Config<br>4. The default value depends on the service type: |

| Service | configStopFlags |
|---|---|
| ALL SERVICES EXCEPT 802.11 STATS | SAGE, Radio, Vendor Configs |
| Spectrum Analyzer (SAPF) | SAPF Config |
| Spectrum Analyzer Stats (SA_STATS) | SA_STATS Config |
| Pulse Event (PEVT) | PD 0, PD 1, PD 2, PD 3, PEVT Configs |
| Pulse Histogram (PHIST) | PD 0, PD 1, PD 2, PD 3, PHIST Configs |
| 802.11 Stat (80211_STATS) | 802.11 Stats, Radio, Vendor Configs |
| Snapshot Buffer (SNAP) | SNAP Config |

| Sub-Field Name | Description |
|---|---|
| sessionDurationMs | Duration of session in ms. 0 (the default) indicates no limit to the duration. |
| sessionPriority | 1 = highest, 254 = lowest, 255 (0xFF) requests the default session priority. |

The radio is configured to a starting bandwidth (either 2.4 GHz or one of the 5 GHz bands, for example) before the NSI can begin any testing. Similarly, before many pulse test services can be run, at least one (if not more) of SAGE's four pulse detectors need to be configured at least once. These services include Pulse Events, Pulse Histograms, Snapshot Data, and Spectrum Analyzer Power vs. Frequency (but only if this test is to be triggered by pulse events). Once the pulse detectors are configured, they can be left in their initial configuration for subsequent tests, although the application program can reconfigure them.

The radio configuration element IE_Radio_CFG is described in the table below. It is used to fine-tune the performance of the radio. If the information element is not sent as part of the message, the radio is configured to the default values.

| Sub-Field Name | Description |
|---|---|
| infoElementLen | Len = 8 |
| infoElementType | IE_RADIO_CFG = 4 |
| infoElementBody | |
| cfreqKHz | Center Frequency in kHz. Ex: 2400000 for 2.4 GHz There is no default value for this parameter. The radio must be configured to a starting center frequency by the user before 802.11 communications can begin (and of course, before the NSI can begin any testing), using either this information element or the vendor-specific information element. |

-continued

| Sub-Field Name | Description |
| --- | --- |
| radioBwKHz | Radio bandwidth in kHz. Examples:<br>83000 (83 MHz wideband radio) [default value]<br>23000 (23 MHz narrow band radio) |

The SAGE configuration information element IE_SAGE_CFG is optional. It fine-tunes the performance of the SAGE 20. If the information element is not sent as part of the message, the SAGE 20 is configured to the default values. An example of the SAGE configuration element is set forth below.

| Sub-Field Name | Description |
| --- | --- |
| infoElementType<br>infoElementBody | IE_SAGE_CFG = 3 |
| lpfParm | Low Pass Filter Parameter:<br>Parameter Value / Low Pass Filter Value<br>0 / 1<br>1 / ½<br>2 / ¼<br>3 / ⅛<br>4 / 1/16<br>5 / 1/32<br>6 / 1/64<br>7 / 1/128<br>0xFF / use default |
| sageCfgFlags | Flags to indicate if custom radioGain, AGC (automatic gain control) config, and/or narrow-band SAGE mode are requested:<br>0x01: radioGainControl indicated below (in the radioGainControl field) is used.<br>0x02: agcControl indicated below (in the agcControl field) is used.<br>0x04: narrow band (20 MHz) SAGE Mode (rather than wideband, or 100 MHz, which is the default)<br>Flags correspond to bit settings for this byte, so 0x01 is the right-most bit;<br>0x02 is the second bit from the right;<br>0x04 is the third bit from the right.<br>Any combination of flags may be set. If the corresponding flag is '0' then the default value for these fields are used. |
| radioGainControl | This value is used if the matching bit is set in the sageCfgFlags. |
| agcControl | This value is used if the matching bit is set in the sageCfgFlags. "agc" stands for automatic gain control. |

The IE_VENDOR_CFG information element contains vendor specific configuration information. Typically this is a configuration that is specific to the particular radio in use.

| Sub-Field Name | Description |
| --- | --- |
| infoElementType<br>vendorInfo | IE_VENDOR_CFG = 13<br>Vendor specific information. Format defined by Vendor. |

The NSI provides a pulse detector configuration element (IE_PD_CFG) which is used to configure the pulse detectors. This element must be used the first time the pulse detectors are configured. It is also used if and when the pulse detectors are reconfigured (which may be infrequent). The optional pulse events test configuration element (IE_PEVT_CFG) are shown in the table below. If this configuration element is not sent, the default values are used for the test.

| Sub-Field Name | Description |
| --- | --- |
| infoElementType | IE_PEVT_CFG = 10 |
| maximumNumPevts | Maximum number of Pulse Events in a given PEVT message (Default = 30) |
| pdUsed | These bit flags select which Pulse Detector(s) to use:<br>0x01: PD 0 used    0x02: PD 1 used<br>0x04: PD 2 used    0x08: PD 3 used<br>Flags can be combined to indicate more than one pulse detector. For example, 0x0D (binary 0000 1101) indicates the use of pulse detectors 0, 2, and 3. A value of 0xF (binary 0000 1111) indicates to use all detectors (default value). |

Configuring the pulse detectors involves selecting which pulse detector(s) to use for a test. It also involves providing parameters which indicate the kind of signal pulse (for example, ranges for signal power, pulse duration, pulse center frequency, etc.) will, in fact, be interpreted as being a pulse. There are a variety of options when dealing with pulse detectors:

Use the existing pulse detector configuration for the service.

Allocate a currently unused detector.

Reconfigure an existing pulse detector.

Release a pulse detector so that other sessions may use it.

Whether configuring a pulse detector before using it for the first time, or reconfiguring the detector, the header field will first be sent with a particular msgType. This will be followed by the pulse detector configuration element, IE_PD_CFG, described in the table below. (Other information elements may be included in the message as well.) Pulse detectors are selected using PD_ID sub-field values from 0 to 3. These do not correspond to physical pulse detectors; rather, they are a logical reference to a pulse detector that is used by that transport connection supporting the sessions.

| Field Name | Description |
| --- | --- |
| infoElementType | IE_PD_CFG = 7 |
| pdID | Session Pulse Detector ID. Values of 0 to 3, for example. |
| configActionType | Configuration Action Type:<br>1: Allocate and configure the pulse detector for use by this session.<br>2: Reconfigure the existing pulse detector<br>3: Release the pulse detector for others to use. (If value is '3' then the remaining fields are ignored). |
| configProfile | Configuration Profile:<br>0: Use the profile fields below. In other words, use '0' for this field in order to completely determine the Pulse Detector configuration, using the remaining parameters in this information element.<br>Any allowed non-zero value (currently 1 for short pulses, and 2 for long pulses): Selects one of several pre-defined configurations, suitable for detecting pulses from different kinds of sources. In this non-zero case, the remaining fields below are ignored. |
| bwMinkHz | Minimum pulse bandwidth in kHz. |
| bwMaxkHz | Maximum pulse bandwidth in kHz. |
| bwHoldkHz | Bandwidth hold value in kHz. |
| bwThreshDbm | dBm threshold value used to define a pulse. |
| cfreqMinkHz | Minimum value of pulse center frequency. Value is number of kHz from the start of the radio band. |
| cfreqMaxkHz | Maximum value of pulse center frequency in kHz. |
| cfreqHoldkHz | Center Frequency Hold value in kHz. |
| durMinUsecs | Minimum Pulse Duration in µseconds. |
| durMaxUsecs | Maximum Pulse Duration in µseconds. |

| Field Name | Description |
|---|---|
| durMaxTermFlag | Action to be performed on Duration Max:<br>0: Terminate Pulse with TERMCODE 0 (max duration pulse)<br>1: Discard Pulse (pulse is ignored) |
| pwrMinDbm | dBm value indicating the minimum pulse power. |
| pwrMaxDbm | dBm value indicating the maximum pulse power. |
| pwrHoldDbm | power hold value. |

The field bwThreshDbm takes a signed dBm value that helps determine which RF signals will be counted as pulses. A pulse is defined by a series of time-contiguous, and bandwidth continuous "peaks", or brief spikes, which determine the overall bandwidth of the pulse (thus the reference to "bandwidth threshold"). A "peak floor" is established to determine which spikes of radio energy qualify as a valid "peak". Energy spikes below this "peak floor" do not qualify, whereas those above the "peak floor" do qualify. The bwThreshDbm parameter determines the "peak floor" based on whether 'bwThreshDbm' is positive or negative:

If bwThreshDbm is negative (ex: −65 dBm), then the peak floor is the same as the value of bwThreshDbm.

If bwThreshDbm is positive (ex: 24 dBm), then the peak floor is determined dynamically based on the current noise floor:

peak floor dBm=noise floor dBm+bwThreshDbm.

The noise floor based mechanism (bwThreshDbm is positive) is used almost exclusively because it responds well to changes in the radio spectrum environment.

There may be pre-defined pulse detection configurations, shown in the table below, to detect certain types of signal pulses.

| IE_PD_CFG configProfile Field Value | Profile Name | Profile Description/Notes |
|---|---|---|
| 1 | ShortPulse1 | Captures short pulse frequency hoppers, including Bluetooth headsets and many cordless phones. |
| 2 | LongPulse1 | Captures long pulses output by microwave ovens and television transmissions (infant monitors, surveillance cameras, X-10 cameras, etc.). |

This following short pulse profile is suitable for detecting short pulse frequency hoppers, such as Bluetooth™ headsets and many cordless phones.

| IE_PD_CFG field name | Profile field value | Notes |
|---|---|---|
| bwMinkHz | 300 | Pulse BW from 300 kHz to 4 MHz, with 4.5 MHz hold |
| bwMaxkHz | 4000 | |
| bwHoldkHz | 4500 | |
| bwThreshDbm | 24 | Pulse defined 24 dBm above noise floor. |
| cfreqMinkHz | 6000 | 6 MHz to 94 MHz center frequency, with 2 MHz hold. |
| cfreqMaxkHz | 94000 | |
| cfreqHoldkHz | 2000 | |
| durMinUsecs | 250 | Pulse durations from 250 to 2000 μs. |
| durMaxUsecs | 2000 | |
| durMaxTermFlag | 1 | Discard the pulse if it is equal to, or longer than, the maximum duration of 2000 μs. |
| pwrMinDbm | −85 | Pulse power from −85 to 0 dBm, with 15 dB hold. |
| pwrMaxDbm | 0 | |
| pwrHoldDbm | 15 | |

The following long pulse profile is suitable for detecting long pulses output by Microwave Ovens and television transmissions (infant monitors, surveillance cameras, X-10 cameras, etc.).

| IE_PD_CFG field name | Profile field value | Notes |
|---|---|---|
| bwMinkHz | 300 | Pulse BW from 300 kHz to 20 MHz, with 8 MHz hold |
| bwMaxkHz | 20000 | |
| bwHoldkHz | 8000 | |
| bwThreshDbm | 24 | Pulse defined 24 dBm above noise floor. |
| cfreqMinkHz | 6000 | 6 MHz to 94 MHz center frequency, with 8 MHz hold. |
| cfreqMaxkHz | 94000 | |
| cfreqHoldkHz | 8000 | |
| durMinUsecs | 2800 | Pulse durations from 2800 to 8000 μs |
| durMaxUsecs | 8000 | |
| durMaxTermFlag | 0 | Do not discard long pulses |
| pwrMinDbm | −70 | Pulse power from −70 to 0 dBm, with 20 dB hold. |
| pwrMaxDbm | 0 | |
| pwrHoldDbm | 20 | |

Before running a pulse histogram test for the first time, the pulse detectors need to be configured. This is done by first running a pulse event test, described above. A session control message is sent containing a header field with a sessType value of '13'. That is followed by the optional information elements, as shown in the table below detailing the optional pulse histogram test configuration element (IE_PHIST_CFG). If it is not sent, the default values (shown in the table) are used.

| Sub-Field Name | Description |
|---|---|
| infoElementType | IE_PHIST_CFG = 9 |
| forwardTimeoutMs | Number of milliseconds between each Pulse Histogram message update. The default is 1000 (which yields 1 Pulse Histogram message each second). |
| pdUsed | These bit flags select which Pulse Detector(s) to use:<br>0x01: PD 0 used    0x02: PD 1 used<br>0x04: PD 2 used    0x08: PD 3 used<br>Flags can be combined to indicate more than one pulse detector. For example, 0x0D (binary 0000 1101) indicates the use of pulse detectors 0, 2, and 3. A value of 0xF (binary 0000 1111) indicates to use all detectors (default value). |

The spectrum analyzer power vs. frequency test is started by sending a session control message containing a header field with a sessType value of '10'; that is followed by the optional information elements, as shown below.

| Sub-Field Name | Description |
| --- | --- |
| infoElementType | IE_SAPF_CFG = 6 |
| usecsBetweenSamples | This value indicates the number of µseconds between spectrum analyzer power vs. frequency samples. The default value of 100,000 translates to 10 samples per second. |
| transitionalPdUsed | Indicates of which PD to use for Transitional Mode.<br>0x00: PD 0 used  0x01: PD 1 used<br>0x02: PD 2 used  0x03: PD 3 used<br>0xFF: Transitional mode NOT USED (default value)<br>If 'transitionalPdUsed' is not equal to 0xFF, then the SAPF sample collection is turned on and off via the specified Pulse Detector. When the Pulse Detector is ON (a pulse is in progress), SAPF samples are collected. When the Pulse Detector transits to OFF, the samples are stopped. The time between samples sent to the user is still determined by 'usecsBetweenSamples'. |

The spectrum analyzer statistics test is started by send a session control message containing a header field with a sessType value of '11'. That is followed by the optional information elements, as described below.

| Sub-Field Name | Description |
| --- | --- |
| infoElementType | IE_SA_STATS_CFG = 8 |
| usecsBetweenSamples | Indicates the number of µseconds between spectrum analyzer stats updates. A default value of 100,000 translates to 10 samples per second. |
| pwrThreshDbm | dBm power threshold value used by "duty cycle" and "peak count" stats info. The default value is 24 dBm. (The "duty cycle" statistics indicate how often the signal power is above the threshold value. The "peak count" statistics will only count peaks at or above the threshold.) |

The field pwrThreshDbm takes a signed dBm value that helps determine the minimum power level for the "duty cycle" and the "peak count." The pwrThreshDbm parameter determines the "floor", or minimum energy level for these measurements, based on whether pwrThreshDbm is positive or negative:

If pwrThreshDbm is negative (e.g.: −65 dBm), then the floor is the same as the value of pwrThreshDbm.

If pwrThreshDbm is positive (e.g.: 24 dBm), then the floor is determined dynamically based on the current noise floor: power floor dBm=noise floor dBm+pwrThreshDbm. A noise floor based mechanism (pwrThreshDbm is positive) is used almost exclusively because it responds well to changes in the radio spectrum environment.

The spectrum event data test is started by sending a message containing a header field with a sessType value of '14'.

The snapshot message test is started by sending a message containing a header field with a sessType value of '17', followed by the optional configuration elements. The optional snapshot message configuration element (IE_SNAP_CFG) follows. If it is not sent, default values are used for the test.

| Sub-Field Name | Description |
| --- | --- |
| infoElementLen | Len = 12 |
| infoElementType | IE_SNAP_CFG = 12 |
| numberSamples | Number of samples to capture |
| snapPdUsed | Snapshot Pulse Detector used to trigger the snapshot.<br>0x00: PD 0 used  0x01: PD 1 used<br>0x02: PD 2 used  0x03: PD 3 used<br>0xFF: Snapshot Use DISABLED |

By specifying which pulse detector is used to trigger the snapshot capture, it is possible to control which types of signal pulses are detected to trigger a raw ADC data capture.

The NSI may reply to test start messages to inform the requesting software application of the status of the test, and the ability of the underlying applications to deliver data for the requested tests. It is also possible to stop a test that has been requested. The table below summarizes the session control status messages which may be sent via the NSI.

Figure 13:
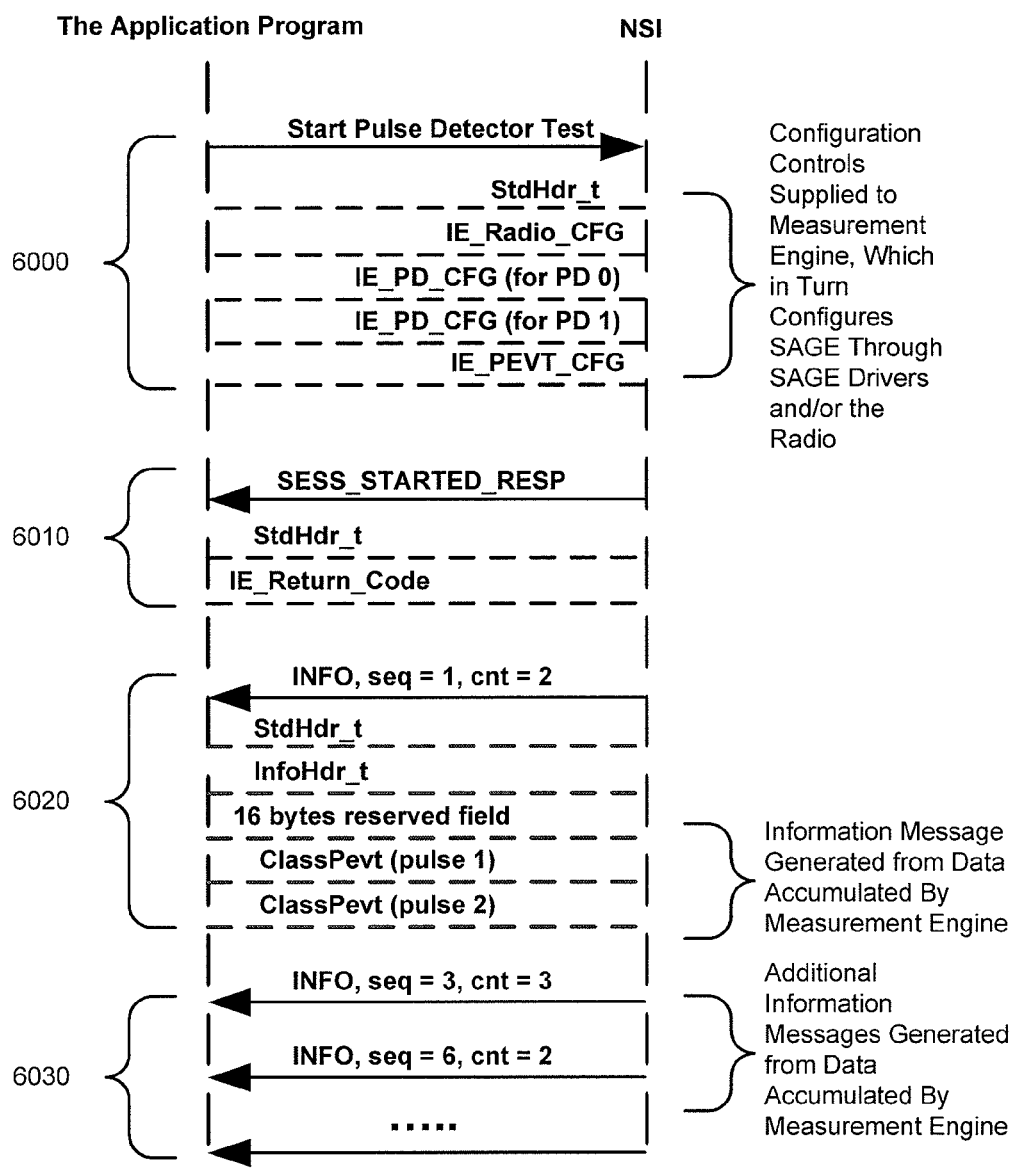
FIG. 13 is a ladder diagram illustrating how the application programming interface called the network spectrum interface is used by an application to initiate spectrum analysis functions.

An example of how the NSI can be used to configure and obtain data from a SAGE pulse detector is shown in FIG. 13. In the diagram, solid lines are for the unified message and the dotted lines indicate the headers, information elements and information messages sent that make up a single message. Step 6000 represents a software application sending to the NSI a start message. The message includes a message header with a particular msgType value that indicates it is a start message and a sessType value to indicate that it is a pulse event test. If it is the first message request sent, the start message includes either the IE_Radio_CFG element, or the IE_VENDOR_CFG element. Two IE_PD_CFG elements are sent to configure pulse detector 0 to detect short pulses and pulse detector 1 to detector long pulses. A pulse event information element IE_PEVT_CFG is also sent to indicate which of the configured pulse detectors to use. The applicable data from the SAGE is generated and made available to the NSI. In step 6010, the NSI replies with a message confirming that the service was started and the status of the service in process. In step 6020, a series of informational messages are sent with data. Each message includes indicates that it is an informational message and includes one or more of the ClassPevt fields which hold the actual data that described the measured properties of pulses that are detected within the configured parameters. Further information messages are sent as shown at step 6030.

Exemplary Spectrum Management Scenarios

Scenario 1: Network Monitoring, Reporting and Acting

Reporting is both the simplest and most powerful application of spectrum management. In this example, reporting is used to help troubleshoot the presence of a "rogue" or undesired noise source.

Ex. 1

Corporate WLAN Environment

Measurement: Each AP makes measurements of its environment. If an AP detects an unexpected noise signal, it forwards spectrum and sample data to the WLAN management server, e.g., server 1055 in FIG. 1.

Classification: At the server, the signal is classified based on known signal pulse information. The location of the signal source is determined.

Policy: The server issues an alert to the WLAN administrator. "Interferer detected, identified as Panasonic cordless phone in room 400."

Action: The server delivers a report (e.g., emails, on-screen pop-up window, etc.) to the administrator including spectrum analysis graphs, and graphical location information. Suggestions for taking corrective action may be provided to the network administrator.

Ex. 2

Home WLAN Environment

Measurement, Classification: Similar to above, but in this case the AP and STAs are used for measurements, and classification software runs on the a PC coupled to a STA.

Policy: User is notified via simple language messages on their PC, but a reaction is automatic. "A cordless phone is creating interference, hit OK to invoke the noise solution wizard." The "noise solution wizard" may be a spectrum action that will remove the effects of the noise on the device, such as by moving to another channel, etc. Alternatively, the correction action is taken automatically and the user is displayed event summary information.

FIGS. 14 and 15 illustrate flow charts (modified from the flow chart shown in FIG. 5) that may be used to carryout the situations of Scenario 1. A user assistance tool may be provided by way of a software program that is executed on, for example, a WLAN AP or STA.In the case of a STA, it is possible that the tool automatically executes a spectrum management action or control, as may be the case for the home environment. In the case of an AP, where a network administrator may have supervisory and other control privileges, the tool may not be automated, but rather give the network administrator user a choice of actions to take. Of course, the non-automated tool may reside on a device such as a STA.

FIG. 14 is a flow chart of the automated version of the tool, and FIG. 15 is a flow chart of the non-automated version. The spectrum sampling step 2000, signal classification step 2010 and spectrum policy execution step 2020 are similar to the like-numbered steps described above in connection with FIG. 5. In FIG. 14, after the signal classification step 2010, in step 2015 an alert is displayed or announced to a user (on a computer, for example) if a certain type of signal or interference is detected based on the output of the signal classification step. In step 2020, a spectrum policy is then automatically executed based on the output of the signal classification step, and in step 2025 spectrum event summary information is displayed or announced to the user. For example, the spectrum action or control may be to execute an interference avoidance procedure.

Referring to FIG. 15, the spectrum sampling, signal classification and display alert steps 2000, 2010 and 2015 are the same as those described above in connection with FIG. 14. However, in FIG. 15, after displaying an alert, step 2016 is invoked to display event information with a recommended action. In step 2017, the user can then select the spectrum policy to be executed, or go to a "policy wizard" to set up a policy and actions to be taken for that type of alert. An example of a policy wizard is information that simplifies the task of creating spectrum policies by asking the user (or administrator) a set of questions. Based on this information, the policy wizard generates spectrum policies and associated actions appropriate for those parameters. A policy wizard is described in more detail hereinafter. The recommended actions in step 2017 may be suggestions other than changing an operational parameter of a device or a network, as described hereinafter in conjunction with FIG. 26.

FIGS. 16 through 25 illustrate output of an exemplary graphical user interface (GUI) application useful for interfacing spectrum activity and management information to/from a user. The GUI provides a means to monitor, configure and analyze the various components of the spectrum management system. It interacts with other components of the spectrum management system via the NSI referred to above in conjunction with FIG. 6.

The GUI application may be written in Java® and may use sockets over TCP, for example, to communicate with the spectrum activity information associated with a particular radio communication device. The GUI application software loads a PE.ini file at initialization that contains all the configuration related information like hostname and the port number. Once the communication is established the application will spawn and thread which will wait on the port to detect spectrum activity information messages coming from the source device. As information comes through the socket it is processed and displayed to the various components that are detecting these messages. The message dispatcher dispatches the processed messages to appropriate display panels. All the messages coming through the socket will also be stored in a log file located in a directory specified by the user in the PE.ini against the key PE_LOGS. The GUI application is fed by data from the measurement engine and the classification engine referred to above in conjunction with FIG. 6.

The GUI consists of several sub-parts:

Fault Management. Provides a means to detect, receive and provide fault information. The fault information describes the cause of the fault.

Configuration Management. Provides a means to configure the spectrum components. A spectrum advisor provides configuration related information and guides the user through the configuration process.

Performance Management. Monitors traffic of a communication protocol, such as an IEEE 802.11 network, and collects statistical information indicative of spectrum utilization and displays them.

Event Management. Provides a means to monitor various spectrum events and display this information in the form of graphs and histograms.

FIG. 16 shows how an alert may be generated when interference is detected, wherein the alert is displayed in an icon on a GUI bar. A user clicks that icon for more information and gets to the spectrum management console window in FIG. 17. In the spectrum management tab, there may be icons representing signals types that are being detected and classified in the frequency band, as well as textual information identifying those devices. In addition, there may be a sub-window that displays a "capacity rating" for the frequency band, indicating how much capacity in the frequency band is available based on the types of devices and traffic currently in use in the frequency band. The capacity rating may be derived from the "Quality" measurement reported above as a spectrum analyzer statistic, and is a qualitative estimate of the carrying capacity of the entire frequency band.

By clicking on the "Event Log" button on the spectrum management console window in FIG. 17, the event log screen of FIG. 18 is displayed. The events log displays event information in a tabular format for all the RF events that the SAGE, measurement engine and classification engine have detected. Each event has associated with it fields including an event message, event data and time, event time stamp, event ID and event source ID, similar to the fields of the NSI spectrum event message described above:

The Alert Level, ranging from Low to High to Severe, indicates how much interference the event may cause for 802.11 communications.

The Type of event includes, "Interferer" (for example, a signal that may interfere with IEEE 802.11 communications), "Information" and "Error".

A specific Message describing the event.

The Date & Time of the event. This is the date and time is filled in by the application (i.e., the Event Log software), based on the computer's internal clock.

A Time Stamp in seconds and microseconds, indicating the time when the event occurred, counting from when testing first began. This data is provided by the measurement engine (from the SAGE).

The ID indicates the device type, and a table below provides a partial list of IDs.

| 15 Bit Device ID (Bits 4, 3, and 2 shown, with corresponding Decimal Value [taking blank 1-Bit into account]) | 1-Bit: On/Off |
| --- | --- |
| 2 (001_) - Microwave Oven | 1 = On |
| 4 (010_) - GN Netcom Cordless Phone | 0 = Off |
| 6 (011_) - Bluetooth Headset | |
| 8 (100_) - Infant Monitor | |

For example, a display value of 7 is the same as ([011] [1]), meaning a Bluetooth Headset was turned on. 8 ([100] [0]) means an Infant Monitor was just turned off.

The Source ID identifies the target source. This parameter is only significant when more than one source (Access Point or STA) is feeding data to the application program.

Figure 19:
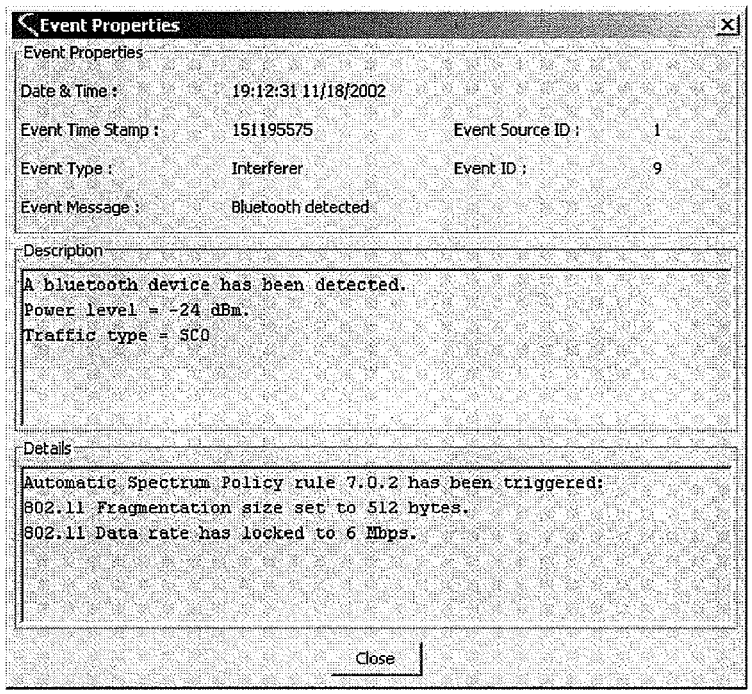
Figure 20:
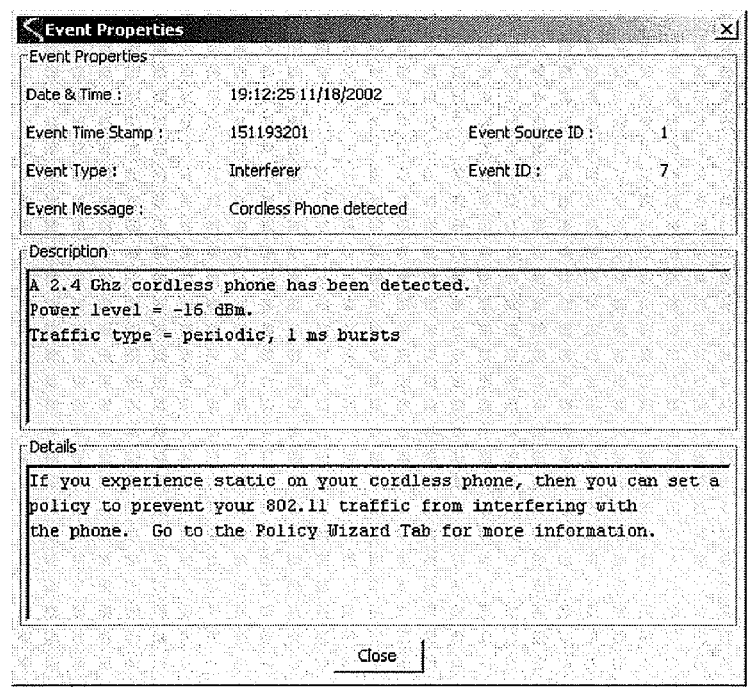

More detailed information is displayed about a particular event by clicking on an event row which will open up a dialog. This dialog contains detailed information about the event in the form of a text area containing a description of the event and a text area containing details of the event. Examples of detailed event dialogs are shown in FIGS. 19 and 20. FIG. 19 illustrates exemplary spectrum event summary information after an action was executed according to a spectrum policy. The detailed event information indicates the action that was automatically taken according to a process similar to that shown in FIG. 14. By contrast, FIG. 20 shows event information in which an action was not automatically taken, rather a recommendation to the user is made in the detail text box that suggests how a user may avoid interference with another device detected in the frequency band, according to a process similar to that shown in FIG. 15.

Figure 21:
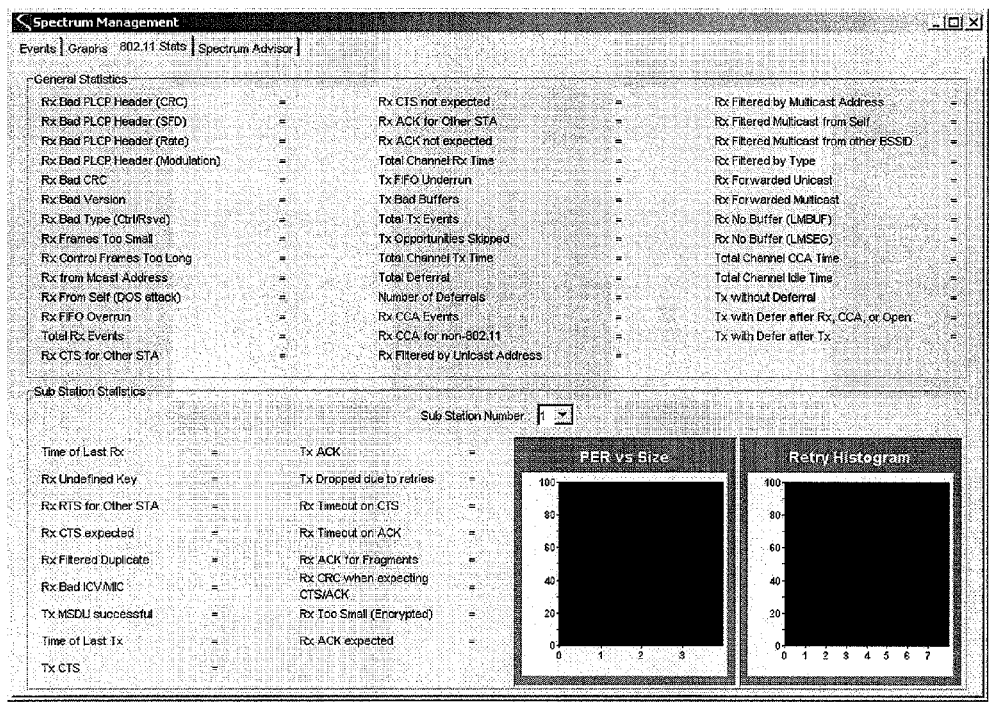

FIG. 21 shows a display of statistical information, such as traffic statistics for a particular communication protocol, e.g., IEEE 802.11, which may include enhanced statistics some of which are described above.

FIGS. 22-25 illustrate exemplary screens in the graphs panel used to display spectrum activity information. The graphs panel consists of the graphs or plots on the right of the screen and plot type on the left tree view. When the tree view is opened and any plot type is clicked, the corresponding plot will be added and displayed on the right side. Any plot on the right side of the screen can be removed by clicking on the close icon on the plot. As soon as the "Start" button is hit and data is available on the socket the spectrum analyzer plots will be plotted. If the "Stop" button is pressed the plotting action is disabled and the spectrum analyzer plots will no longer be updated with incoming data. The spectrum activity information is displayed on the spectrum analyzer graphs, pulse histograms and pulse plots.

The spectrum analyzer graph in FIG. 22 contains spectrum analyzer power vs. frequency information, described above. The spectrum analyzer stats are shown in FIG. 23 and include the spectrum analyzer stats graph, the duty cycle graph, and number of peaks bar chart. This SA stats graph displays statistical data on the frequency spectrum. It is based on spectrum messages, where a single message is built from a specific number of successive FFT cycles. Typically, 40,000 successive FFTs of the RF spectrum, taken over a total time of 1/10 of a second, are used to construct the statistics for a single message. A first line shows the average power over the sampling period (i.e., over the 40,000 FFTs, or 1/10 second). A second line, which can change rapidly from 1/10 of a second to the next, represents the "maximum power per single sampling period." It shows the maximum power achieved in each of 256 frequency bins, during the 1/10 second sampling period. A third line represents the "absolute maximum power" over all messages received so far. The Duty Cycle graph shows the percentage of the time that, for a given frequency, the power in the RF spectrum is above a specified threshold.

The Number of Peaks chart shows the percentage of time that there are "N" peaks in the RF spectrum. For example, if the "0" bar is hovering around 50%, then 50% of the time there are no peaks at all. If the "1" bar is hovering at around 20%, then 20% of the time there is just 1 peak in the RF spectrum. If the "2" bar hovers at 5%, then 5% of the time SAGE is detecting 2 peaks in the RF spectrum. (The "9" bar is a special case: If the "9" bar is hovering at, say, 3%, then 3% of the time SAGE is seeing 9 or more peaks in the RF spectrum.

FIG. 24 shows exemplary pulse histogram plots for center frequency, bandwidth, pulse duration, pulse gap, pulse power and pulse count. As soon as the "Start" button and histogram data is available on the socket the histograms will be plotted. If the "Stop" button is pressed the plotting action is disabled and the histograms will no longer be updated with incoming data. The following types of plots are available for viewing:

Center Frequency shows the distribution of the central frequencies of the pulses. The graph spans a bandwidth of 100 MHz. The actual central frequency is determined by combining the central frequency shown on the graph with the overall RF center frequency (2.4 GHz). Also, both ends of the graph are typically flat, since the actual bandwidth captured by the radio is 83 MHz.

Bandwidth shows the distribution of the bandwidths of the pulses.

Pulse Duration shows the distribution of the duration of the pulses. For example, a peak at around 200 μsec indicates that many of the pulses persist for about 200 μsec.

Pulse Gap shows the distribution of the gap times. A peak at about 1500 μsec indicates that many of the pulses are separated in time by gaps that are about 1500 μsec long.

Pulse Power indicates the distribution of the power of the pulses.

Pulse Count indicates, on a logarithmic scale, the number of pulse events counted per sample interval. Colors may be used indicate that the number of pulses poses little risk, some risk, or significant risk, for example, to a particular type of communications occurring in the radio frequency band, such as 802.11 communications.

Figure 25:
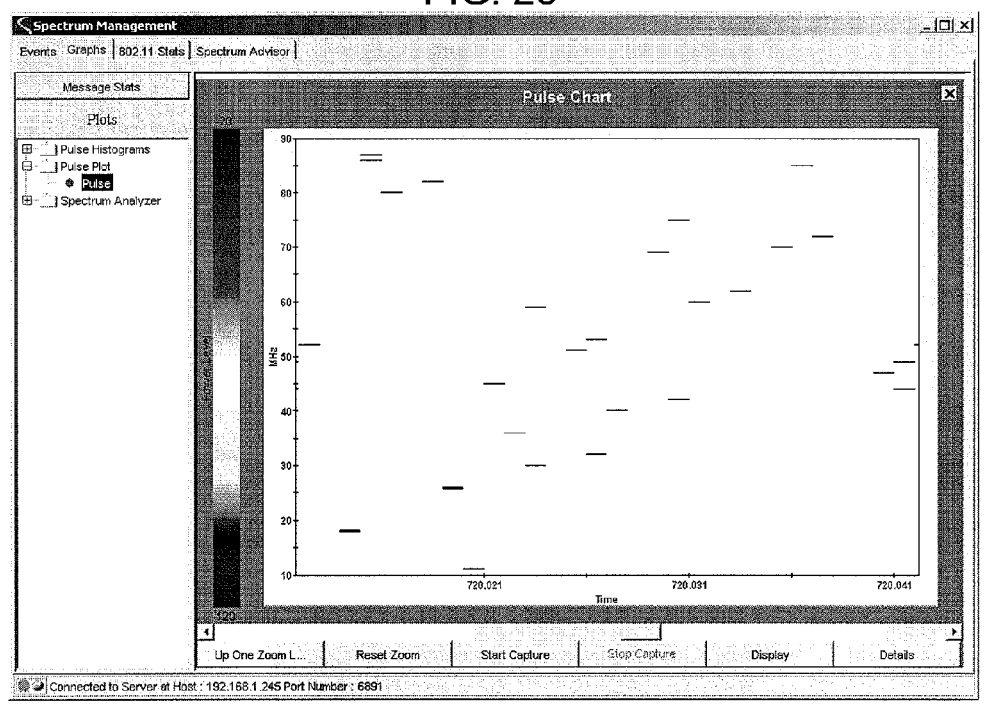

FIG. 25 shows a pulse chart/plot for various pulses detected in the frequency band. When the "Capture" button is selected, the GUI application will capture the pulses and display them on the pulse chart. Each pulse is defined in three dimensions and presents a single dot for each pulse. It is intended to show the time at which each pulse occurred (horizontal axis), the center frequency (vertical axis), and the power (the dot color). A color-coded legend may be used on the left side of the pulse chart. A zooming action can be performed by dragging the mouse on a specified area in the plot below the area to be zoomed, in order to magnify that area.

Figure 26:
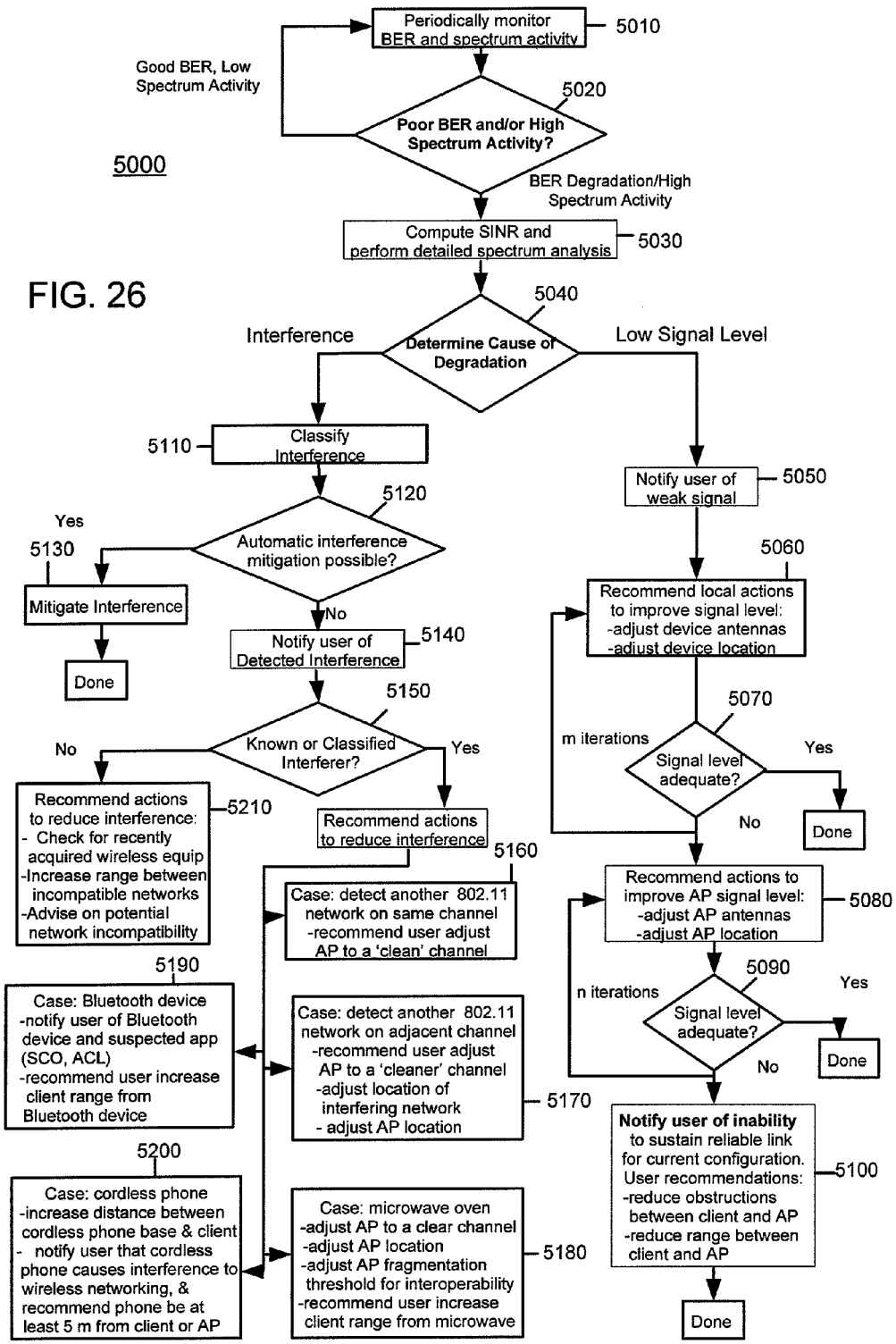
FIG. 26 is a flow chart of a process that exploits the spectrum management related information to advise a user about the performance of a device operating in the frequency band.

FIG. 26 is flow chart depicting another example of a spectrum management support tool process 5000 that can be used on a client device to debug certain spectrum conditions that may be detected on the client device, e.g., STA. The processing referred to herein may be performed at the client device, or at a processing device remote from the client device. The process 5000 may be initiated by a user command to check the performance behavior of a device on demand, through a suitable user interface application, or by an application program that periodically checks the performance behavior of the device, or in response to detecting a performance degradation, as described hereinafter. Initially, in step 5010 the device monitors bit error rate (BER) or PER and other spectrum activity information (derived from a component like the SAGE referred to above). If the spectrum activity is high or the BER or PER is high it is noted in step 5020, and in step 5030, the device may compute a signal to interference and noise ratio (SINR) and perform further spectrum analysis using output from the SAGE. Based on the information computed up to this point, the device can in step 5040 determine the cause of degradation as either interference or low signal level.

If the cause is determined to be low signal level, then a series of user recommendations are made, together with further analysis to see if the signal level returns to adequate levels once the actions are carried out by the user. For example, in step 5050, the device user is notified of the weak (receive) signal. In step 5060, local actions are recommended to the user to improve signal level, such as adjusting the antennas of the device or the location of the device. If it is then determined in step 5070 that the adjustments returned the signal level to adequate conditions, then the process terminates. Steps 5060 and 5070 may be repeated several times (m iterations). If those user adjustments still do not help the signal level, then in step 5080, additional actions are recommended to be taken at the other device on the link, such as an AP. These recommended actions may include adjusting the antennas at the AP or the location of the AP. In step 5090, it is again determined whether signal level at the device is at an adequate level. If not, the process continues to step 5100 in which the user is notified of an inability to sustain a reliable link, and additional recommendations may include reducing or removing obstructions between the two devices, and reducing the range/distance between the two devices.

If in step 5040 the cause is determined to be interference, then a series of steps are performed. First, in step 5110, the interference is classified, by signal type, etc. Moreover, if in step 5120 it is determined that the interferer is a type that can be mitigated using interference mitigation techniques, then the device executes those techniques automatically (which may involve cooperation with and/or action by other devices, such as an AP). Examples of interference mitigation techniques are referred to above. If the interferer is one that cannot be automatically mitigated, then a variety of other actions are recommended to the user. In step 5140, the user is notified that an interference conditions has been detected. If in step 5150 the interference is a type that is known, then several actions to manually deal with the interference are recommended. In step 5160, if the interference is caused by another IEEE 802.11 network on the same channel, then a recommended user action is to adjust the AP of the user's network to a clean/unused channel. In step 5170, if the interference is caused by an IEEE 802.11 network on an adjacent channel, the recommended user actions may include adjusting the AP to a channel further from the other network's channel, adjusting the physical location of the interfering network, or adjusting the location of the AP in the user's network. In step 5180, if the interference is caused by a microwave oven, then recommended user actions may include adjusting the AP of the user's network to a cleaner channel, adjusting the location of the AP in the user's network, adjusting the fragmentation threshold of the AP in the user's network for better interoperability, or to increase the distance between the user's device and the microwave oven.

Still further situations are shown in steps 5190 and 5200. In step 5190, the situation is one in which the interference is determined to be a Bluetooth™ device. The user is notified that a Bluetooth™ device (in synchronous or asynchronous operation mode) is the cause of the interference, and recommended user actions include increasing the range between the user's device and the interfering device. In step 5200, if the interference is caused by a cordless phone, a user is recommended to increase the distance between the user's device and the cordless phone base device, such as at least 5 m from the user's device or the AP in the user's network.

If in step 5150, it is determined that the interferer is not known, then in step 5210, the recommended user actions may include checking for recently acquired or deployed wireless equipment that may be causing interference, increasing the range/distance between equipment of incompatible networks, and advising the user about various potential network incompatibilities.

FIG. 26 shows various steps that involve notifying the user with information. There are many mechanisms to notify the user, including a visual display of information, such as on a monitor with text, announcing the information in a voice-synthesized audio message, conveying the information in an audio-video segment, displaying one or more icons or symbols that represent the information to be conveyed, etc. Examples of these displays are shown in FIG. 16-20.

Scenario 2: Secondary Usage

Secondary usage refers to allowing devices to make use of "fallow" licensed spectrum. This is not just a futuristic scenario. It already exists in the case of 802.11a in Europe. At 5 GHz, radar is considered the primary user, and 802.11a is a secondary user. Current implementations simply quiesce the network and look for RSSI. Simple RSSI measurement and DFS are not enough to enable secondary use. The "pecking order" between primary and secondary users requires a different response to noise depending on whether it is from a primary or another secondary user. By detecting and classifying signals, a differentiation is made between radar and other spectrum users faster and with few false detections than techniques based on RSSI and allows for selecting a new channel that is not affected by the radar for the traffic.

In order to be a secondary user, the following occurs:

Measurement: Pause periodically to check for the presence of primary users.

Classification: Distinguish between primary users, and other secondary users.

Policy: Determine how long and how often to measure, and how to respond when a primary user is detected.

Scenario 3: High QoS in the Presence of an Interfering Signal or Noise

An 802.11a network carries a video stream. Background noise is causing a problem with packet loss. Assume that the AP in the network has multi-channel capability.

Figure 27:
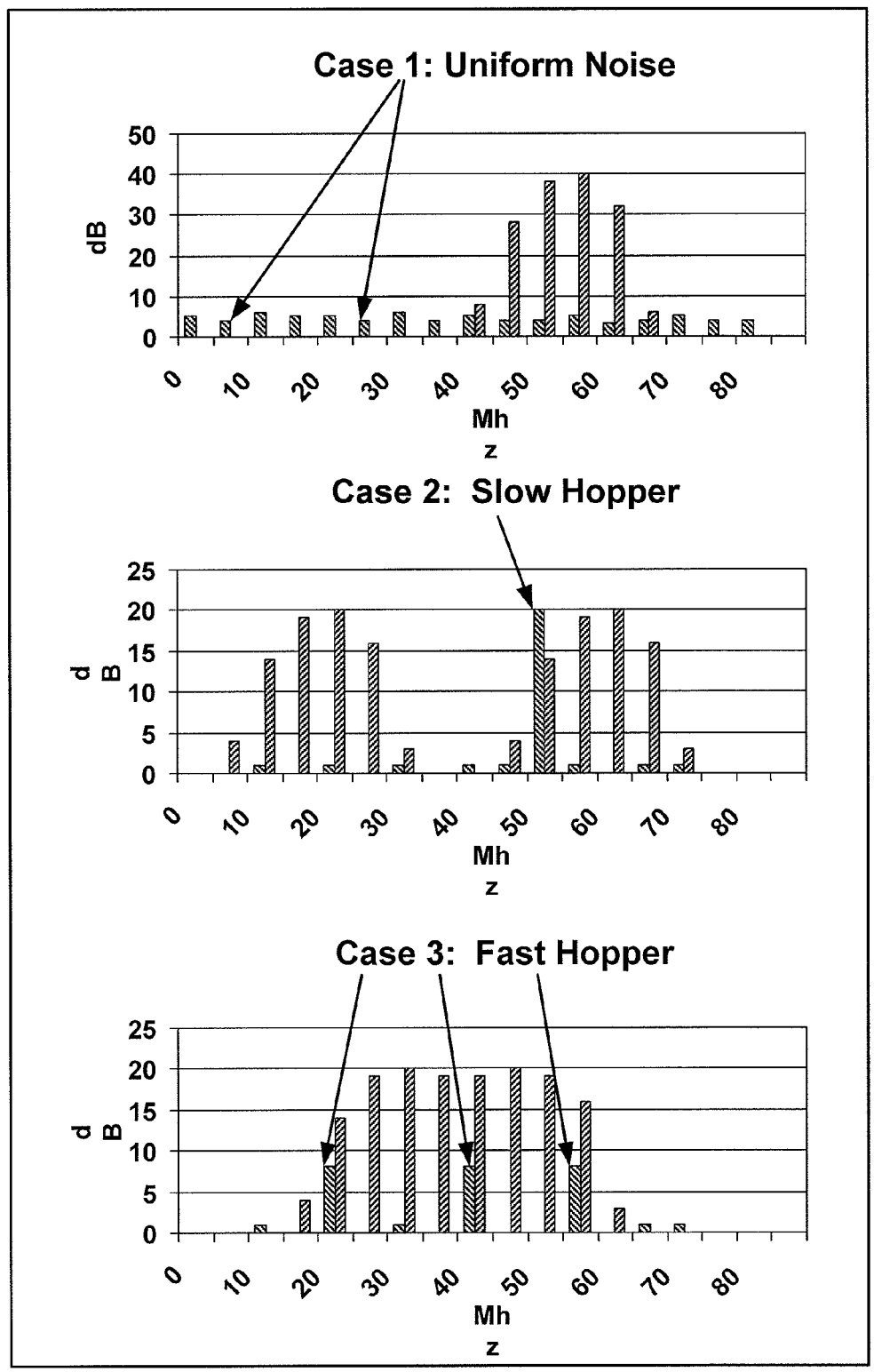
FIG. 27 is a diagram illustrating multiple cases of a scenario in an unlicensed band that can be addressed by a spectrum management process.

The best solution is achieved by measuring and classifying the noise, and using a different policy depending on the interfering signal. With reference to FIG. 27, a first case is shown (Case 1), where the noise is background hum, uniform in time. The policy associated with this case may be to use a spatial processing algorithm to improve the link margin between two devices. Examples of spatial processing algorithm are disclosed in commonly assigned and co-pending U.S. application Ser. Nos. 10/174,728 filed Jun. 19, 2002, entitled "System and Method for Antenna Diversity Using Joint Maximal Ratio Combining"; 10/174,689 filed Jun. 19, 2002, entitled "System and Method for Antenna Diversity Using Equal Power Joint Maximal Ratio Combining"; and 10/064,482, filed Jul. 18, 2002, entitled "System and Method for Joint Maximal Ratio Combining Using Time-Domain Signal Processing."

In Case 2, the interference is caused by a slow frequency hopping signal. The policy associated with this case would be to use redundant channels to reduce packet error rate.

In Case 3, the interference is caused by a fast frequency hopping signal. The policy associated with this case would be to use a rate ½ code across a wider bandwidth channel to reduce packet error rate.

Scenario 4: Finding a Channel in a Dense Environment

In a sparsely-used environment, it may suffice to simply search for a channel with no interference. This is the easy case.

But in a densely-used environment, a device could easily find that no channel is available with zero interference.

In this case, one approach might be to accept a channel with the "lowest" interference. If a new network must compete with another spectrum user, the optimal channel selection algorithm should consider, for example:

What are the priorities of the various networks?

Which networks might the new network function cooperatively with?

For example, the IEEE 802.11 specification is designed such that two 802.11 networks can share a channel reasonably, whereby each network gets allocated a part of the bandwidth. Making this kind of decision in the most optimal way requires measurement, classification and policy capabilities.

Scenario 5: 802.11 in the Presence of Bluetooth

A Bluetooth™ signal is a frequency hopping signal. It therefore can cause periodic interference with, for example, an AP for an IEEE 802.11 network that uses a fixed channel. In order to work cooperatively with Bluetooth™, an IEEE 802.11 network may perform measurement and classification to determine the presence of the Bluetooth™ network.

Once Bluetooth is detected, several policies may be invoked:

Policy 1a: If Bluetooth is using synchronous (SCO) traffic, schedule any 802.11 QoS packets so that they occur between the timing of the SCO packets. Several techniques are described in the aforementioned co-pending and commonly assigned patent applications.

Policy 1b: If Bluetooth is using SCO traffic, do not transmit during the SCO periods.

Policy 2: Attempt to minimize the effect of receive interference from Bluetooth by adjusting a steerable antenna.

Policy 3: Do not shift to a lower data rate in response to packet errors. This may only exacerbate the problem. Experiments have shown that when exposed to the interference of a Bluetooth frequency-hopping signal, an IEEE 802.11b device detects an "increase in its error rate" and responds by decreasing its over-the-air transmission rate. Decreasing its transmission rate does not necessarily help and when the IEEE 802.11b device continues to detect an unacceptably high (or potentially higher) error rate, it further reduces its data rate. This action is compliant with the IEEE 802.11 standard, and yet is patently unintelligent. The device effectively increases its exposure to a frequency hopper by increasing the duration of its packet through the reduction in over-the-air data rate. While it is true that standards bodies may improve coexistence between open standard protocols in these types of situations, this type of degradation in performance could be minimized or even avoided completely, by the deployment of the cognitive spectrum management technologies described herein.

Scenario 6: Bluetooth in the Presence of 802.11

In order to work cooperatively with 802.11, a Bluetooth network should perform measurement and classification to determine the presence of 802.11 networks. Once an 802.11 network has been detected, a policy can be invoked:

Policy 1: No Adaptive Hop Sets Supported for a Bluetooth™ Network

In this case, the Bluetooth network should avoid generating interference with 802.11 by idling slots where the 802.11 data or ACK would occur. An example of this technique is disclosed in U.S. Patent Publication No. 20020061031. The Bluetooth™ network will only want to use this algorithm when a "real" data network is present, as opposed to just a noise source. This justifies the benefit of signal classification over simple RSSI measurements.

Policy 2: Adaptive Hop Sets Supported for a Bluetooth™ Network

In this case, the Bluetooth network should remove hops that enter the 802.11 band. One known proposal in 802.15.2 suggests using lost packets to identify the presence of a foreign network. This is not always effective. Interference is not always symmetric (i.e., the Bluetooth network may be causing a problem with another network, but the other network is not interfering with the Bluetooth network). In addition, this would require losing packets before another network is detected.

Scenario 7: DRA in the Presence of a Frequency Hopping Signal

A Dynamic Rate Adapting (DRA) device uses more spectrum when it is available, and less when it is not available. For example, the increased spectrum may be used for higher data rate, QoS, etc. DRA can be implemented as a new protocol (e.g., "bed-of-nails" orthogonal frequency division multiplex systems), or by aggregating multiple standard channels.

The question arises, however, as to how should DRA deal with frequency hopping protocols. One solution is that in order to deal politely with a frequency hopping signal, a DRA device must detect the hopper via measurement and classification. Once the hopper has been classified, then policies can be invoked. Exemplary situations are as follows:

Policy 1: If a frequency hopping signal is detected, limit the DRA to 50% of the band, so that the frequency hopping network can still operate.

Policy 2: If the frequency hopping network adapts its hop set in response (observed by a measurement), then DRA can be allowed to use 75% of the band.

Scenario 8: Device Specific Policies

In a consumer environment, users may want to define priorities among specific devices. For example, at home, users may want to establish a "pecking order" between cordless phone, streaming video, WLAN, etc. In order to allow for policies at the specific device level, it will be necessary for devices to measure and classify other operating devices. Devices can be taught to recognize each other, by directly exchanging classification information, or by using "training" modes similar to universal remote controls. Unrecognized devices may be handled with various policies:

In an office environment, report immediately.

In a home environment, treat the situation as a low priority.

Scenario 9: Context Specific Policies

Some policies will be dependent on context information such as location, time of day, etc.

These policies may be updateable, since they are heavily dependent on the desires of the user.

Network selection:

In a home environment, always use a particular basic service station identifier, e.g., BSSID 7.

In an office environment, use the lowest CCA between BSSID 23, 27.

In a public access environment (e.g., an airport), use the BSSID that offers the lowest per-minute access charge.

Traffic prioritization:

During morning hours, prioritize WLAN download traffic.

During evening hours, prioritize video streaming data.

A policy wizard can be used to allow unsophisticated users to create complex policies.

Scenario 10: Regulatory Specific Policies

In order to follow the regulatory requirements of various countries, different policies may be required.

These policies should be downloadable, since there will be a lot of them, and they will change over time.

The European Communication Commission (ECC) may impose uniform spreading requirement on channel selection algorithms for 802.11a. There may be different transmit power, band and channel requirements by country.

Scenario 11: Dynamic Frequency Selection

Dynamic frequency selection may be useful in a situation where a non-WLAN signal is interfering with a particular WLAN frequency channel. For example, and with reference to FIG. 1, the WLAN STA1 1030(1) (e.g., a laptop computer having a 802.11 network interface card (NIC)) is exchanging data with the server 1055 through one of the WLAN APs 1050(1) to 1050(N). The infant monitor transmitter 1060 is turned on in the same frequency channel that the AP 1050(1) is using to exchange data with the STA1030(1). A spectrum sensor 1200 (or a cognitively-enabled-AP) generates spectrum activity information that is supplied to the network management station 1090. The AP 1050(1) may supply 802.11 network statistics. Based on the 802.11 network statistics, the network management station 1090 will detect that the AP 1050(1) cannot get a clear channel access (CCA) to the channel. The network management station 1090 may analyze the spectrum activity information supplied by the spectrum sensor 1200 or the AP 1050 to find another clear channel in the frequency band. The network management station 1090 may then reassign the AP 1050(1) to a clear channel. The AP 1050(1) will begin transmitting beacons on the new clear channel. The STA 1030(1) will eventually turn to scanning the channels to acquire the beacon on the new clear channel and 802.11 traffic with the AP 1050(1) will resume on the new clear channel. If a certain part of the frequency band is in constant use by other devices, another device or network can be programmed or controlled on-the-fly to not transmit over those bandwidths. Conversely, by deliberately searching for "clean" channels, devices or networks can be controlled to broadcast over those channels.

Scenario 12: Adjusting Packet Size

Pulse histograms may indicate the duration of gaps between detected signal pulses. If the gaps are very short, devices or a network of devices can be programmed, once again "on-the-fly", to decrease the size of packets to fit within the available time gaps between pulses. This reduces the chances that single packets will experience interference, and so reduces the need to retransmit packets. Of course, when the gaps between pulses become longer, the packet size can be increased again, resulting in higher transmission speeds.

The foregoing scenarios illustrate the advantage of gathering intelligence about use of the spectrum and using that information. Smart data rate selection is another example of how an intelligent system has advantages over current systems, in which there is no direct information about interference, for example. Without knowledge about interference, it is difficult to distinguish between problems caused by interference, packet errors or hidden nodes. As a result, current systems implement "best-guess" algorithms that are often counter-productive. An example is an 802.11b response to the presence of a frequency hopping signal, such as a Bluetooth™ SCO. The initial 802.11b response is to back-off on the data rate, which in turn causes more collisions, which 802.11b responds to with further rate back-off, etc. By contrast, the system described above uses signal classification and other interference timing information to make intelligent decisions on data rate.

Furthermore, current systems use static pre-defined packet fragmentation levels, and also have no information about the timing of an interfering signal. The intelligent spectrum management system allows for the optimization of fragmentation levels and packet scheduling in response to interference patterns.

More Detailed Spectrum Management System Architecture

Referring to FIG. 28, a diagram of a spectrum management system architecture is shown that is similar to the one shown in FIG. 6, but splits some functions of measurement, classification and spectrum actions or controls into multiple layers. The processing levels are:

1) L0: Hardware Management Services 100
2) L1: Engine Management Services 200
3) L2: Managers Services 300
4) APP: Applications Services 400

To compare with the diagram of FIG. 6, level L0 corresponds to the hardware or physical layer level and the drivers that sit above the hardware level; level L1 corresponds to the spectrum level; and level L2 corresponds to the network level. The top layer, APP, corresponds to the UI block, systems integration block and other systems or applications that the systems integration block integrated with.

L0: Hardware Management Services

The L0 hardware management services 100 manages the hardware resources 10 used in the spectrum management system. These hardware resources reside in a communication device that is operating in a frequency band shared by other devices and communication devices. Management of hardware resources includes management of a radio (radio transceiver or receiver) 12 on the basis of contention management, and traffic data accumulation, to be described further hereinafter, and of the SAGE 20.

In the L0 hardware management services level 100, there are a L0 resource manager 110, a L0 SAGE engine 120 that manages the SAGE 20 and a L0 measurement engine 130. The L0 hardware management services may be executed "on-chip," meaning on the integrated circuits (ICs) that are included in the communication device to process signals for transmissions and reception in the network. This processing level may apply similarly to all communication devices operating in a network.

The L0 SAGE engine 120 is a device driver to interface higher level commands with the SAGE 20, and translate those commands into signals that the SAGE 20 can recognize. Commands may include configuration signals for one or more components of the SAGE 20, described hereinafter.

The L0 measurement engine 130 performs an initial accumulation of data output by the SAGE 20 into a spectrum utilization map (SUM) format. The spectrum utilization map will be described in hereinafter.

L1: Engine Services

The L1 engine services level 200 is where the first level measurement, classification, location, and policy services execute. In the engine services level, there are L1 engines, such as a L1 location engine 210, L1 measurement engine 220, L1 classification engine 230 and L1 policy engine 240 that control the L0 hardware management level processes and use the information to perform their next level services. There is also a L1 resource manager 250 in the engine management level 200. A protocol coordination engine 260 resides in the L1 engine services level 200, and it performs functions related to protocol management; it does not play a vital role in spectrum management.

The L1 engine services level 200 is normally performed "off-chip," that is in a host processor of the communication device. However some L1 processing could be performed on-chip if additional external memory is supported. Some local policy decisions, such as local interference mitigation, may be decided at the L1 Engine processing level. The L1 engine services level may apply similarly to all communication devices operating in the network.

L2: Manager Services Level

The next higher level is the L2 manager services level 300. The L2 manager services are responsible for more complex network spectrum management functions. Examples of processes at this level are the L2 location manager 310, L2 measurement manager 320, L2 classification manager 330 and L2 policy manager 340. There are also a L2 resource manager 350 and a L2 network spectrum manager 360. The processing at this level may be performed at a central server location which consolidates the information for processing, and not necessarily by a communication device operating in the network.

Other software functions that may reside at this level include a database function with report and query services to analyze spectrum activity information collected from the lower processing levels, security policies, interference policies, management information base (MIB), web server, SNMP Agent, SendMail, etc.

APP: Applications Services Level

The highest level in the system architecture is the APP applications services level 400 where the network applications execute. Examples of network include a spectrum analyzer display application 410, a location/map display application 420, a measurement/statistics application 430 and a spectrum management policy application 440.

Figure 29:
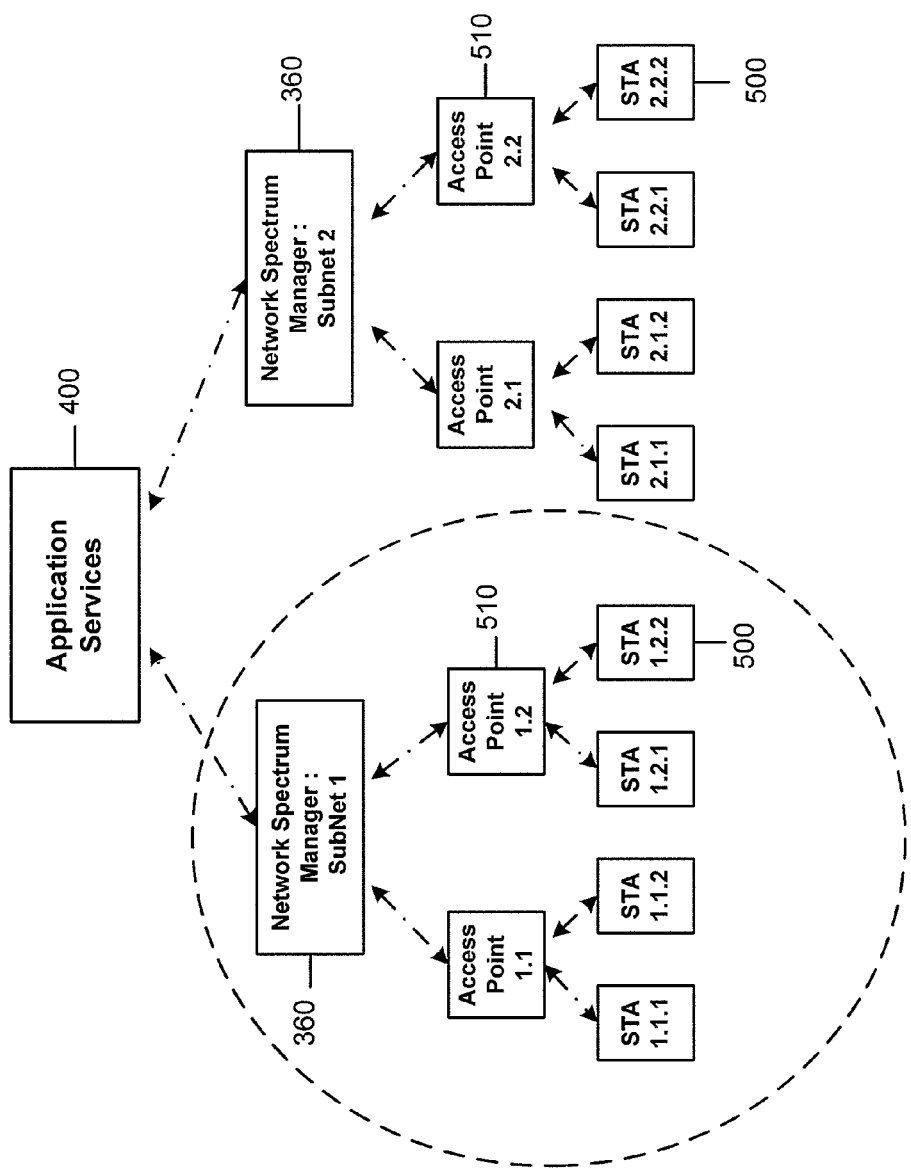
FIG. 29 is a block diagram showing a hierarchical interaction between devices in a wireless local area network (WLAN) application of the spectrum management process.

Referring to FIG. 29, from the perspective of spectrum management a network may comprise devices such as stations STAs 500, access points APs 510, an overseeing network spectrum manager 360 and applications services 400. An instance of a network spectrum manager 360 is responsible for a subnet consisting of APs 510 and their associated STAs 500. While the terms STA and AP are used herein, which have relevance to IEEE 802.11x WLAN applications, it should be understood that the spectrum management architecture and processes described herein may apply to any wireless communication application. The network spectrum manager 360, as mentioned above, may reside on a server computer (e.g., network managing station 1090 in FIG. 1) coupled by wire or wireless link to the APs within its subnet. In many cases, the subnet is in fact the entire network in question.

Spectrum management is designed to work in cooperation with parallel foreign network management entities. For example, a general network management system might be in place for enabling, disabling, and configuring network components such as APs. The network spectrum manager has a service interface that permits notification of such changes by a foreign network management system. Similarly, spectrum management provides a service interface so that a general network management system may be notified of changes within the network such as channel assignments and STA associations. This network update service interface may be used by any conforming application in the application services 400.

Referring again to FIG. 28, examples of spectrum management services include location, measurement, classification, and policy management. Policy management configures and initiates algorithms governing co-existence among communication devices of different types operating in the frequency band, channel assignment of devices in the frequency band, transmit power control of devices operating in the frequency band and bandwidth allocated to devices operating in the frequency band.

Most spectrum management services are independent of specific media access protocols. For example, spectrum analysis, classification, radio measurements, and some policies are protocol independent. In addition to these protocol independent services, spectrum management also provides some protocol specific support, such as support for traffic statistics associated with a particular medium access protocol, such as IEEE 802.11x and co-existence algorithms. However, the overall spectrum management architecture may be applied to any frequency band, such as the ISM unlicensed bands in the United States and unlicensed bands in other jurisdictions around the world.

The Network Spectrum Interfaces (NSIs)

Figure 30:
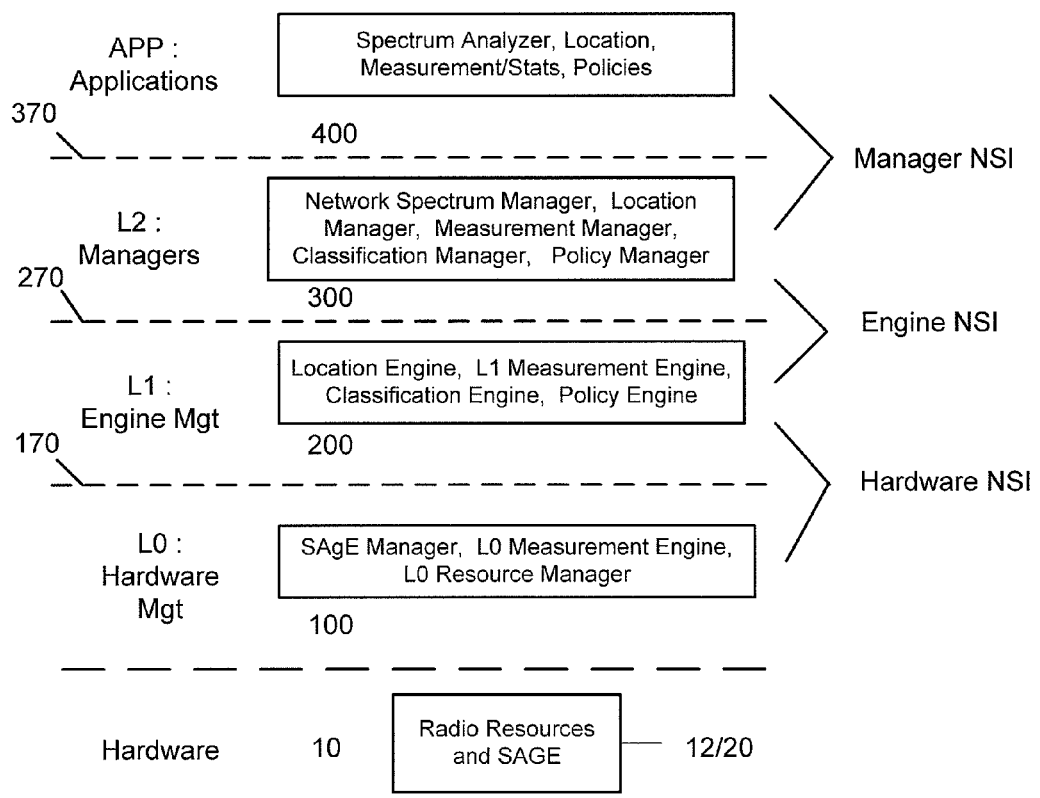
FIGS. 30 and 31 are block diagrams showing the network spectrum interfaces (NSIs) between various process levels of the spectrum management architecture.

Turning to FIG. 30, there are multiple NSI APIs in connection with the architecture of FIG. 28. There are:

1) a Hardware NSI 170 that interfaces the L0 hardware management services 100 to the L1 engine management services 200;

2) an Engine NSI 270 that interfaces the L1 engine management services 200 to the L2 manager services 300. The Engine NSI 270 is analogous to the NSI referred to in FIG. 6; and 3) a Manager NSI 370 that interfaces the L2 manager services 300 to the applications services 400.

The NSI is a logical interface which is embodied in a variety of program interfaces and transport mechanisms, and may employ any suitable transport mechanism. This primarily affects the Hardware NSI 170. For example, if the L0 hardware management services executes on-chip and the L1 engine management services executes within a host device driver, the transport mechanism for the Hardware NSI may be over a PCI interface, for example. On the other hand, if the L0 hardware management services executes on-chip alongside the L1 engine management services, then the transport may be a local (on-chip) software interface. In either case the Hardware NSI service model would be the same.

Figure 31:
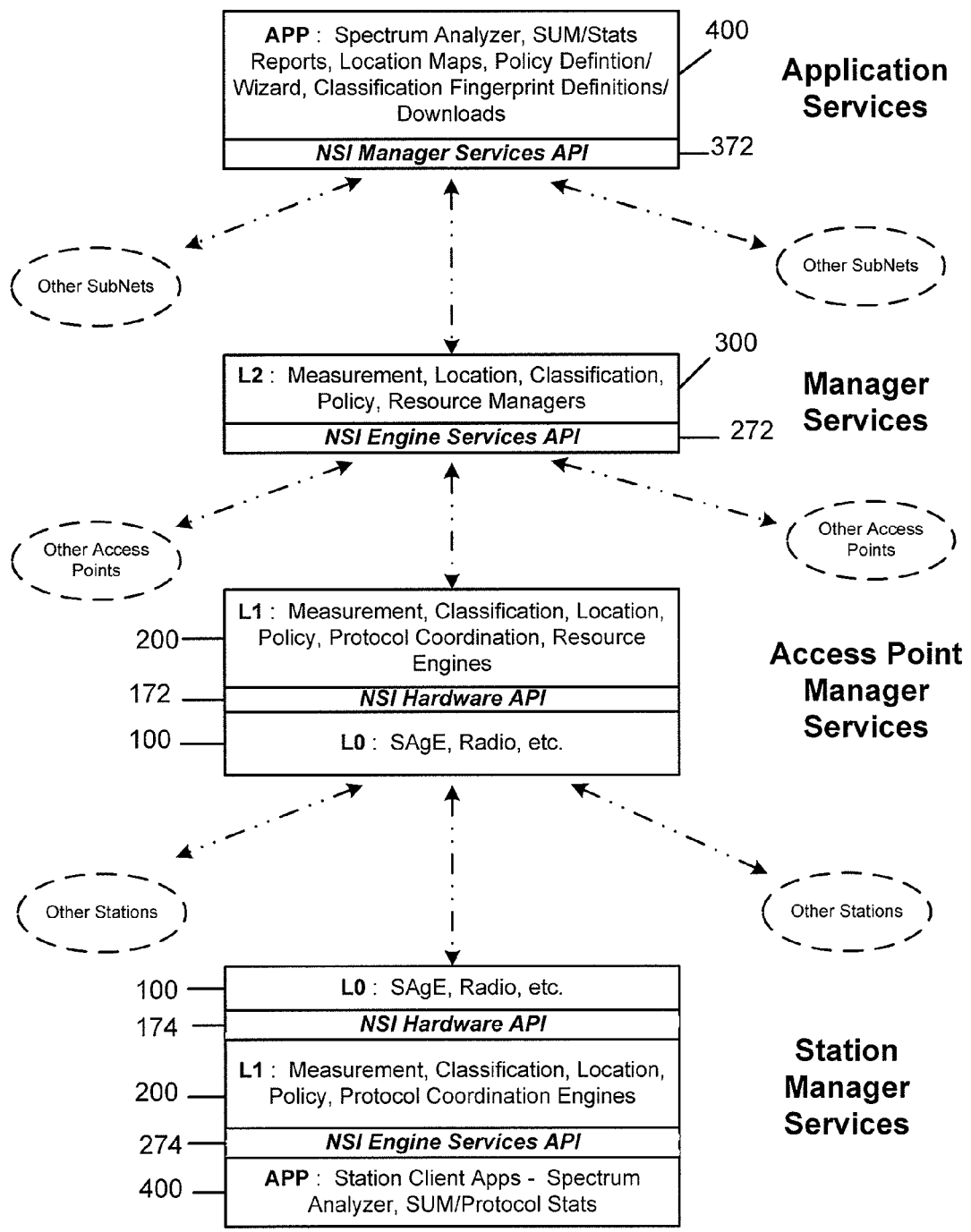

FIG. 31 shows how the NSIs are used between the various levels of the spectrum management software architecture in the context of the system hierarchy shown in FIG. 28. For each of the NSIs, there is an application programming interface (API) that defines the transport protocol for that interface. At the highest level in the spectrum management architecture, there is an NSI manager services API 372 that defines how information is exchanged between the L2 manager services 300 and the applications services 400. The NSI manager services API 372 of any subnet may interface with L2 manager services of the same subnet and other subnets. At the next level down, there is a NSI engine services API 272 that defines how information is exchanged between the L2 manager services 300 and the L1 engine services 200 executing in APs for that subnet. There is an NSI hardware API 172 that defines how information is exchanged between the L1 engine management services 200 and the L0 hardware management services 100 in each AP.

At the STA network level, there also is a NSI hardware API 174 that defines the information exchange between the L0 hardware management services 100 in a STA with the L1 engine management services 200 in the STA. Similarly, there is a NSI engine services API 274 that defines the information exchange between the L1 engine management services 200 and the applications services 400 in the STA.

The Resource Managers

Figure 32:
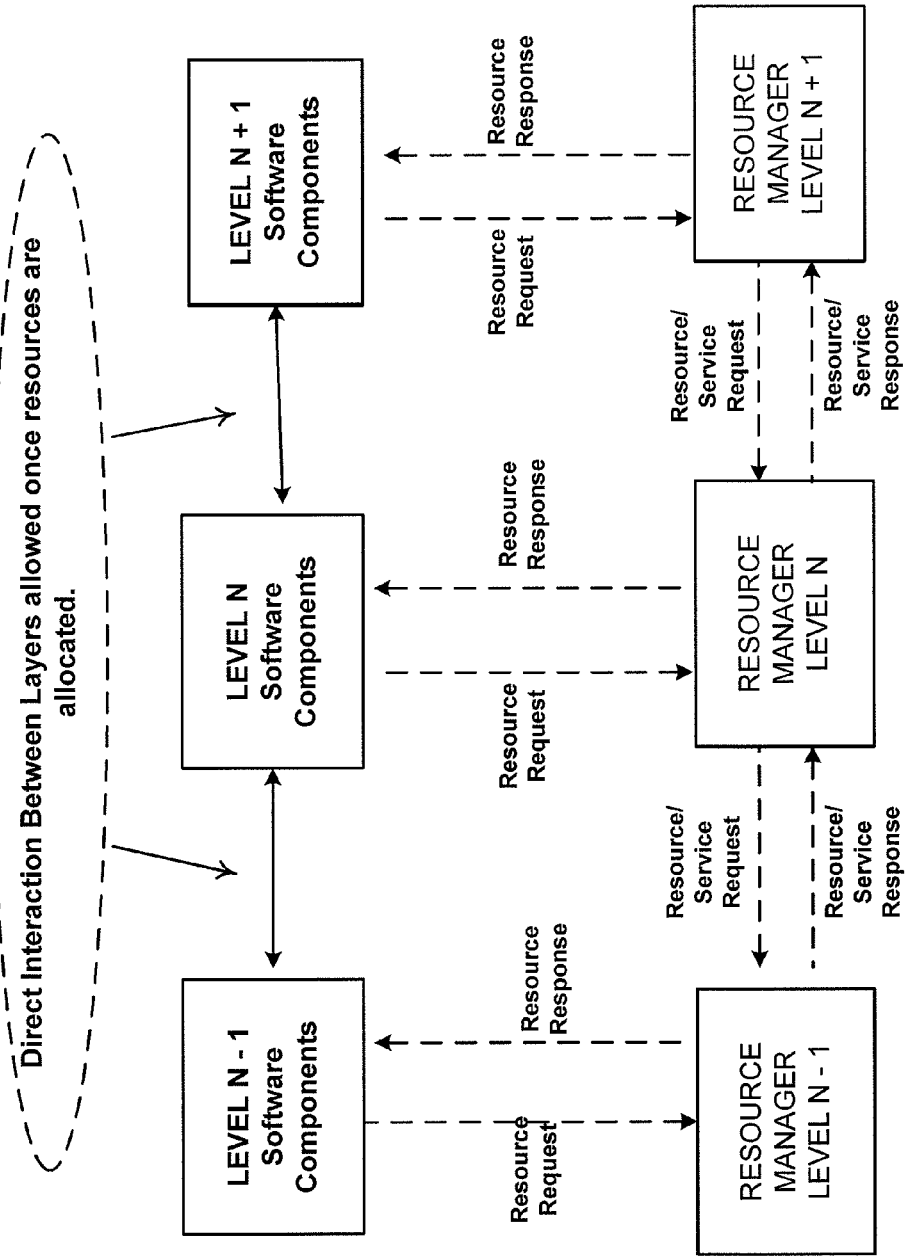
FIG. 32 is a flow diagram showing interaction between resource managers in the various software levels of the spectrum management system.

Referring to FIG. 32, the resource manager function will be described. Within each network component at each level of the spectrum management software architecture is a resource manager. The resource manager is responsible for (1) mediating contention for common resources (such as the radio transceiver and SAGE) between software components at the same level; and (2) requesting access to common lower level resources; and (3) responding to requests from upper levels to schedule services by that level. Where possible the resource manager will already have knowledge and complete control over the scheduling of use of the lower level resource. However there may be occasions when the lower level will need to be consulted as to when a lower resource has become available. Once a service request has been granted the upper layer components will generally interact directly with the lower layer counterparts. When coordination of resources is required across a network, the L2 network spectrum manager 360 coordinates the various resource managers involved.

Figure 33:
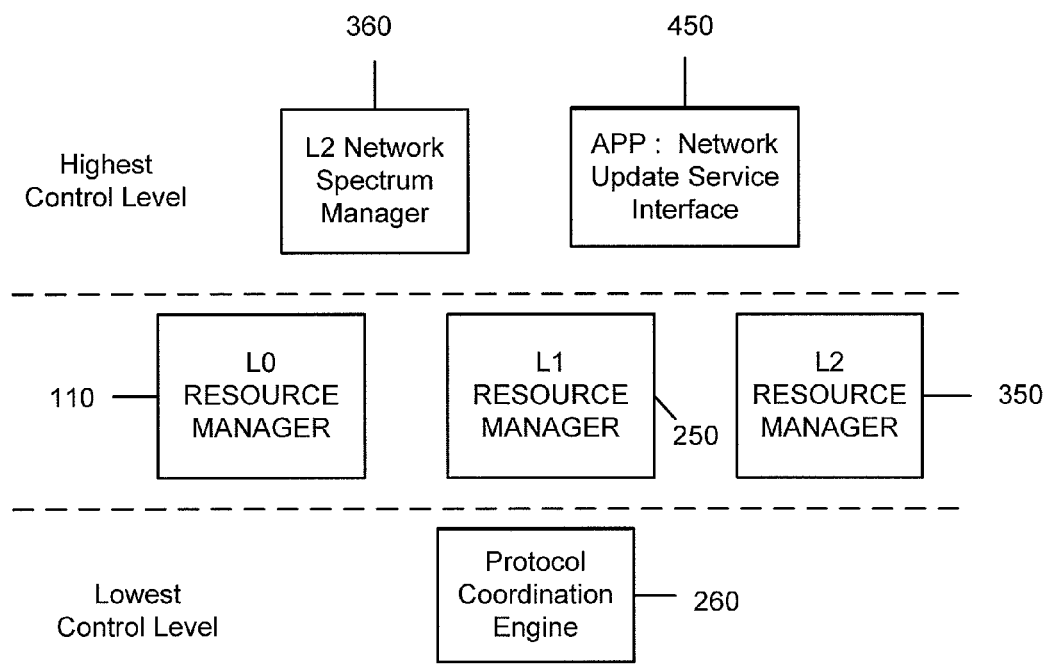
FIGS. 33 and 34 are block diagrams showing other hierarchical relationships between processing levels of the spectrum management architecture.

Turning to FIG. 33, spectrum management is involved with the scheduling and co-ordination of resources that are required to deliver spectrum management services such as classification, location, and measurement. Spectrum intelligence is the transformation of raw data into higher level information content for the intelligent use of that information.

The software components involved in managing network resources are the resource managers in each software level and the L2 network spectrum manager 360. The L2 network spectrum manager 360 manages resources across the network. It is essentially the master of network control. The network updates service interface 450 is an application service that manages update requests that can come from foreign network management systems or other upper layer applications. These requests are fielded by the L2 network spectrum manager 360 and may have effects across the network.

The L0 and L1 resource managers 110 and 250, respectively, are only responsible for managing resource requests within their own network component (STA or AP). The L2 resource manager manages cross network resource requests. However it does not manage any activities. It is essentially manages the inventory of resources that the L2 network spectrum manager 360 controls.

For each MAC protocol that is actively managed by L2 network spectrum manager 360, there is an L1 protocol coordination engine 260 (FIG. 28) which manages the actual protocol MAC engine.

The software components shown in FIG. 33 control network activities, but they do not make intelligent choices as to what actions to take. These intelligent decisions are either made by the policy engines/managers or by an application in the applications services level 400.

Figure 34:
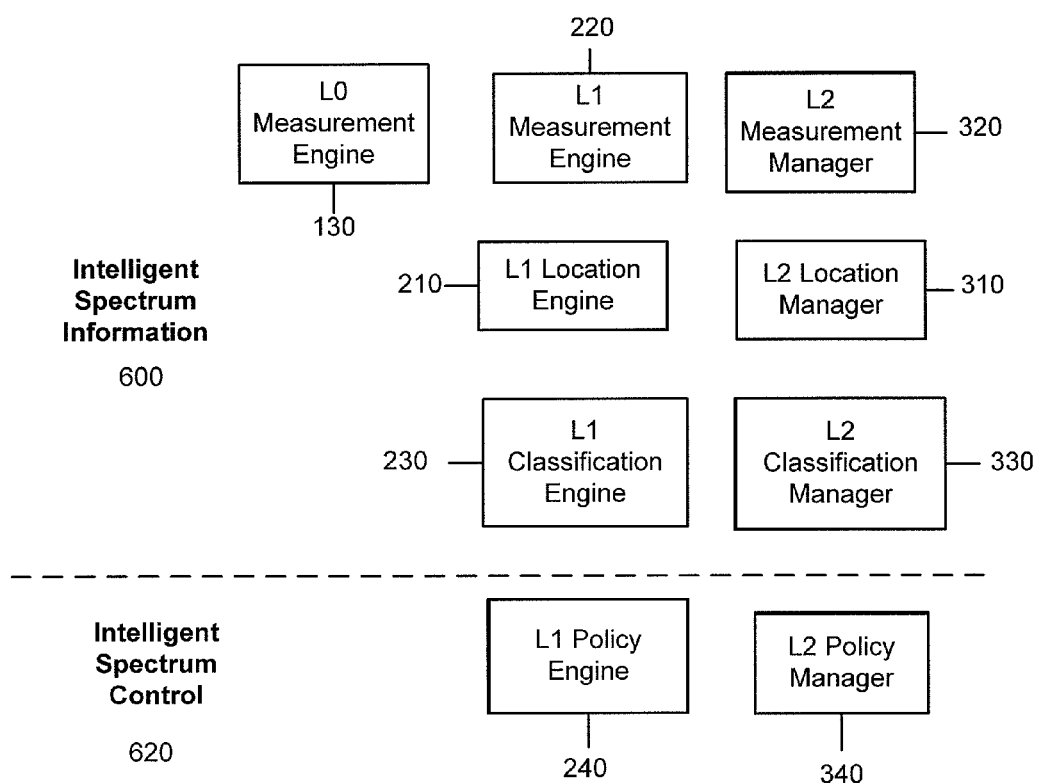

Referring to FIG. 34, the concept of spectrum intelligence is further described. Spectrum intelligence manifests itself in two general categories: intelligent spectrum information 600 and intelligent spectrum control 620. Intelligent spectrum information 600 is the result of converting raw spectrum activity data into increasingly higher information content. For example, the L0 SAGE engine 120 captures pulse events which are analyzed by the L1 classification engine 230 which in turn passes the pre-processed results to the L2 classification manager 330 for further analysis when necessary.

Intelligent spectrum control 620 are the commands that are generated which, when acted upon, change the behavior of a device operating in the frequency band that impacts the usage of the frequency band. The L1 policy engine 240 and L2 policy manager 340 are the primary mechanisms for intelligent response to network conditions. The actions include AP channel selection, STA load balancing, and interference mitigation (co-existence algorithms), etc. In addition the Manager NSI 370 (FIG. 30) provides a policy manager service interface which allows higher level network applications to update or influence policies.

Figure 35:
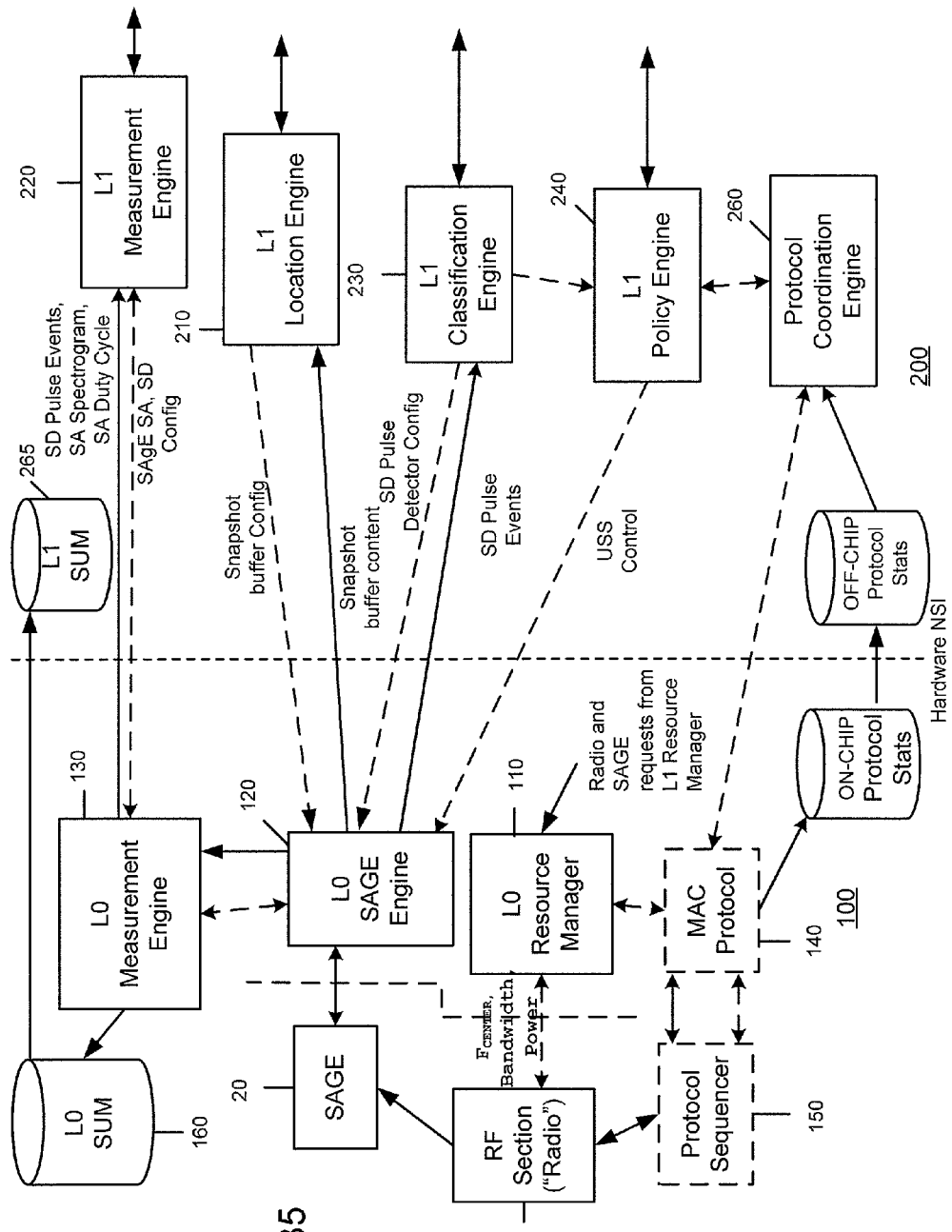
FIG. 35 is a more detailed block diagram showing the interaction between the mid-levels in the spectrum management system architecture.
Figure 36:
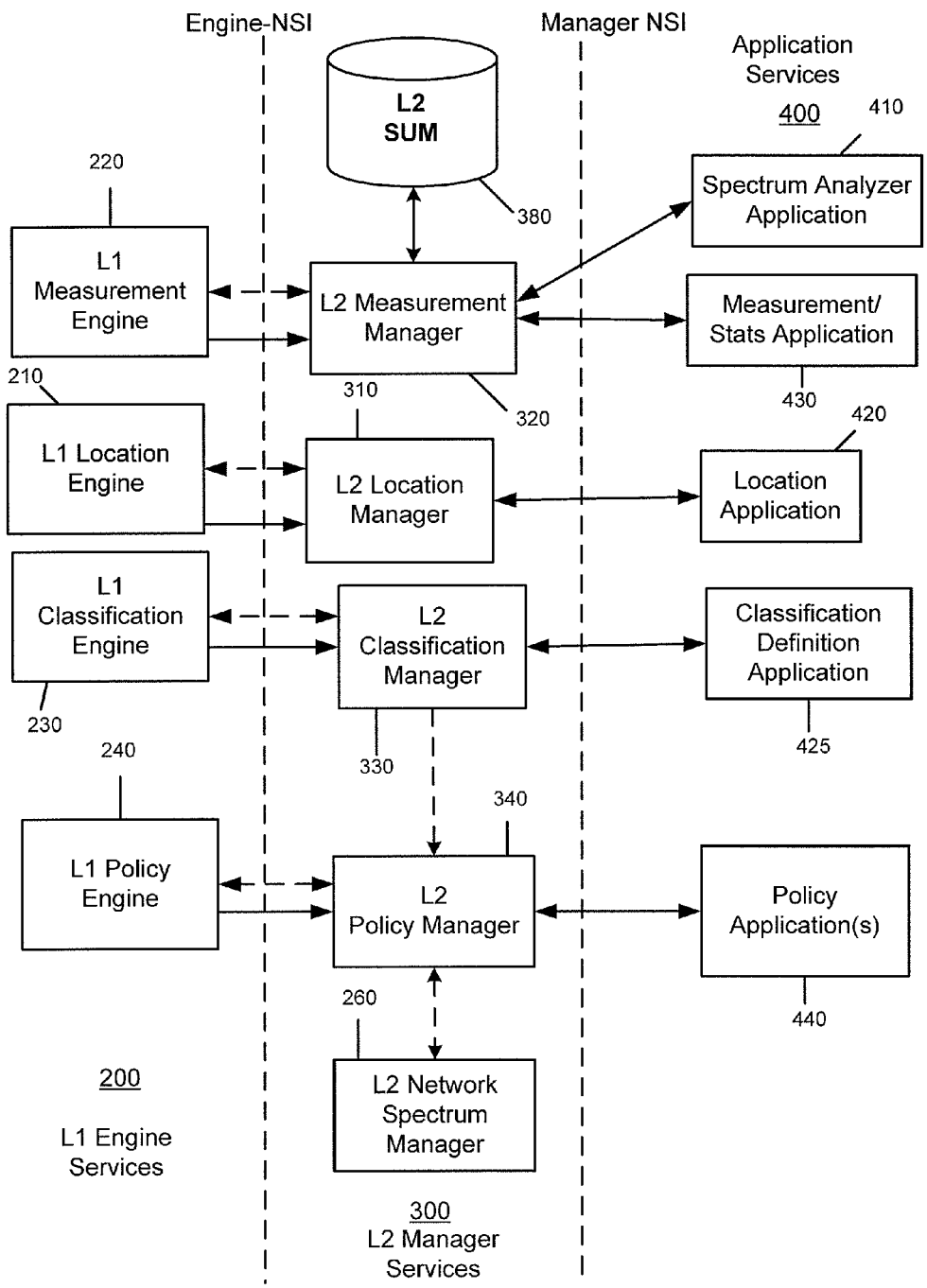
FIG. 36 is a more detailed block diagram showing the interaction between the higher levels in the spectrum management system architecture.

FIGS. 35 and 36 show more details about the interaction between modules in the different levels of the spectrum management system. In these diagrams, solid lines between blocks represent data flow and dashed lines represent controls.

FIG. 35 shows the interface of information between the L0 hardware management services and the hardware resources, and the interface of information by the hardware NSI between the L0 hardware management services and the L1 engine services. The L0 resource manager 110 manages use of the radio resources to prevent conflicting uses of the radio. For example, the L0 resource manager 110 may receive requests from the L1 resource manager for performing a spectrum management task, such as changing a center frequency, bandwidth or power, or for SAGE function/control requests. The L0 resource manager 110 will generate control signals to control center frequency, bandwidth and/or output power level used by the radio, and will arbitrate use of the radio between a MAC protocol process 140 for receiving or transmitting signals and SAGE requests. For example, when transmitting and/or receiving signals according to a MAC protocol, L0 resource manager 110 will set the bandwidth of the radio to operate in a narrowband mode whereby the radio downconverts only a portion of the frequency band (where a signal is expected to be present) or upconvert to only a portion of the frequency band where a signal is to be transmitted and the protocol sequencer 150 will have use of the radio. On the other hand, when operating the SAGE 20, the L0 resource manager 110 will control the radio to operate in a wideband mode to sample the entire or substantial portions of the frequency band for spectrum management functions, or to transmit a wideband signal in the frequency band. Based on the received request, the L0 resource manager 110 will set the duration of use of the radio for SAGE or signal communication functions.

The L0 SAGE engine 120 provides device driver, configuration and interface management for the SAGE 20. These responsibilities include utilization of the SAGE Dual Port Ram (DPR). The SAGE Dual Port Ram is used by several SAGE internal components. The L0 SAGE Engine 120 is responsible for assigning DPR resources to the various applications and refusing request when the DPR resources are not currently available. The L0 SAGE engine 120 transfers SAGE information to other L0 subsystems, such as to the L0 measurement engine 130 or off-chip to the L1 classification engine 230.

The L0 SAGE engine 120 receives configuration information for several of its components from L1 engines. For example, it receives configuration information for the snapshot buffer from the L1 location engine 210, and upon an appropriate triggering event, supplied snapshot buffer content to the L1 location engine 210. Similarly, the L0 SAGE engine 120 receives SAGE signal detector configuration information from the L1 classification engine 230. The L0

SAGE engine 120 outputs signal detector pulse events to the L1 classification engine 230. The L1 policy engine 240 provides controls for the USS component of the SAGE 20.

The L1 measurement engine 220 exchanges configuration information for the SAGE spectrum analyzer and signal detector with the L0 measurement engine 130. In addition, the L0 measurement engine outputs pulse events from the SAGE signal detector, as well as stats and duty cycle information from the SAGE spectrum analyzer. The L0 measurement engine 120 accumulates this information which constitutes the initial information for the spectrum utilization map (SUM). At this level, this information is referred to as the L0 SUM 160. The L0 SUM 160 may be periodically passed off-chip to the L1 SUM 265 and to the L1 measurement engine 220 for accumulation into the L2 SUM.

The L1 measurement engine 220 provides to L2 managers power versus frequency (PF) spectrogram information and spectrum analyzer statistics generated by the spectrum analyzer of the SAGE 20, as well as pulse events output by the SAGE signal detector. The L1 measurement engine 130 may receive SAGE spectrum analyzer configuration information from the L2 measurement manager 320 to configure such things as a lowpass filter parameter, decimation factor, etc. The L1 measurement engine 220 outputs a timestamp and associated received signal strength indicator (RSSI) power values for each of a plurality of Fast Fourier Transform (FFT) bins. For the spectrum analyzer statistics, the spectrum analyzer of the SAGE 20 may similarly be configured as to a lowpass filter parameter, decimation factor, cycle counter (number of spectrum analyzer updates performed prior to forwarding the stats) and minimum power for duty counting. The spectrum analyzer stats include a timestamp and associated stats for each FFT bin, including average power, maximum power and number of time above a minimum power.

Pulse events are output by the pulse detector components of the SAGE signal detector. The SAGE contains, for example, four pulse detectors. The L1 measurement engine 220 collects pulse events. More than one L1 user may use the same stream of pulse events. For example, the L2 classification manager 330 may use the pulse events to perform more detailed classification. The same stream of pulse events is also examined by the L1 classification engine 230.

A user of the pulse event stream may specify a specific pulse detector by specifying a signal detector ID such as, fore example, 0 to 3. Otherwise the L2 network spectrum manager 360 chooses the pulse detector. The configuration information for a pulse detector includes ID, bandwidth threshold, minimum center frequency, maximum center frequency, minimum power threshold, minimum pulse bandwidth, maximum pulse bandwidth, maximum pulse duration, etc. Further details on the configuration of a pulse detector are disclosed in the aforementioned co-pending application on the SAGE.

The pulse event data stream comprises, for example, an signal detector ID, center frequency (at the beginning of the pulse), pulse bandwidth (at the beginning of the pulse), pulse duration, timestamp for the start of the pulse event, counter value for a down counter in the universal clock module associated with the pulse detector and pulse power estimate (at the beginning of the pulse).

The L1 classification engine 230 performs the first level of signal classification. Details of signal classification procedures are disclosed in the aforementioned commonly assigned patent application. The L1 classification engine 230 outputs fingerprint identification of a signal or pulse by matching statistical and pulse information against fingerprint templates. The result is one or more identification matches as to the type and timing of a pulse. In addition, the L1 classification engine 230 outputs statistical information that characterizes generally what is occurring in the frequency band. The L1 classification engine 230 configures the SAGE pulse detectors appropriate for signal classification, as described above.

The signal identification information output by the L1 classification engine 230 is also called a "fingerprint identification" and includes for example, a center frequency (if relevant), fingerprint ID, estimated probability that the fingerprint ID represents the device, power of the identified device and estimated duty cycle percentage. The fingerprint ID includes for example, IDs for a microwave oven, frequency hopping device (such as a Bluetooth™ SCO device or a Bluetooth™ ACL device, a cordless phone, an IEEE 802.11 device, and IEEE 802.15.3 device, and various types of radar signals.

The classification statistical information includes histograms built from the pulse events generated by the SAGE signal detector. The L1 classification engine 230 configures the pulse detector to gather the pulse events based on its configuration. Examples of statistical histograms built include center frequency, bandwidth, active transmission, pulse duration, time between pulses and autocorrelation. These histograms and the classification engine are described in further detail in the aforementioned signal classification patent application.

FIG. 36 also shows the various application services and how they interface with the manager services. The L2 measurement manager 320 exchanges data with the spectrum analyzer application 410 and with the measurement/stats application 430. The L2 measurement manager 320 receives SUM data from the L1 measurement engine 220 and builds the complete SUM, called the L2 SUM 380. The L2 SUM 380 includes radio and protocol statistics. The L2 SUM 280 will be described in greater detail in conjunction with FIG. 41. The L2 location manager 310 interfaces information with the location application 420. For example, the L2 location manager 310 supplies raw location data the location application 420 processes to generate location information for various devices operating in the frequency band. The L2 classification manager 330 exchanges information with a classification definition application 425. The classification definition application 425 is an application that generates and supplies new or updated signal definition reference data (also called fingerprints) for use by the classification engine 230. A classification definition algorithm is disclosed in the aforementioned commonly assigned application related to signal classification. The L2 policy manager 340 exchanges information with the policy application 440. One function of the policy application 400 is to define and supply spectrum policies governing use of the frequency band in certain situations. A policy wizard, described hereinafter, is an example of another function of the policy application 440.

Figure 37:
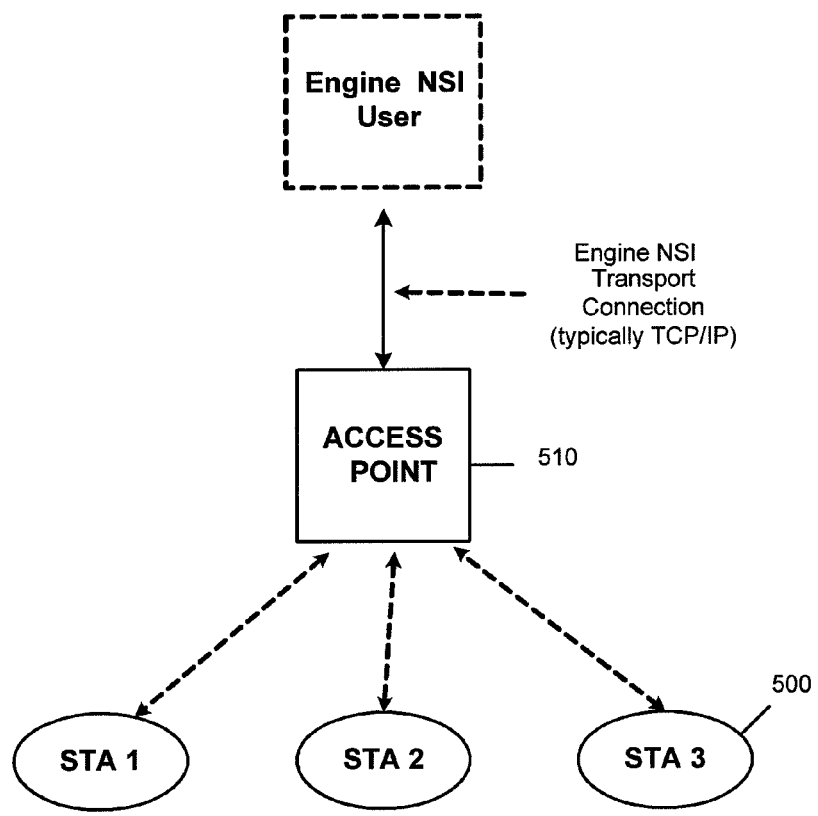

Turning to FIGS. 37-40, the interface between the L1 engines services and the L2 manager services will be described. The function of the Engine NSI is to provide access to the L1 engines services. As shown in FIG. 37, in a WLAN application, the L1 engine services operate within APs and Client STAs. A single instance of the Engine NSI provides access to either an AP and the STAs, or a single STA. Instances of the Engine NSI are distinguished by transport connections. That is, there a separate transport connection for each instance of the Engine NSI. In a WLAN application, the Engine NSI may be provided within both APs and STAs. Similar L1 services are provided in both the STAs and the controlling APs. For example, the output of the SAGE is provided to both APs and STAs. Similarly, network SUM/Stats are available from both the AP's and STA's perspective.

Figure 38:
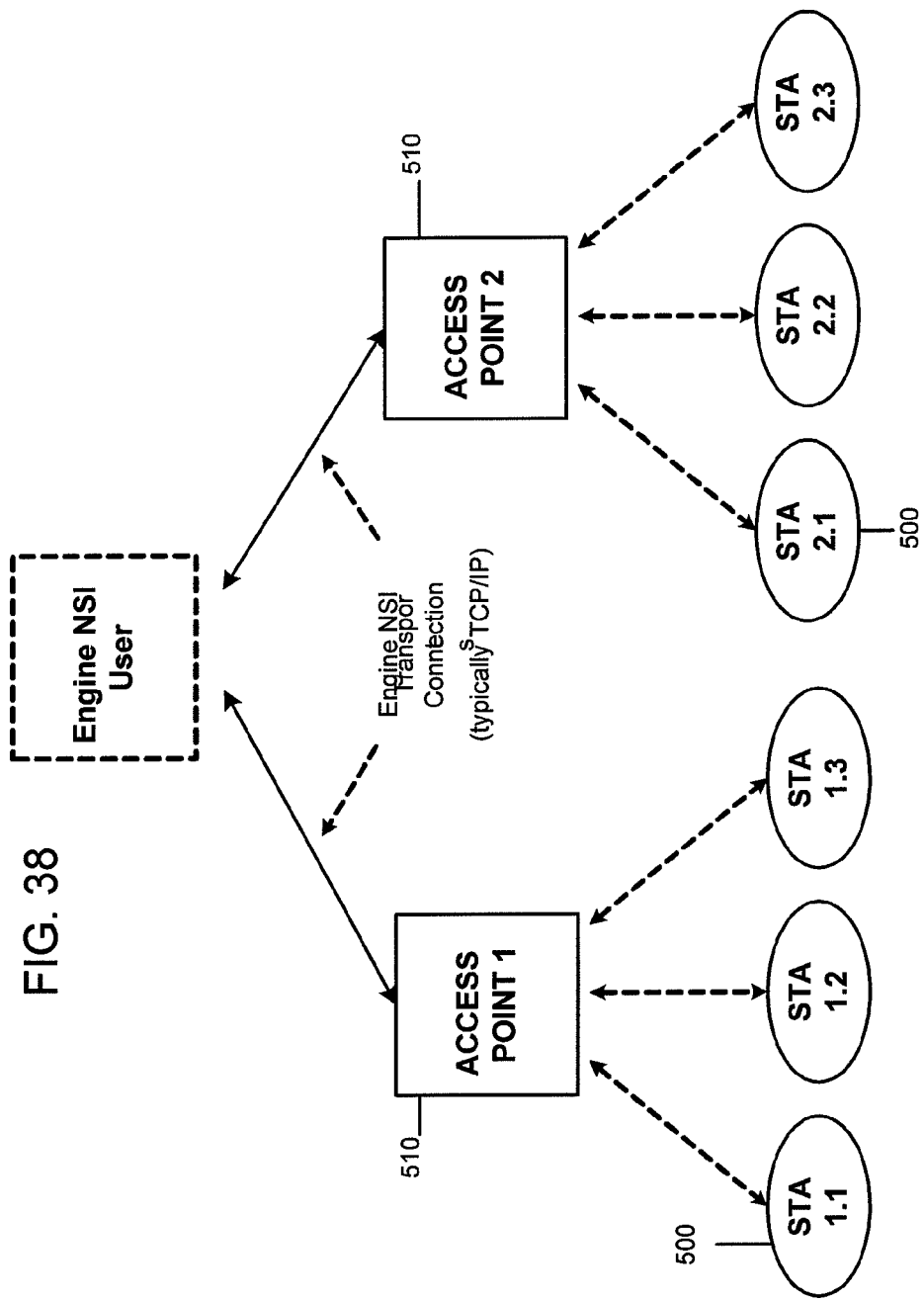

With reference to FIG. 38, when an Engine NSI user wishes to access more than one AP, separate instances of the Engine NSI are created. Each instance is distinguished by a separate transport connection. FIG. 38 shows an example of a single Engine NSI user accessing two APs via two separate instances of the Engine NSI, each with its own transport connection.

Turning to FIGS. 39 and 40, accessing the NS-Engine Services within a Station can be achieved either locally within the Station or remotely via a transport protocol. FIG. 39 shows local access typical of a local station management application. The STA management application provides the user services, such as SAGE spectrum analyzer or statistics. FIG. 40 shows how a remote model permits central accumulation of remote STA statistics. It also allows coordination of such activities as interference mitigation between AP, STA and interference sources.

FIG. 41 shows an example of the information contained in the L2 SUM 380. Each Fast Fourier Transform (FFT) frequency bin (of a plurality of frequency bins that span the frequency band) has an associated duty cycle statistic, maximum power statistic, average power statistic, and network traffic statistic, if any. FIG. 41 shows only an exemplary sub-set of the frequency bins.

The L2 Policy Manager

The policy manager 340 defines how to react to the presence of other signals in the frequency band. These policies may be dictated by regulatory domains, or by users/administrators. For example, the European FCC has a mandate to move a channel if a radar signal detected. Alternatively, an administrator may desire to add channel with least noise if the traffic load is above 60%. A user may desire to prioritize cordless phone traffic over WLAN traffic.

These policies will change over time, and vary by use case. This makes it impossible to hard code all cases and ship with a product. New or updated policies created (for example, as explained hereinafter) may be downloaded by the L2 policy manager 340 to the L1 policy engine 240. Management policies may be expressed in the form of a well-defined grammar. These grammar rules define concepts, such as RSSI level, CCA percentage, traffic types (voice, data, video, etc.), protocol type, active channel, alternate channel, etc. Grammar defines operators, such as "greater than," "max" and "member of."

Grammar allows construction of a prioritized set of if/then rules, in the form of:

If [condition] then [activation rule]

The activation rules make use of the underlying spectrum management tools, such as DFS, TPC, etc.

Examples of spectrum policy statements are:

```
SOHO AP:
    if startup
        active-channel = random from lowest RSSI(AP)
    if active-channel packet errors > 20
        active-channel = random from lowest RSSI(AP, STA)
SOHO NIC:
    if startup
        active-channel = find BSSID (1234) start with
        last-active-channel
LARGE WLAN AP:
    if startup
        Active-channel = fixed 7
    if active-channel traffic utilization > 60%
        add-channel 8 if measure(channel 8) = low noise
```

```
LARGE WLAN NIC:
    if startup
        active-channel = find highest SNR with low CCA
    if active-channel collisions > 50%
        find alternate channel with low CCA
```

The policy manager 340 matches the spectrum policy rules against current conditions, and takes action, acting essentially like a rule-based expert system "inference engine." The matching intelligence of the policy manager 340 may use toolkits from the field of artificial intelligence: lisp, prolog, etc. In addition, the policy manager 340 may use fuzzy logic to deal with fuzzy terms such as "high traffic", "bad signal strength," etc.

A policy wizard is an example of a policy application 440. It supplies information to the policy manager 340 and simplifies the task of creating spectrum policies by asking the user (or administrator) a set of questions, such as:

Is this a home network or an office network?

Is there more than one AP in the network?

Is there one or more cordless phones in the area?

Based on this information, the policy wizard generates spectrum policies appropriate for those parameters. The spectrum policies are downloaded to the policy manager 340.

In sum, a method is provided for managing use of a radio frequency band in which signals of multiple types may occur, comprising a step generating at least one of: (a) a control signal for controlling operation of a device in the radio frequency band, and (b) information describing a particular type of activity determined to occur in the radio frequency band, based on spectrum activity information derived from radio frequency energy occurring in the radio frequency band.

In addition, a system is provided for managing use of a radio frequency band in which signals of multiple types may be present, comprising at least one radio device that receives radio frequency energy in the radio frequency band to monitor activity of multiple types of signals that may occur in the radio frequency band and generates spectrum activity information representative thereof; and a computing device coupled to the radio device that receives the spectrum activity information and generates at least one of: a control for controlling a device operating in the radio frequency band, and information describing a particular type of activity determined to occur in the radio frequency band.

Further, a processor readable medium is provided which is encoded with instructions that, when executed by a processor, cause the processor to perform a step of generating a control signal for controlling operation of a device in a radio frequency band, and (b) information describing a particular type of activity determined to occur in the radio frequency band, based on spectrum activity information derived from radio frequency energy occurring in the radio frequency band.

Further still, a software system that manages activity in a radio frequency band where signals of multiple types may occur, comprising a first process for accumulating data associated with activity in the radio frequency band; a second process that classifies types of signals occurring in the radio frequency band based on data from the first process; and a third process that, based on the data accumulated by the first process and/or types of signals determined to occur based by the second process, generates at least one of: a control for a device operating in the radio frequency band and information describing a particular type of activity occurring in the frequency band.

Further yet, a software architecture is provided for a system that manages activity in a radio frequency band where signals of multiple types may be occurring, comprising an application program that processes spectrum activity information pertaining to activity in the radio frequency band to perform a function; and an application programming interface that presents messages to one or more processes that generate the spectrum activity information and returns spectrum activity information to the application program.

A method is provided for interfacing an application program with at least one process that analyzes data pertaining to activity in a radio frequency band in which signals of multiple types may occur and produces spectrum activity information, comprising steps of generating a request for a spectrum analysis function by the at least one process; and receiving the spectrum activity information produced by the at least one process.

Likewise, an application programming interface is provided embodied on one or more computer readable media that interfaces an application program with at least one process that analyzes data pertaining to activity in a radio frequency band where signals of multiple types may be occurring and produces spectrum activity information, comprising a first group of messages that requests analysis functions from the at least one process, and a second group of messages that provides the spectrum activity information to the application program.

Furthermore, a device (cognitive radio device) is provided that receives radio frequency energy in a radio frequency band and processes signals representative thereof, comprising a radio receiver that receives radio frequency energy in a radio frequency band where signals of multiple types may be occurring; a spectrum analyzer that computes power values for radio frequency energy received in at least part of the radio frequency band for a time interval; a signal detector coupled to the spectrum analyzer that detects signal pulses of radio frequency energy that meet one or more characteristics; and a processor coupled to receive output of the spectrum analyzer and the signal detector, wherein the processor is programmed to generate at least one of: (a) a control signal for controlling operation of a device in a radio frequency band, and (b) information describing a particular type of activity determined to occur in the radio frequency band, based on spectrum activity information derived from the spectrum analyzer and signal detector.

The foregoing description is intended by way of example only and is not intended to limit the invention in any way.

What is claimed is:

1. A method comprising:
   receiving radio frequency energy in a frequency band;
   analyzing the radio frequency energy to classify devices determined to be operating in the frequency band based on the received radio frequency energy, wherein the frequency band comprises a first portion and a second portion and the second portion is larger than the first portion; and
   adjusting an amount of dynamic rate adaptation and bandwidth used by one or more devices operating in the frequency band when a frequency hopping device is determined to be operating in the frequency band based on said analyzing;
   wherein adjusting comprises limiting a degree of dynamic rate adaptation used by a non-frequency hopping communication device to the second portion of the frequency band when it is determined based on said analyzing that the frequency hopping device has an adaptive hop set capability.

2. The method of claim 1, wherein adjusting comprises adjusting the amount of dynamic rate adaptation used by a wireless local area network access point device that serves one or more wireless client devices in a wireless network operating in the frequency band.

3. An apparatus comprising:
   a radio receiver configured to receive radio frequency energy in a frequency band that comprises a first portion and a second portion, wherein the second portion is larger than the first portion;
   a spectrum analysis unit configured to analyze the radio frequency energy to classify devices determined to be operating in the frequency band based on the received radio frequency energy; and
   a controller coupled to the spectrum analysis unit and configured to generate a control to adjust an amount of dynamic rate adaptation and bandwidth used by one or more devices operating in the frequency band so as to limit a degree of the dynamic rate adaptation to the second portion of the frequency band when a frequency hopping device is determined to be operating in the frequency band and the frequency hopping device is determined to have an adaptive hop set capability based on the analysis by the spectrum analysis unit.

4. The apparatus of claim 3, wherein the controller is configured to generate a control to adjust the amount of dynamic rate adaptation used by a wireless local area network access point device that serves one or more wireless client devices in a wireless network operating in the frequency band.

5. A non-transitory processor readable medium encoded with instructions that, when executed by a processor, cause the processor to:
   analyze data representing radio frequency energy received by a receiver device in a frequency band to classify devices determined to be operating in the frequency band based on the received radio frequency energy, wherein the radio frequency band comprises a first portion and a second portion, wherein the second portion is larger than the first portion; and
   generate a control to adjust an amount of dynamic rate adaptation and bandwidth used by one or more devices operating in the frequency band so as to limit a degree of the dynamic rate adaptation to the second portion of the frequency band when a frequency hopping device is determined to be operating in the frequency band and the frequency hopping device is determined to have an adaptive hop set capability based on the analysis of the radio frequency energy.

6. The processor readable medium of claim 5, wherein the instructions that generate the control comprise instructions that generate the control to adjust the amount of dynamic rate adaptation used by a wireless local area network access point device that serves one or more wireless client devices in a wireless network operating in the frequency band.

7. A method comprising:
   receiving radio frequency energy in a frequency band;
   analyzing the radio frequency energy to classify devices determined to be operating in the frequency band based on the received radio frequency energy;
   detecting one or more frequency hopping devices operating in the frequency band based on said analyzing;
   determining when a detected frequency hopping device is operating with a relatively slow frequency hopping signal and when a detected frequency hopping device is operating with a relatively fast frequency hopping signal;

controlling in a first manner one or more transmit parameters used by a wireless local area network access point device to transmit a data stream in the frequency band to a client device when the detected frequency hopping device is determined to operate with a relatively slow frequency hopping signal; and controlling in a second manner the one or more transmit parameters used by the wireless local area network access point device to transmit the data stream in the frequency band when the detected frequency hopping device is determined to operate with a relatively fast frequency hopping signal.

8. The method of claim 7, wherein controlling comprises controlling the wireless local area network access point device to transmit a relatively high quality of service data stream on multiple redundant channels when it is determined that the detected frequency hopping device is operating with a relatively slow frequency hopping signal.

9. The method of claim 7, wherein controlling comprises controlling the wireless local area network access point device to transmit a relatively high quality of service data stream across a wider bandwidth channel when it is determined that the detected frequency hopping device is operating with a relatively fast frequency hopping signal.

10. The method of claim 7, wherein the data stream is a relatively high quality of service data stream that includes video.

11. The method of claim 8, wherein controlling comprises controlling the wireless local area network access point device to transmit the relatively high quality of service data stream across a wider bandwidth channel when it is determined that the detected frequency hopping device is operating with a relatively fast frequency hopping signal.

12. An apparatus comprising:
a radio receiver configured to receive radio frequency energy in a frequency band;
a spectrum analysis unit configured to analyze the received radio frequency energy to classify devices determined to be operating in the frequency band based on the received radio frequency energy; and
a controller coupled to the spectrum analysis unit and configured to:
detect one or more frequency hopping devices operating in the frequency band;
determine when a detected frequency hopping device is operating with a relatively slow frequency hopping signal and when a detected frequency hopping device is operating with a relatively fast frequency hopping signal;
control in a first manner one or more transmit parameters used by a wireless local area network access point device to transmit a data stream in the frequency band to a client device when the detected frequency hopping device is determined to operate with a relatively slow frequency hopping signal; and
control in a second manner the one or more transmit parameters used by the wireless local area network access point device to transmit the data stream in the frequency band when the detected frequency hopping device is determined to operate with a relatively fast frequency hopping signal.

13. The apparatus of claim 12, wherein the controller is configured to control the wireless local area network access point device to transmit a relatively high quality of service data stream on multiple redundant channels when it is determined that the detected frequency hopping device is operating with a relatively slow frequency hopping signal.

14. The apparatus of claim 12, wherein the controller is configured to control the wireless local area network access point device to transmit a relatively high quality of service data stream across a wider bandwidth channel when it is determined that the detected frequency hopping device is operating with a relatively fast frequency hopping signal.

15. The apparatus of claim 13, wherein the controller is configured to control the wireless local area network access point device to transmit the relatively high quality of service data stream across a wider bandwidth channel when it is determined that the detected frequency hopping device is operating with a relatively fast frequency hopping signal.

16. A non-transitory processor readable medium encoded with instructions that, when executed by a processor, are operable to:
analyze received radio frequency energy to classify devices determined to be operating in a frequency band based on the received radio frequency energy;
detect one or more frequency hopping devices operating in the frequency band;
determine when a detected frequency hopping device is operating with a relatively slow frequency hopping signal and when a detected frequency hopping device is operating with a relatively fast frequency hopping signal;
control in a first manner one or more transmit parameters used by a wireless local area network access point device to transmit a data stream in the frequency band to a client device when the detected frequency hopping device is determined to operate with a relatively slow frequency hopping signal; and
control in a second manner the one or more transmit parameters used by the wireless local area network access point device to transmit the data stream in the frequency band when the detected frequency hopping device is determined to operate with a relatively fast frequency hopping signal.

17. The processor readable medium of claim 16, wherein the instructions operable to control comprise instructions operable to control the wireless local area network access point device to transmit a relatively high quality of service data stream on multiple redundant channels when it is determined that the detected frequency hopping device is operating with a relatively slow frequency hopping signal.

18. The processor readable medium of claim 17, wherein the instructions operable to control comprises instructions operable to control the wireless local area network access point device to transmit the relatively high quality of service data stream across a wider bandwidth channel when it is determined that the detected frequency hopping device is operating with a relatively fast frequency hopping signal.

19. The processor readable medium of claim 16, wherein the instructions operable to control comprises instructions operable to control the wireless local area network access point device to transmit a relatively high quality of service data stream across a wider bandwidth channel when it is determined that the detected frequency hopping device is operating with a relatively fast frequency hopping signal.

\* \* \* \* \*